US009633517B2

(12) United States Patent
Kitamura et al.

(10) Patent No.: US 9,633,517 B2
(45) Date of Patent: *Apr. 25, 2017

(54) GAMING MACHINE HAVING FREE GAME, WHEREIN THE NUMBER OF ADDING FREE GAME IS ADDED

(71) Applicants: Universal Entertainment Corporation, Tokyo (JP); Aruze Gaming America, Inc., Las Vegas, NV (US)

(72) Inventors: Kenta Kitamura, Tokyo (JP); Hiromoto Yamauchi, Tokyo (JP); Masumi Fujisawa, Tokyo (JP)

(73) Assignees: UNIVERSAL ENTERTAINMENT CORPORATION, Tokyo (JP); ARUZE GAMING AMERICA, INC., Las Vegas, NV (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/790,145

(22) Filed: Jul. 2, 2015

(65) Prior Publication Data

US 2015/0356816 A1 Dec. 10, 2015

Related U.S. Application Data

(63) Continuation of application No. 13/886,320, filed on May 3, 2013, now Pat. No. 9,098,977.

(30) Foreign Application Priority Data

May 18, 2012 (JP) ................................ 2012-115079

(51) Int. Cl.

*G06F 17/00* (2006.01)
*G07F 17/32* (2006.01)
*G07F 17/34* (2006.01)

(52) U.S. Cl.

CPC ........ *G07F 17/3267* (2013.01); *G07F 17/329* (2013.01); *G07F 17/3216* (2013.01); *G07F 17/3244* (2013.01); *G07F 17/34* (2013.01); *G07F 17/323* (2013.01); *G07F 17/3213* (2013.01)

(58) Field of Classification Search

CPC .. G07F 17/34; G07F 17/3267; G07F 17/3213; G07F 17/3244

See application file for complete search history.

(56) References Cited

U.S. PATENT DOCUMENTS 4,097,048 A 6/1978 Poulsen
4,508,345 A 4/1985 Okada
6,663,487 B1 12/2003 Ladner
7,942,733 B2 5/2011 Sakuma
2004/0053672 A1 3/2004 Baerlocher
2006/0025202 A1 2/2006 Sato
2007/0238511 A1 10/2007 Sato
2008/0220861 A1 9/2008 Okada
2009/0312089 A1 12/2009 Tsukahara
2010/0022294 A1 1/2010 Yoshizawa
2011/0312396 A1 12/2011 Okada

*Primary Examiner* — Justin Myhr
(74) *Attorney, Agent, or Firm* — Lex IP Meister, PLLC

(57) ABSTRACT

The present invention provides a gaming machine employing a free game system which provides an enhanced game element. The gaming machine determines the number of adding free game based on a game number lottery table under the condition that a first symbol is rearranged in the symbol display unit in the free game, and adds a preset number of free game under the condition that a second symbol is rearranged in the symbol display unit in the free game.

3 Claims, 39 Drawing Sheets

FIG. 22

SYMBOL APPEARANCE PROBABILITY TABLE

| | SYMBOL | PROBABILITY |
|---|---|---|
| FS |   | NORMAL GAME: 1/XXX<br>FREE GAME: 0/XXX |
| TS | 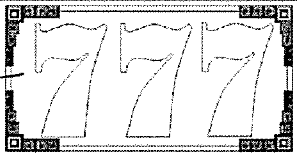  | NORMAL GAME: 0/XXX<br>FREE GAME: 1/XXX |
| BS | 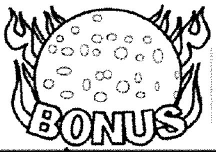  | NORMAL GAME: 1/XXX<br>FREE GAME: 0/XXX |
| SS | 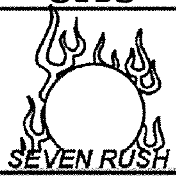  | NORMAL GAME: 0/XXX<br>FREE GAME: 1/XXX |
| BDS | 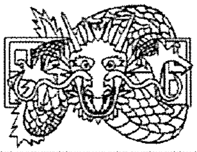 | NORMAL GAME: 1/XXX<br>FREE GAME: 0/XXX |
| TDS | 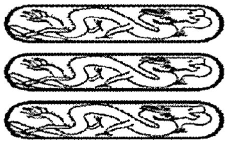 | NORMAL GAME: 1/XXX<br>FREE GAME: 0/XXX |
| DDS |  | NORMAL GAME: 1/XXX<br>FREE GAME: 0/XXX |
| SDS |  | NORMAL GAME: 1/XXX<br>FREE GAME: 0/XXX |

FIG. 23
PAYOUT TABLE
| SYMBOL | PAYOUT | PROBABILITY |
|---|---|---|
|  | XXX | X/XXX |
|  | XXX | X/XXX |
| 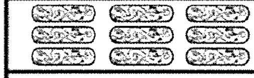 | XXX | X/XXX |
|  | XXX | X/XXX |
|  | XXX | X/XXX |
|  | XXX | X/XXX |
|  | XXX | X/XXX |
|  | XXX | X/XXX |
|  | XXX | X/XXX |
| ⋮ | XXX | X/XXX |
| ⋮ | XXX | X/XXX |
| ⋮ | XXX | X/XXX |
|  | XXX | X/XXX |
|  | XXX | X/XXX |
|  | XXX | X/XXX |
| ⋮ | XXX | X/XXX |
| ⋮ | XXX | X/XXX |
| ⋮ | XXX | X/XXX |
|  | XXX (ex. 20) | X/XXX |
|   | 0 | X/XXX |

FIG. 25

ADDING TABLE

| TABLE | PROBABILITY |
|---|---|
| SMALL | 95.00% |
| BIG | 5.00% |

SMALL TIME GAME NUMBER LOTTERY TABLE

| NUMBER OF GAMES | PROBABILITY | |
|---|---|---|
| 5 | 50.0% | 1/2.0 |
| 7 | 30.0% | 1/3.3 |
| 10 | 20.0% | 1/5.0 |

BIG TIME GAME NUMBER LOTTERY TABLE

| NUMBER OF GAMES | PROBABILITY | |
|---|---|---|
| 15 | 50.0% | 1/2.0 |
| 20 | 20.0% | 1/5.0 |
| 25 | 20.0% | 1/5.0 |
| 30 | 10.0% | 1/10.0 |

GAMING MACHINE HAVING FREE GAME, WHEREIN THE NUMBER OF ADDING FREE GAME IS ADDED

CROSS REFERENCE TO RELATED APPLICATIONS

This application is a Continuation application of U.S. patent application Ser. No. 13/886,320 filed on May 3, 2013, which claims priority of Japanese Patent Application No. 2012-115079 filed on May 18, 2012. The contents of this application are incorporated herein by reference in their entirety.

BACKGROUND OF THE INVENTION

1. Field of the Invention

The present invention relates to a gaming machine and, more particularly, to a gaming machine which rearranges symbols in each of unit games and awards a benefit when a winning pattern is established in the rearranged symbols.

2. Description of the Related Art

A slot machine is a gaming machine that rotates reels to rearrange symbols in a display area each time a game player presses an operation member such as a button located on a control panel to start playing a unit game. When the symbols are rearranged to form a winning pattern in the display area, a benefit (e.g., a payout) is awarded to the player (for example, refer to U.S. Pat. No. 4,097,048).

In consideration of players' diversified preferences, there have been developed a variety of slot machines. For example, a variety of slot machines has been developed which varies in symbol patterns, gaming scenarios, side effects (sound effects, effects using images, or effects by means of reel spinning). There has been developed a slot machine which is provided with a bonus game and a free game (for example, refer to U.S. Pat. Nos. 4,508,345 and 7,942,733). Furthermore, the slot machine also has been developed which permits the enjoyment of a free game under predetermined conditions (for example, refer to U.S. Pat. No. 7,942,733).

SUMMARY OF THE INVENTION

A free game is the game advantageous for a player because it can provide a player with a benefit thanks to the winning without consuming any gaming media such as a coin. The lack of consumption of the gaming media such as a coin alone, however, lacks a game element even if some payout can be acquired in the free game. The game thus tends to become monotonous. Therefore, a gaming machine employing a free game system is desired to provide an enhanced game element.

In light of the above-mentioned issues, the present invention is made, and the purpose thereof is to provide a gaming machine employing a free game system which provides an enhanced game element.

A feature of the present invention is a gaming machine capable of obtaining a game result based on a plurality of rearranged symbols, comprising:

a symbol display unit for rearranging the plurality of symbols;

a memory storing a game number lottery table for determining the number of adding games of a free game; and a controller for executing processes of:

(1) determining the number of adding free game based on the game number lottery table under the condition that a first symbol is rearranged in the symbol display unit in the free game; and (2) adding a preset number of free game under the condition that a second symbol is rearranged in the symbol display unit in the free game.

In this way, the number of free games added in the free game can provide a player with a feeling of expectation for continuation of the free game. Furthermore, since the pattern of adding the free games upon the first symbols being rearranged is different from that upon the second symbols being rearranged, the different expectations can be provided with regard to each of the rearrangements of the symbols. A enhanced game element thus can be provided.

In addition to the above, a feature of the present invention is that:

the game number lottery table includes a plurality of lottery tables each having the different numbers of adding games of the free game to be assigned thereby;

the memory further stores a table lottery table for selecting a lottery table by lottery for use in determination of the number of adding games from the plurality of lottery tables; and the process (1) includes the processes of:

(1-1) determining a lottery table from among the plurality of lottery tables based on the table lottery table under the condition that the first symbols is rearranged in the symbol display unit in the free game; and (1-2) determining the number of adding games of the free game using the lottery table determined in the process (1-1).

In this way, the number of free games corresponding to the lottery table determined based on the table lottery table is added upon the first symbols being rearranged. Since an incidental bias thus tends to occur in the number of free games added based on the rearrangement of the first symbols, it is possible to create a variation in adding (continuing) the free games in the progress of the free game, including the relationship with the adding of the free game upon the second symbol being rearranged. As a result, a player can be provided with an increasing feeling of expectation with regard to the continuation of the free game when entering into the free game. Furthermore, since the free game is generally a game that a player can acquire the winning with a payout, the continuation in the free game leads to the amount of the payout. Therefore, the expectation for the large amount of the payout based on the continuation of the free game can provide a player with an enhanced feeling of excitement.

Furthermore, a feature of the present invention is that:

the plurality of lottery tables includes a first lottery table having a larger expectation value of the number of adding games and a second lottery table having an expectation value of the number of adding games smaller than that of the first lottery table; and the table lottery table includes a probability of winning the first lottery table set lower than a probability of winning the second lottery table.

In this way, the lottery table is determined by lottery from the first lottery table and the second lottery table each containing the expectation values different from each other, and the free game becomes hard to be added based on the first lottery table containing higher expectation values. An incidental bias of adding the free game thus increasingly tends to occur. Therefore, since it is possible to provide more game players with the feeling of expectation for the continuation of the free game, i.e., a feeling expectation for more payouts, a feeling of excitement can be enhanced.

In addition to the above, a feature of the present invention is that the minimum value of the number of adding games in the first lottery table is set to be higher than the maximum value of the number of adding games in the second lottery table.

In this way, since the lottery based on the first lottery table certainly provides the larger number of adding free games when compared to the lottery based on the second lottery table, a feeling of expectation for adding the free game becomes higher when the lottery is carried out based on the first lottery table, thereby providing an enhanced game element.

In addition to the above, a feature of the present invention is that:

the first symbol is the symbol representing the fact that no payout should be done and more than one free game is to be added, when rearranged in the symbol display unit; and the second symbol is the symbol representing the fact that some payout should be done and one free game is to be added, when rearranged in the symbol display unit.

In this way, since the number of adding free games upon the first symbol being rearranged becomes different from that upon the second symbol being rearranged, a player can have a different feeling of expectation for each rearrangement of the symbols. More specifically, a game player expects that the first symbols are rearranged in the free game, and that the free game continues with the rearrangement of the first symbols. This results in a greater pleasure upon the first symbols being rearranged, and thus an enhanced game element is provided.

In addition to the above, a feature of the present invention is to provide a gaming machine, including:

a display for displaying the rearrangement of a plurality of types of symbols;

a betting device for betting a value; and a controller for executing processes of:

(A) executing a normal game upon the betting unit betting the value, the normal game executing a unit game rearranging the symbol on the display;

(B) shifting from the normal game to the free game upon a predetermined condition being satisfied, the free game enabling the unit game to be played for a predetermined number of times with the consumption of smaller number of values than that in the normal game; and (C) adding the first number of adding game to the number of times to execute the unit games of the free game upon the first symbol being rearranged in the unit game of the free game, and adding the second number of adding game to the number of times to execute the unit games of the free game upon the second symbol being rearranged, the second number of adding game having the magnitude of the expected number of adding games different from that of the first number of adding games.

In this way, since the number of adding free games upon the first symbol being rearranged becomes different from that upon the second symbol being rearranged, a player can have a different feeling of expectation for each rearrangement of the symbols.

In the present invention, the number of free games added in the free game can provide a player with a feeling of expectation for continuation of the free game. Furthermore, since the pattern of adding the free games upon the first symbols being rearranged is different from that upon the second symbols being rearranged, the different expectations can be provided with regard to each of the rearrangements of the symbols. An enhanced game element thus can be provided.

BRIEF DESCRIPTION OF THE DRAWINGS

FIG. 22 is a diagram showing an example of symbol appearance probability tables.

FIG. 23 is a diagram showing an example of payout tables.

FIG. 25 is a diagram showing an adding table and a game number lottery table.

DESCRIPTION OF THE PREFERRED EMBODIMENTS

Figure 1:
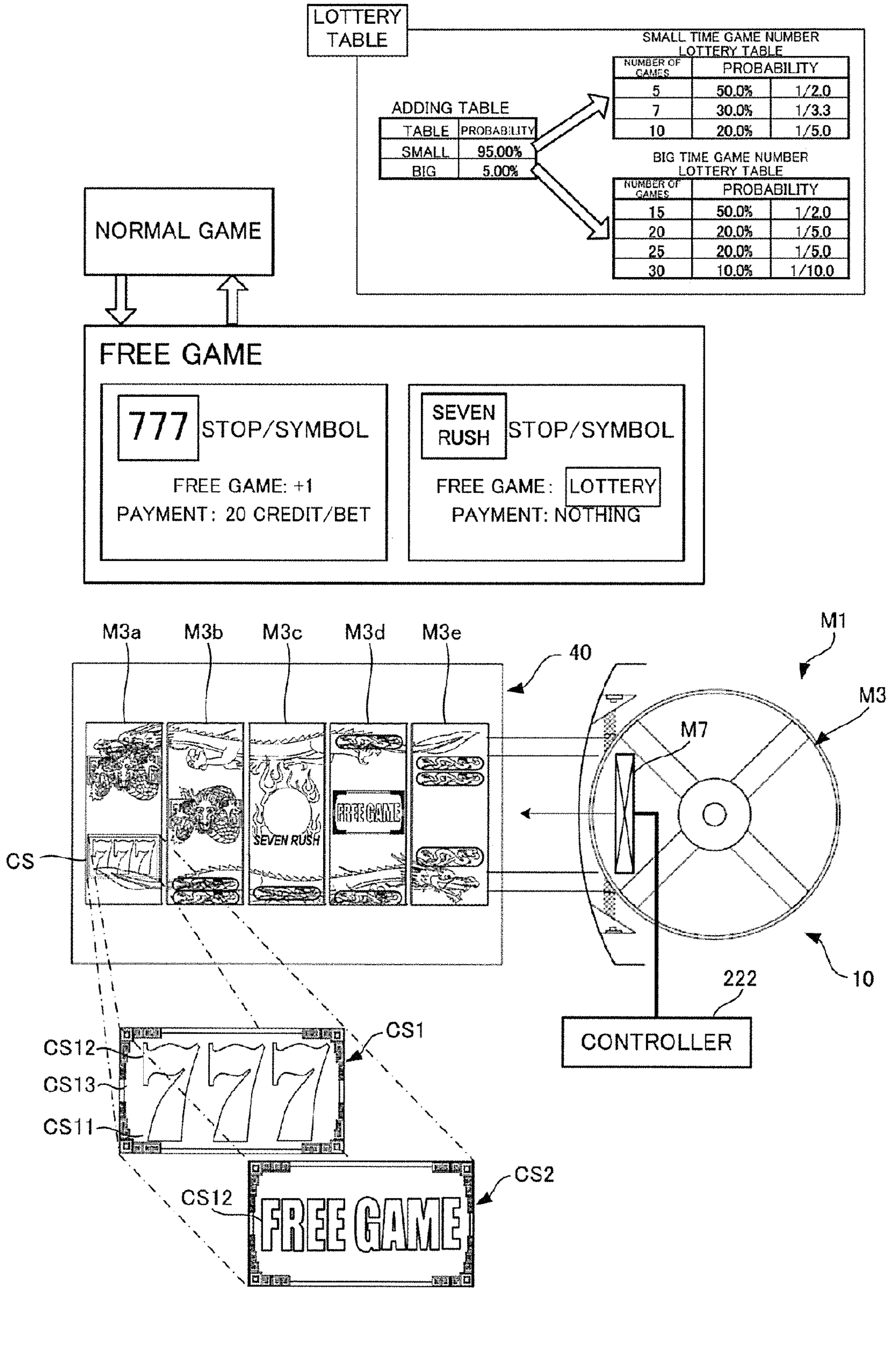
FIG. 1 is a diagram showing an overview of a gaming machine according to an embodiment of the present invention.

FIG. 1 is a diagram showing an overview of a gaming machine according to an embodiment of the present invention.

A gaming machine 10 according to the present embodiment is capable of obtaining a game result based on a plurality of rearranged symbols, and executes a normal game and a free game.

The gaming machine 10 is provided with a controller 222 (such as a main CPU) for executing the processes (1) and (2) described below, and a symbol display unit 40, the controller 222 executing the processes of;

(1) determining the number of adding free game based on the game number lottery table (such as a "small time game number lottery table" or a "big time game number lottery table") under the condition that a first symbol (such as a "SEVEN RUSH" symbol) is rearranged in the symbol display unit in the free game; and (2) adding a preset number of free game (such as one game) under the condition that a second symbol (such as a "777" symbol) is rearranged in the symbol display unit in the free game.

The game number lottery table includes a plurality of lottery tables (such as the "small time game number lottery table" and the "big time game number lottery table") having the different numbers of adding games of the free game to be assigned thereby, which is stored in a memory (such as a ROM 224 (refer to FIG. 18)). The memory further stores a table lottery table (such as an "adding table") for selecting a lottery table for use in determination of the number of adding games from the plurality of lottery tables. In this case, the controller 222 executes the process including the processes (1-1) and (1-2) described below as the process (1), the processes including the processes of:

(1-1) determining a lottery table from among the plurality of lottery tables based on the table lottery table under the condition that the first symbol is rearranged on the symbol display unit 40 in the free game; and (1-2) determining the number of adding games of the free game using the lottery table determined in the process (1-1).

The plurality of lottery tables includes a first lottery table having a larger expectation value of the number of adding games (such as the big time game number lottery table) and a second lottery table having an expectation value of the number of adding games smaller than that of the first lottery table (such as the small time game number lottery table). The expectation value of the number of adding games contained in the first lottery table is, for example, 19.5 games in the big time game number lottery table shown in FIG. 25, whereas the expectation value of the number of adding games contained in the second lottery table is, for example, 5.6 games in the small time game number lottery table shown in FIG. 25. Of course, the expectation value may be appropriately set for each lottery table.

The table lottery table includes a probability of winning the first lottery table (such as 5%) set lower than a probability of winning the second lottery table (such as 95%). The minimum value of the number of adding games in the first lottery table is set to be higher (such as 15 games) than the maximum value of the number of the adding games in the second lottery table (such as 10 games).

The first symbol is the symbol representing the fact that no payout should be done and more than one free game (such as 5 to 30) is to be added when rearranged in the symbol display unit 40, and the second symbol is the symbol representing the fact that payout should be done (such as 20 credits per one bet) and one free game is to be added when rearranged in the symbol display unit 40.

The symbol display unit 40 is provided with a plurality of reels M3*a* to M3*e* each of which includes a plurality of symbols (such as a "777" symbol, a "FREE GAME" symbol, a "SEVEN RUSH" symbol, and a "BONUS" symbol) put on the outer peripheral surface thereof, and a backlight device M7 that illuminates the reels M3*a* to M3*e* from inside. The emission light color of the backlight device M7 is controlled by the controller 222.

A plurality of symbols put on the reels M3*a* to M3*e* includes a variable symbol CS in which different symbols are displayed in accordance with the emitted light color from the backlight device M7.

In the variable symbol CS, the first symbol (such as the "777" symbol) is displayed when the emission light color of the backlight device M7 is a first emission light color (such as red), and the second symbol (such as the "FREE GAME" symbol) is displayed when the emission light color of the backlight device M7 is a second emission light color (such as green).

The variable symbol CS is composed of a first sheet CS1 having the first symbol (such as the "777" symbol) put thereon, and a second sheet CS2 having the second symbol (such as the "FREE GAME" symbol) put thereon, the first sheet CS1 and the second sheet CS2 being overlapped with each other.

The first sheet CS1 displays the symbol in red when illuminated by the first emission light color, in which an outlined 777 symbol CS12 is formed with no color on a green foundation CS11. A frame part CS12 of the first sheet CS1 is formed in blue.

The second sheet CS2 displays the symbol in green when illuminated by the second emission light color, which is formed so that all of the characters "FREE GAME" become green, which is the same color as the foundation CS1 of the first sheet CS1, when overlapped with the first sheet CS1. A detailed description will be made below on that note. In the first symbol and the second symbol, one is used in the normal game, and the other is used in the game other than the normal game (such as a free game).

Embodiments will be described below with reference to the drawings.

First Embodiment of the Gaming Machine

Mechanical Structure of the Gaming Machine

An overall structure of a gaming machine 10 will be described with reference to FIG. 2.

The gaming machine 10 uses a coin, a bill, or electrical valuable information corresponding thereto as gaming media. In particular, the present embodiment uses credit-related data such as cash data stored in an IC card 500.

The gaming machine 10 is equipped with a cabinet 11, a top box 12 installed at the top of the cabinet 11, and a main door 13 mounted in front of the cabinet 11.

A reel device M1 is provided on the main door 13. A reel cover 134 is provided on the front of the reel device M1. As shown in FIGS. 3 to 6, the reel cover 134 is provided with a transparent panel 1341, a panel frame 1342 including the transparent panel 1341 provided on the front thereof, and a panel support body 1343 for supporting the panel frame 1342. A light irradiation device R1 is provided on the panel support body 1343. The light irradiation device R1 has a transparent panel R11 provided at an opening 1343*a* of the panel support body 1343, and a light source device R12 that emits a visible light 901. A detailed description with regard to the light irradiation device R1 will be made below.

Figure 2:
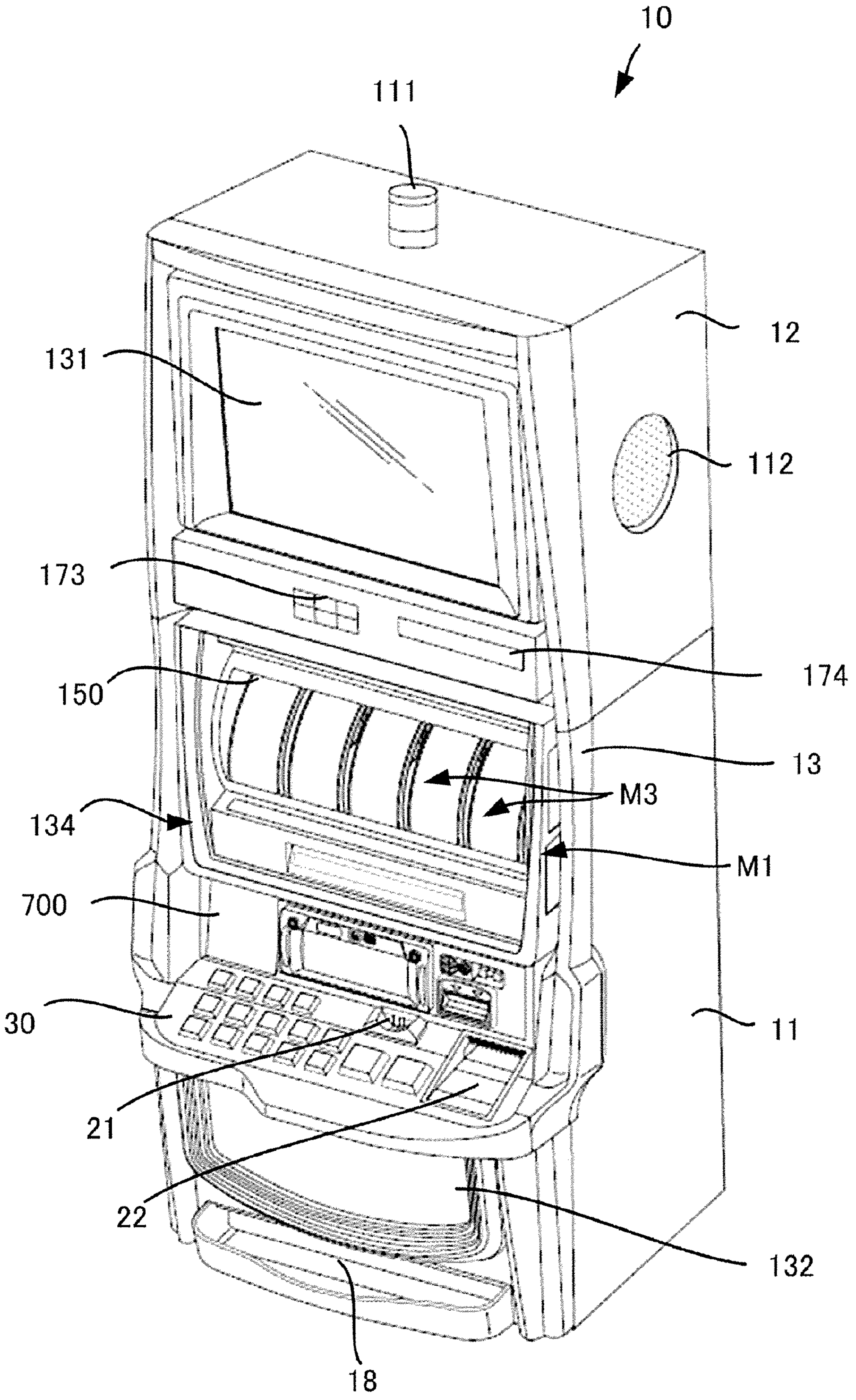
FIG. 2 is a perspective view of a gaming machine.
Figure 3:
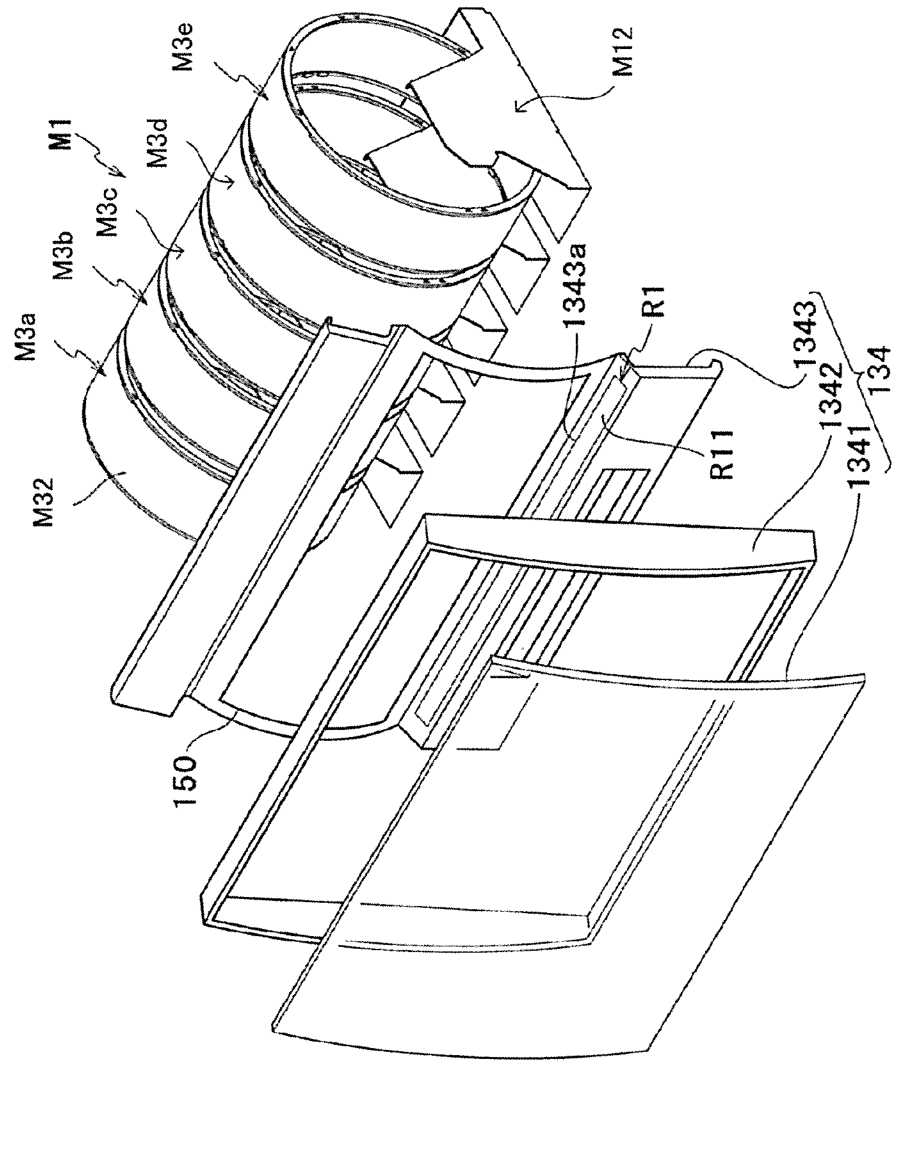
FIG. 3 is an exploded perspective view of a reel unit and a reel cover.
Figure 4:
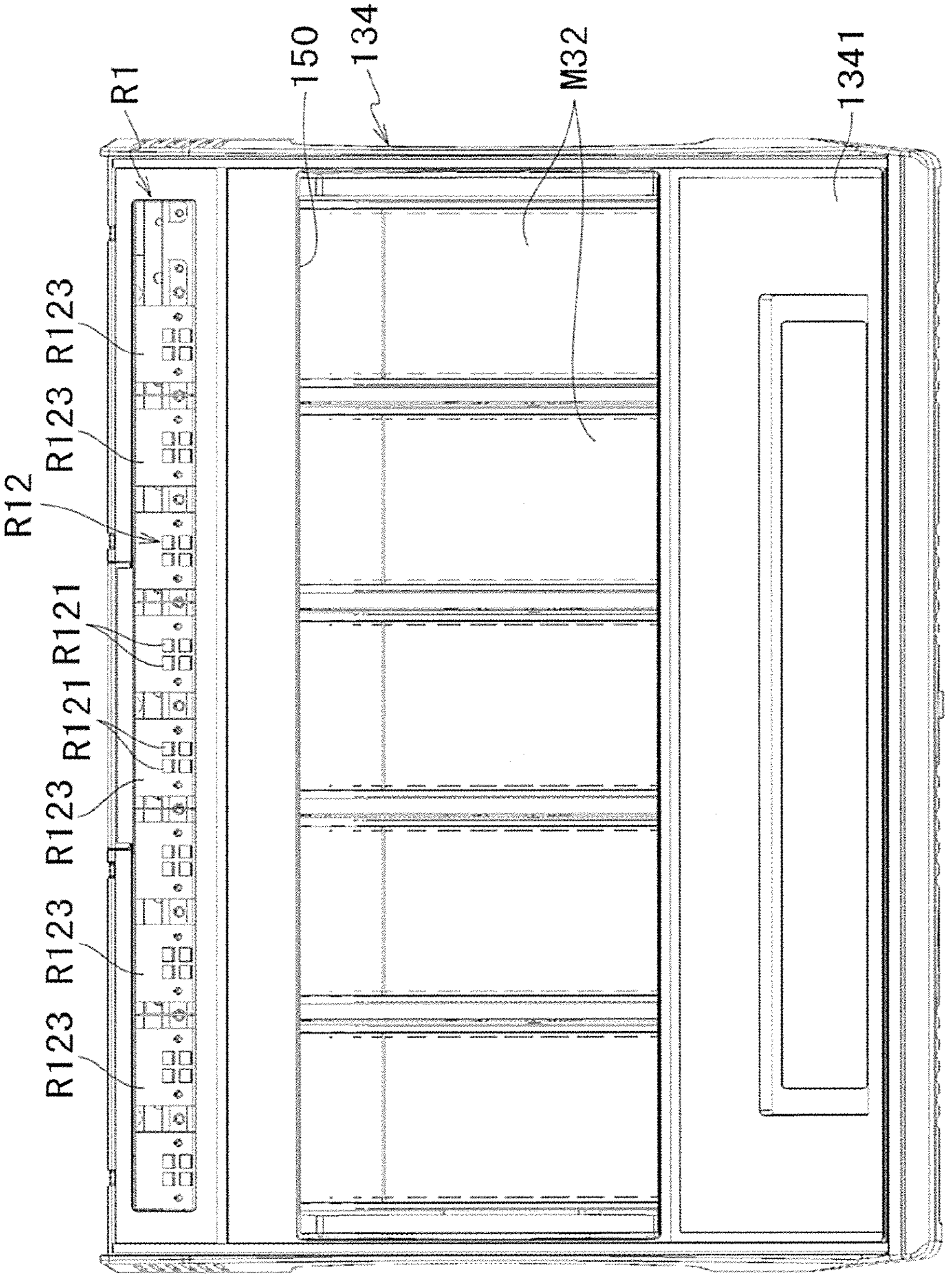
FIG. 4 is a front view of a reel cover.

The reel cover 134 has a display window 150 at the center thereof as shown in FIG. 2. The display window 150 makes 15 symbols 501 with three rows and five columns visible from the outside. Three symbols 501 in each column are a part of a group of symbols arranged on the peripheral surface of each of the reels M3*a* to M3*e*. Each of the reels M3*a* to M3*e* can carry out the rearrangement in which three symbols 501 are moved and displayed upward and downward with changing the speed thereof as a whole, and the displayed symbols 501 are rotated vertically and then stopped.

Although the present embodiment describes the case where the gaming machine 10 is provided with a mechanical-reel type reel device M1, a video reel in which a false reel is displayed may coexist with a mechanical reel in the gaming machine 10 of the present embodiment. Furthermore, the reel cover 134 may be provided with a touch panel. In this case, a player can operate the touch panel to input a variety of instructions. An input signal is transmitted from the touch panel to a main CPU 71. Furthermore, the reel cover may have a transparent liquid crystal panel instead of the transparent panel 1341. When the transparent liquid crystal panel is provided, the effect is feasible in which the symbol of the reel device M1, visible information 902 by means of visible light 901 from the light irradiation device R1, and an effect image by means of the transparent liquid crystal panel are combined.

A backlight device M7 is arranged inside of the reel device M1. A detailed description regarding the backlight device M1 will be made below with reference to FIG. 7.

A control panel 30 is arranged on the lower side of the reel device M1. The control panel 30 is provided with various buttons, a coin entry 21 for receiving a coin into a cabinet 11, and a bill entry 22.

Figure 8:
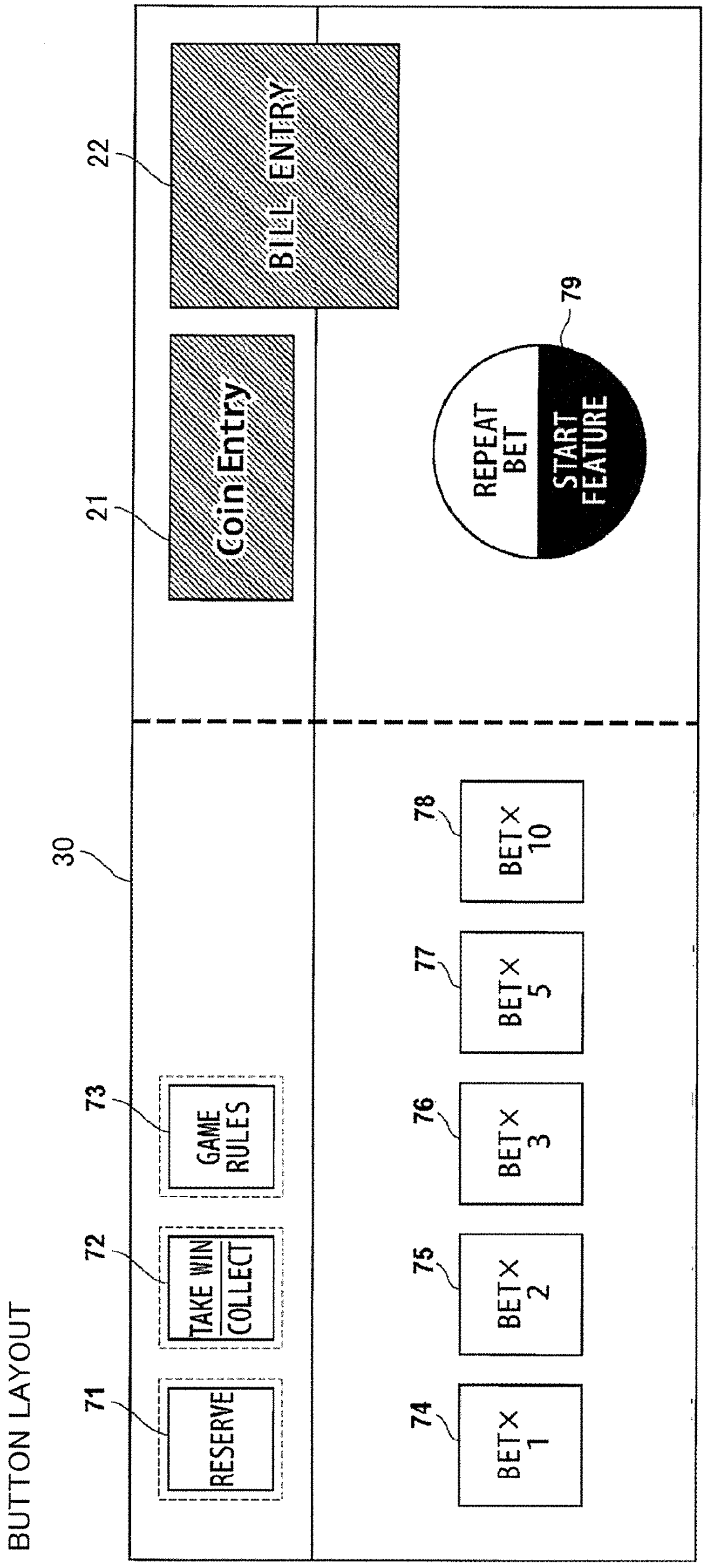
FIG. 8 is a schematic diagram showing a layout of buttons of a control panel of the gaming machine shown in FIG. 2.

Specifically, as seen in a part of the control panel 30 that is schematically shown in FIG. 8, the control panel 30 is provided with a "RESERVE" button 71, a "COLLECT" button 72, a "GAME RULES" button 73, a "1-BET" button 74, a "2-BET" button 75, a "3-BET" button 76, a "5-BET" button 77, and a "10-BET" button 78. The "RESERVE" button 71, the "COLLECT" button 72, and the "GAME RULES" button 73 are provided on an upper left area of the control panel 30. The "1-BET" button 74, the "2-BET" button 75, the "3-BET" button 76, the "5-BET" button 77, and the "10-BET" button 78 are provided on a lower left area of the control panel 30. Also, the "START" button 79 is provided on the lower center area of the control panel 30.

The "RESERVE" button 71 is used when the player temporarily leaves the seat or when the player wants to ask a staff of the game facility to exchange money, etc. Also, the "RESERVE" button 71 can be used to store credits remaining in an IC card inserted into the IC card reader 60. The "COLLECT" button 72 is used to instruct the gaming machine 10 to pay out credited coins to a coin tray 92. The "GAME RULES" button 73 is used when the player is not acquainted with game rules or operation method. When the "GAME RULES" button 73 is pressed, various types of help information is displayed on a video display unit 110.

The "BET" buttons 74 to 78 are used to set the betting amount. Each time the "1-BET" button 74 is pressed, one credit among the current credits owned by the player is bet for each of the active pay lines. When the "2-BET" button 75 is pressed, the game starts on condition that two credits are bet for each of the active pay lines. When the "3-BET" button 76 is pressed, the game starts on condition that three credits are bet for each of the active pay lines. When the "5-BET" button 77 is pressed, the game starts on condition that five credits are bet for each of the active pay lines. When the "10-BET" button 78 is pressed, the game starts on condition that ten credits are bet for each of the active pay line. The "START" button 79 is used to instruct the initiation of spinning the reels M3*a* to M3*e* under the betting condition that is set in advance.

As shown in FIG. 2, on a lower front face of the main door 13, i.e., at the lower part of the control panel 30, there are provided a coin receiving opening 18 for receiving a coin, and a belly glass 132 on which a character of the gaming machine 10 is painted.

An upper side image display panel 131 is provided on the front surface of the top box 12. The upper side image display panel 131 is composed of a liquid crystal panel, which constitutes a display. The upper side image display panel 131 displays the image for the effect, and the image showing the introduction of contents of the game and the explanation of rules. Furthermore, the top box 12 is provided with a speaker 112 and a lamp 111. The gaming machine 10 executes the effect by displaying the image, outputting the sound and outputting a ray of light.

A data display unit 174 and a key pad 173 are provided in the lower part of the upper image display unit 131. The data display unit 174 is composed of a luminescent displayer LED and the like, and is for displaying data relating to a member that is read from the IC card 500 inserted by way of a PTS terminal 700, and data input by a player via the key pad 173. The key pad 173 is used for inputting data.

(Reel Device M1)

The reel device M1 provided in the gaming machine 10 has the structure for supporting the plurality of reels M3*a* to M3*e* in the horizontal direction so that they have collinear rotation axis, as shown in FIGS. 3 to 6. More specifically, the reel device M1 has a reel assembly M11 which rotationally drives the reels M3*a* to M3*e*, each of which has symbols arranged on the outer peripheral surface thereof, to rearrange the symbols, and a reel unit holding mechanism M12 for detachably holding the reel assembly M11. In addition, in the description below, the reel assemblies will be referred to as first to fifth reel assemblies M11*a* to M11*e* in order from front to back when the installed location of each reel assembly M11 should be specified.

The reel assembly M11 has the reels M3*a* to M3*e* each of which has the symbol 501 aligned on the outer peripheral surface thereof, and the reel supporting mechanism M6 for supporting the reels M3*a* to M3*e*. Each of the reels M3*a* to M3*e* has a circular reel belt M32 on which more than one symbols is aligned.

Figure 9:
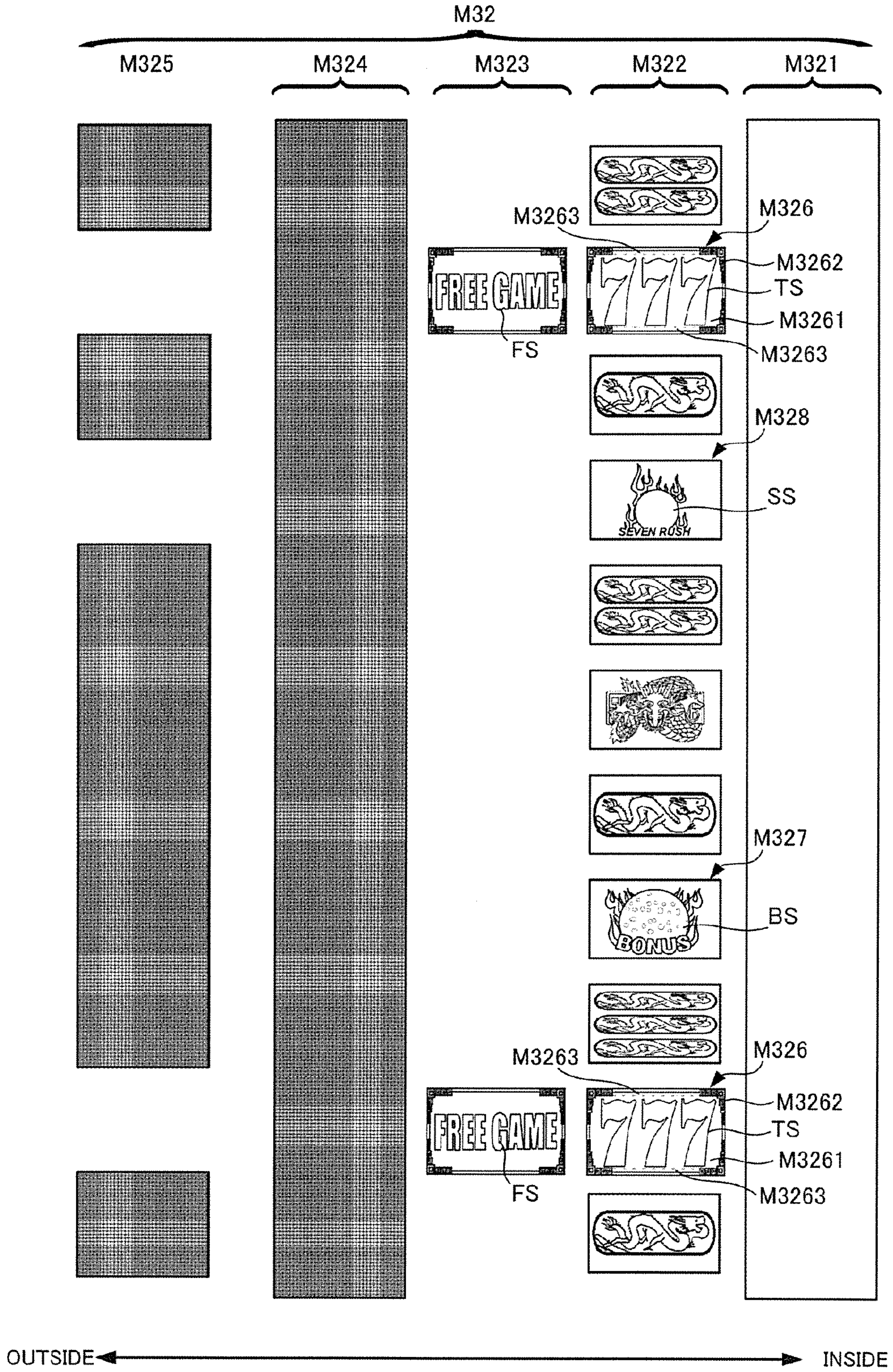
FIG. 9 is a plan view showing a reel belt in an exploded fashion.
Figure 10:
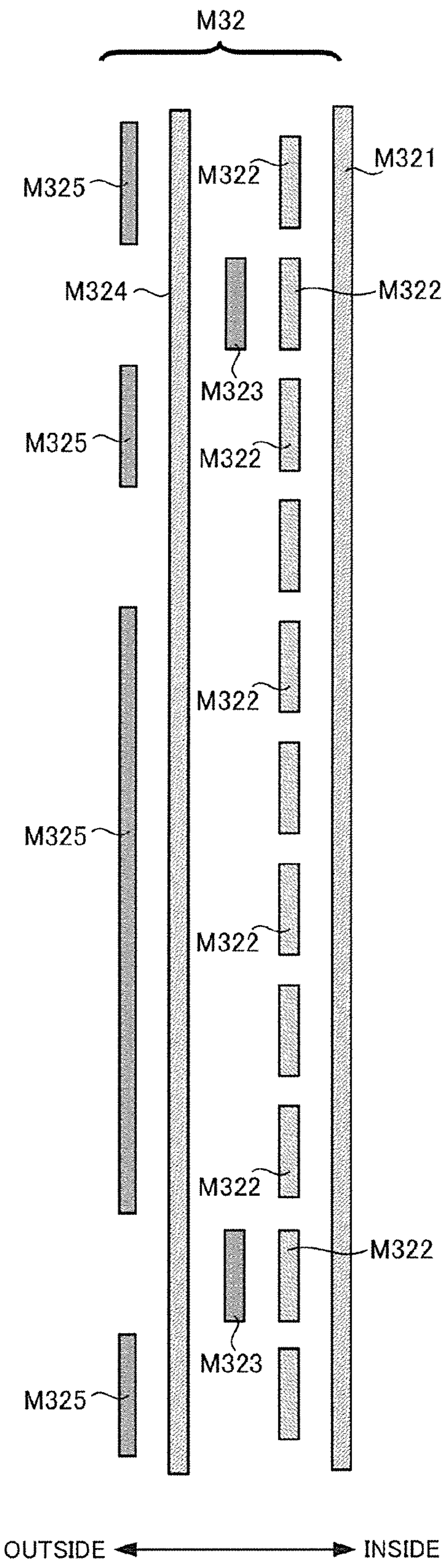
FIG. 10 is a cross sectional view showing a reel belt in an exploded fashion.

As shown in FIGS. 9 and 10, the reel belt M32 is composed of a plurality of symbol sheets M322, a plurality of symbol sheets M323, a half mirror layer 324, and a smoke layer M325 which are laminated on a base layer M321 in this order. The reel belt M32 may be provided with a protection layer on the outer surface.

The symbol sheets M322 and M323 are the sheets with a predetermined color on which a symbol is printed.

The plurality of symbol sheets M322 includes a three seven symbol sheet M326, a BONUS symbol sheet M327, a SEVEN RUSH symbol sheet M328 and a dragon-type symbol.

As shown in FIG. 9, the three seven symbol sheet M326 out of the symbol sheets M322 corresponds to the first symbol sheet CS1 (refer to FIG. 1), in which an outlined "777" symbol (a three seven symbol TS) is formed with no color on a foundation M3261. Although the outlined "777" number symbol is formed with no color, it may be formed as a part with slightly whitish color. The foundation M3261 is formed in translucent green and blue. More specifically, at least a part of the foundation M3261, namely a vertical region M3263 the foundation M3261 which is in the vicinity of the frame part M3262 and along the frame M3262 is formed in blue. Of course, a horizontal region along the frame part M3262 may be formed in blue. Furthermore, the other part of the foundation M3261, i.e., the region around the "777" number symbol is formed in green. The region around the "777" number symbol corresponds to the region in the FREE GAME symbol sheet M323 in which the letters "FREE GAME" are formed when the symbol sheet M322 is overlapped with the FREE GAME symbol sheet M323 described below. In the three seven symbol sheet M323 described above, the "777" number symbol (a three seven symbol TS) is displayed in red when red light is irradiated by the backlight device M7 described below (refer to FIG. 4).

On the other hand, the plurality of symbol sheets M323 (two sheets in the present embodiment) is the FREE GAME symbol sheet constituting a free game symbol FS. The symbol sheet M323 corresponds to the second symbol sheet CS2 (refer to FIG. 1), which is arranged to be overlapped with the three seven symbol sheet M326 as shown in FIGS. 11A and 11B.

Figure 11A:
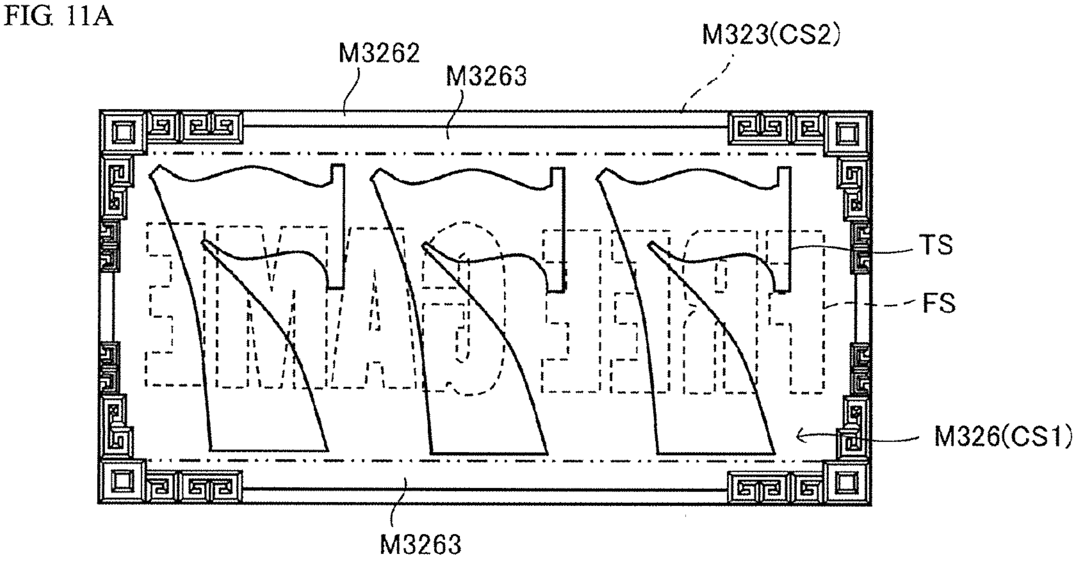
FIG. 11A is a front view showing the status in which a symbol sheet (a 777 symbol sheet) and a free game symbol sheet are overlapped with each other.

As shown in FIG. 11A, in the state where the three seven symbol sheet M326 and the FREE GAME symbol sheet M323 are overlapped with each other, the FREE GAME symbol FS arranged on the front side is clearly visible when viewed from the front side (a player's side), and the free seven symbol TS arranged behind thereof is invisible or almost invisible.

Figure 11B:
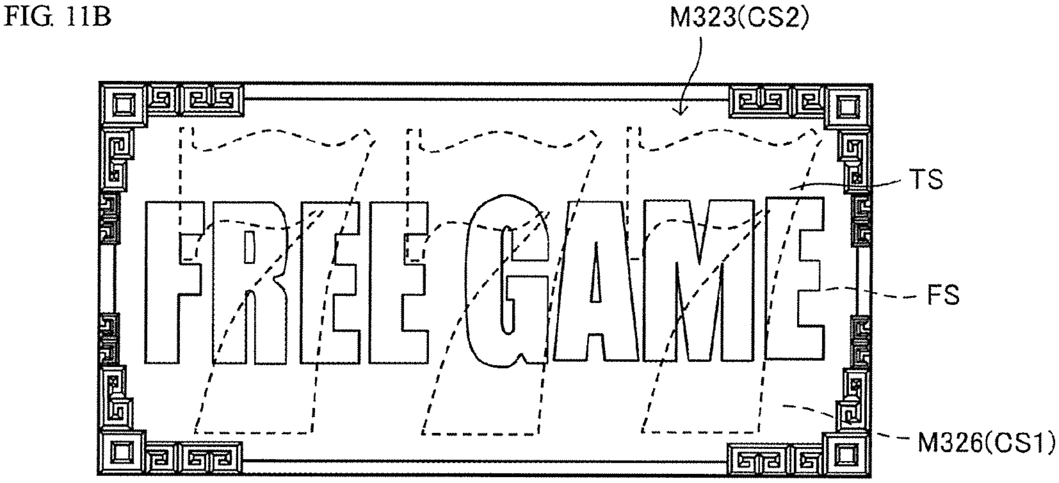
FIG. 11B and FIG. 11C are back views thereof.

On the other hand, as shown in FIG. 11B, the free seven symbol TS arranged at the inner side is clearly visible when viewed from the back side (inside of the reel), and the FREE GAME symbol FS arranged at the outer side is invisible or almost invisible.

Figure 11C:
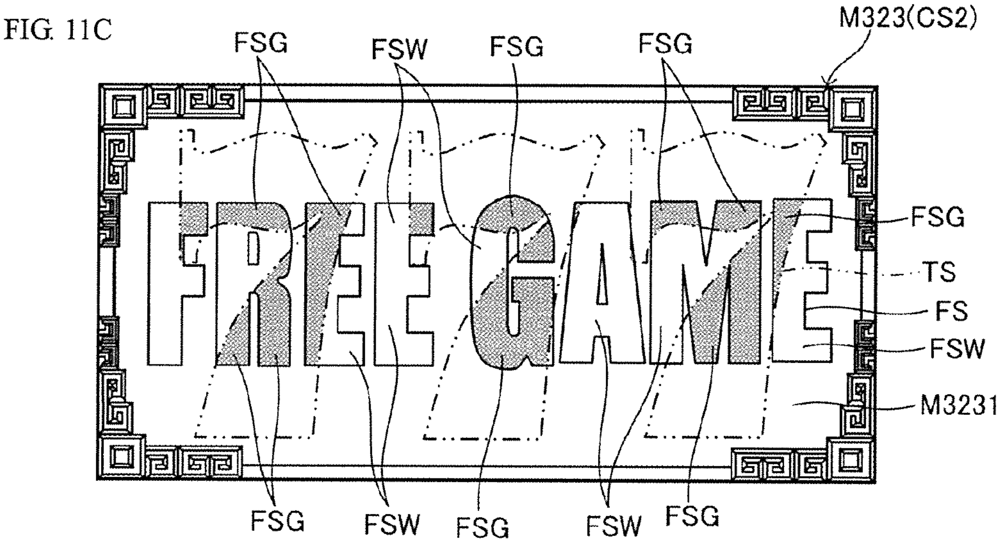

As shown in FIG. 11C, in the FREE GAME symbol sheet M323, the other part of the foundation M3231 than, for example, the letter symbol "FREE GAME" is formed in translucent red. The letter symbol (the FREE GAME symbol FS) includes a transparent part FSW having the translucency, and a green part FSG having the translucency that is the same color as the foundation M3261 of the three seven symbol sheet M326. The green part FSG is the part indicated by cross hatching in FIG. 11C, which corresponds to the number symbol (the three seven symbol TS) of the three seven symbol sheet M326. Here, if the letter symbol free game symbol FS is entirely formed to be transparent, only the part of the FREE GAME symbol FS that overlaps with the foundation M3261 of the three seven symbol sheet M326 is green. Then, a green part FSG is formed on the FREE GAME symbol sheet M323, so that the FREE GAME symbol FS can be entirely green, the same color as the foundation M3261 of the three seven symbol sheet M326, when overlapping the FREE GAME symbol sheet M323 with the symbol sheet M322. In the three seven symbol sheet M326 described above, the letter symbol "FREE GAME" (the FREE GAME symbol FG) is displayed in green when green light is irradiated by the backlight device M7 described below (refer to FIG. 7).

Furthermore, when red light or green light is irradiated by the backlight device M7 described below (refer to FIG. 7) while the FREE GAME symbol sheet M323 and the symbol sheet M322 are overlapped with each other, the visibility of the symbol can be enhanced thanks to the vertical region M3263 formed in blue along the frame part M3262 of the three seven symbol sheet M326. More specifically, the blue part becomes a shadowed region that a player recognizes as being black when green light or red light is irradiated by the backlight device M7, so that the symbol sheet M326 and the boundary of M326 (the frame of the symbol) are defined, thereby enabling the visibility of the symbol to be enhanced.

Of course, instead of forming the frame M3262 of the three seven symbol sheet M326 in blue, the frame part of the FREE GAME symbol sheet M323 may be formed in blue, both the FREE GAME symbol sheet M323 and the three seven symbol sheet M326 may be formed in blue.

Figure 39A:
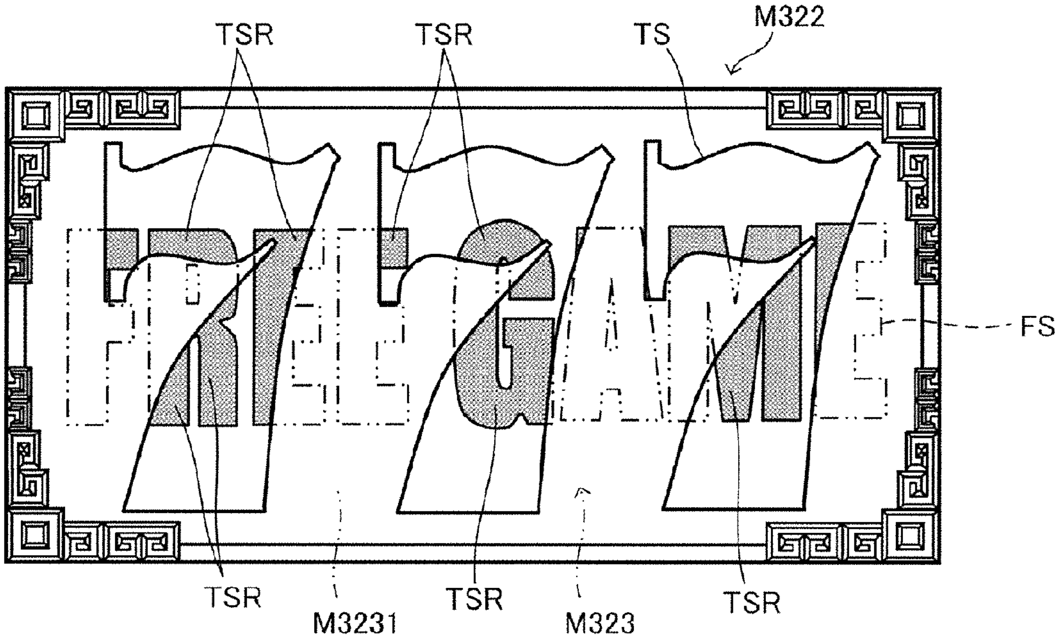
FIG. 39A is a plan view for explaining a modification of the symbol sheet (the 777 symbol sheet)

Furthermore, instead of providing the green part FSG in the letter symbol (the FREE GAME symbol FS) of the FREE GAME symbol sheet M323, the part TSR (cross-hatching part) overlapped with the letter symbol of the FREE GAME symbol sheet M323 (the FREE GAME symbol FS) may be formed in red having the translucency, which is the same color as the foundation M3231 of the FREE GAME symbol sheet M323, with regard to the number symbol (the three seven symbol TS), as shown in FIG. 39A. In this case, the number symbol (the three seven symbol TS) is entirely in red when the FREE GAME symbol sheet M323 and the three seven symbol sheet M326 are overlapped with each other.

Figure 12A:
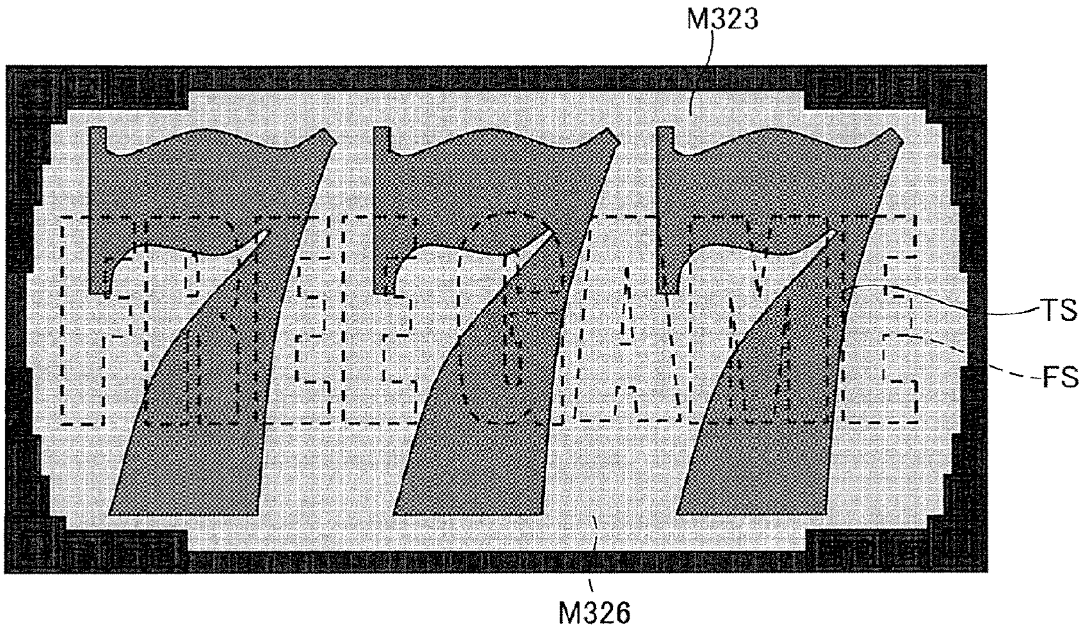
FIG. 12A shows the status in which three seven symbols are displayed.
Figure 12B:
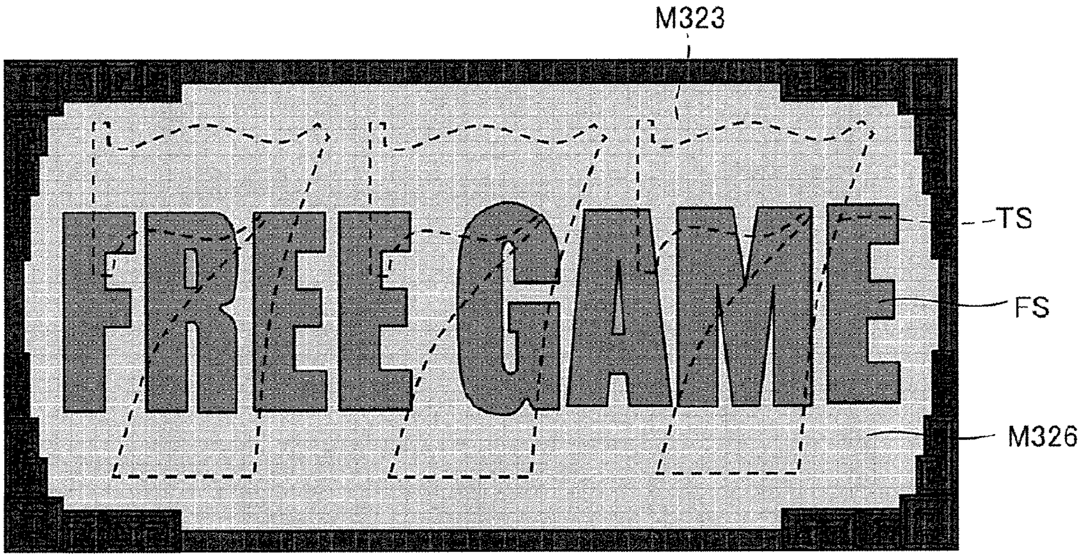
FIG. 12B shows a free game symbol.

As shown in FIGS. 12A and 12B, the reel belt M32 is structured so as to be able to selectively display any of the letters "FREE GAME" (the FREE GAME symbol FS) and the number symbol "777" (the three seven symbol TS) by controlling the backlight device M7 by means of a controller 222 described below to select the irradiation light from the backlight device M7 to be green or red.

Here, FIG. 12A shows the state where red light is irradiated to display the three seven symbol TS in red, whereas FIG. 12B shows the state where green light is irradiated to display the FREE GAME symbol FS in green. The three seven symbol TS is displayed in a free game described below, whereas the FREE GAME symbol FS is displayed in a normal game described below.

Figure 39B:
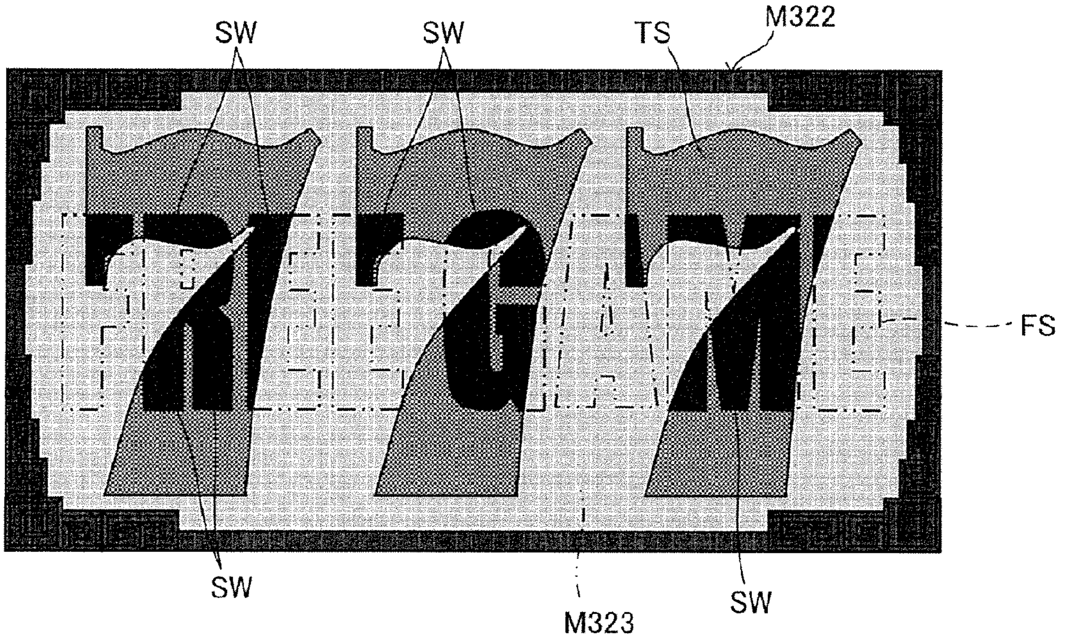
FIG. 39B is a plan view showing the status in which the three seven symbols are displayed.

In addition, when the FREE GAME symbol sheet M323 and the symbol sheet M322 are overlapped with each other, a part SW (a black painted part in figure) of the number symbol “777” part (the three seven symbol TS) that is overlapped with the letters “FREE GAME” (the FREE GAME symbol FS) is displayed in green because the green part provided in part of the letter symbols “FREE GAME” of the FREE GAME symbol sheet M323 is located in front thereof, as shown in FIG. 39B. Furthermore, the rest of the part of number symbol “777” other than the SW is the region in which red color of the FREE GAME symbol sheet M323 overlaps with the part of the three seven symbol sheet M326 which is transparent with no color. Then, it is structured that the FREE GAME symbol sheet M323 and a part of the green part of the symbol sheet M322 are slightly overlapped with each other at the outline part of the number of the number symbol “777”.

In the present embodiment, the color arrangement and superimposing structure as described above is employed with regard to the FREE GAME symbol sheet M323 and the symbol sheet M322. Therefore, when red light is irradiated from inside of the reel belt M32 so as to visibly display the three seven symbol TS, the green part of the “777” number symbol that is not the red part may not be able to be recognized as the region of the number symbol, similar to the state where the FREE GAME symbol becomes invisible due to the overlapped part SW being green. In actuality, however, the symbols do not become impossible to be recognized or almost invisible because the letters are missing as shown in FIG. 12A.

As described above, it is possible to reduce the effect in which a part thereof seems to be missing and cannot be recognized to be exerted on the green part of the number symbol “777” (the three seven symbol TS) described above. It is because of the adjustment of intention of amount of red light of the backlight, as well as the fact that the overlapped green part of the front and back sheets M322 and M323 constitutes the outline part of the three seven symbol TS when the part of the three seven symbol TS is composed of the other color (green in the case of the three seven symbol TS) which may be impossible to be distinguished from the color for displaying the region of the symbol itself (red in the case of the three seven symbol TS).

Furthermore, the other reason may be the effect of the size and the position of overlapping. More specifically, a missing symbol that is likely to be displayed is made larger than the other symbols, and the other symbol is overlapped with the larger symbol at the center part thereof.

Therefore, the structure of the present embodiment does not produce the state in which no color is displayed in the overlapped part SW of the 7 symbol or the 7 symbol cannot visibly be seen in the symbol to be actually viewed by a player, so that it becomes hardly noticeable whether no color is displayed as shown in FIG. 12A.

Of course, it may be appropriately selected which of the three seven symbol TS or the FREE GAME symbol FS is displayed. Furthermore, the method may be employed in which the three seven symbol TS and the FREE GAME symbol FS are displayed by switching them alternately.

The half mirror layer M324 reflects light irradiated form an illumination device R1 described below (refer to FIGS. 4 to 6), and the reflected light makes it possible to display an image on the reels M3a to M3e. The half mirror layer M324 is structured to pass the light from the backlight device M7 (refer to FIGS. 4 and 15) and to reflect light from the illumination device R1 (refer to FIGS. 4 to 6).

Figure 13A:
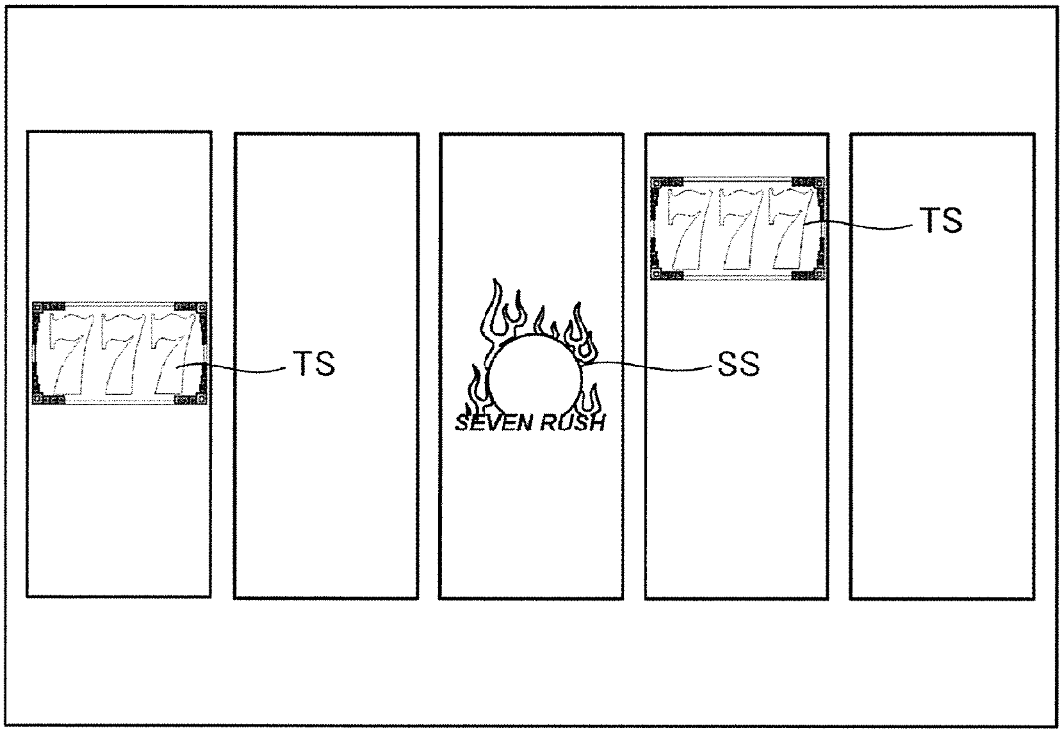
FIGS. 13A and 13B are front views showing the status in which a specific symbol is displayed prominently.

The smoke layer M325 is for making a specific symbol more noticeable than the other symbols. In the reel belt M32 shown in FIGS. 9 and 10, the smoke layer M325 is formed at the part in which the three seven symbol TS and the FREE GAME symbol FS are overlapped with each other, and the part except for the SEVEN RUSH symbol SS. Therefore, in the reel belt M32, for example, the three seven symbol TS and the SEVEN RUSH symbol SS can be made noticeable compared with the other symbols, as shown in FIG. 13A. As described below, since the three seven symbol TS and the SEVEN RUSH symbol SS play an important role in the free game, the symbols TS and SS are made noticeable in the free game.

Figure 13B:
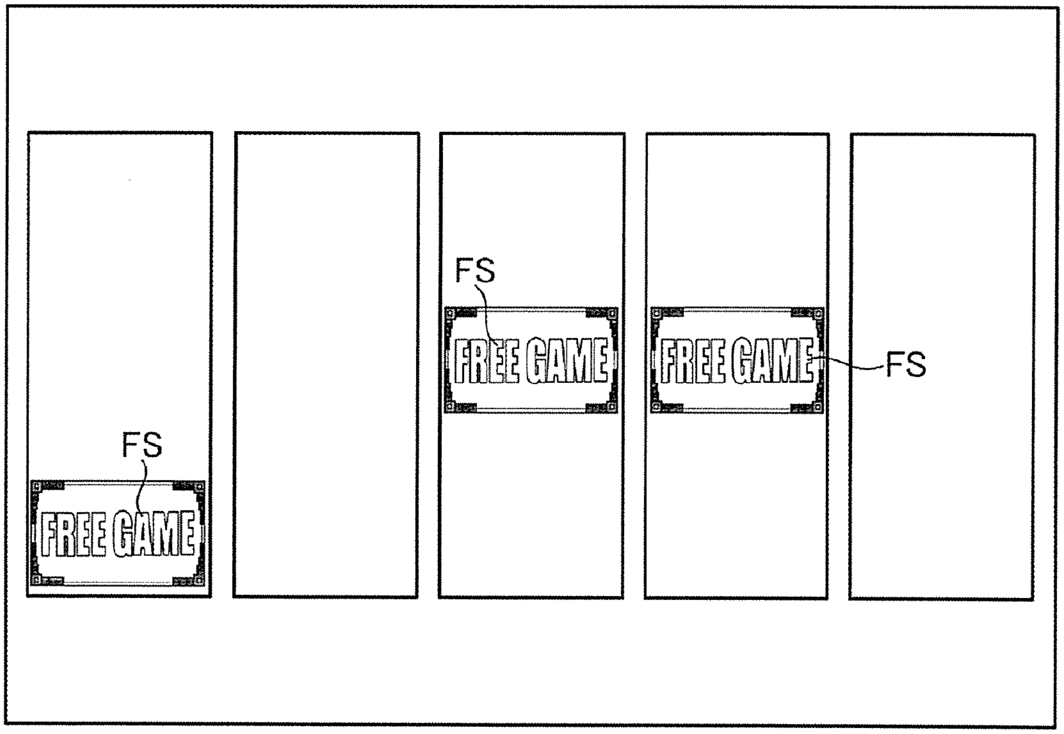

On the other hand, the smoke layer M325 is not formed at the part in which the three seven symbol TS and the FREE GAME symbol FS are overlapped with each other, so that the FREE GAME symbol FS can be made more noticeable than the other symbols, as shown in FIG. 13B. As described below, since the FREE GAME symbol FS plays the important role in the normal game, the FREE GAME symbol FS is made noticeable in the normal game.

Of course, the three seven symbol TS and the SEVEN RUSH symbol SS, or the symbols except for the FREE GAME symbol FS may be structure to be made noticeable. Furthermore, the way of making a specific symbol noticeable is not limited to the method using the smoke layer, but the other method may be used. In addition, in the present embodiment, a modification example of the method for making a specific symbol will be described below with reference to FIGS. 35 to 38.

The structure of the reel belt M3 is not limited to that shown in FIGS. 9 and 10, but the structure in which a transmission limiting layer and a diffusion layer are provided on the front surface and back surface of the base layer M321.

The transmission limiting layer is to avoid passing too much amount of light. The transmission limiting layer is made of a white sheet having a slight transparency, for example, and is located between the half mirror layer M324 and the diffusion layer if the diffusion layer is provided.

The diffusion layer is the sheet for diffusing the light that is shaped into the symbol. The diffusion layer may be composed of a single layer or a plurality of layers.

Figure 14A:
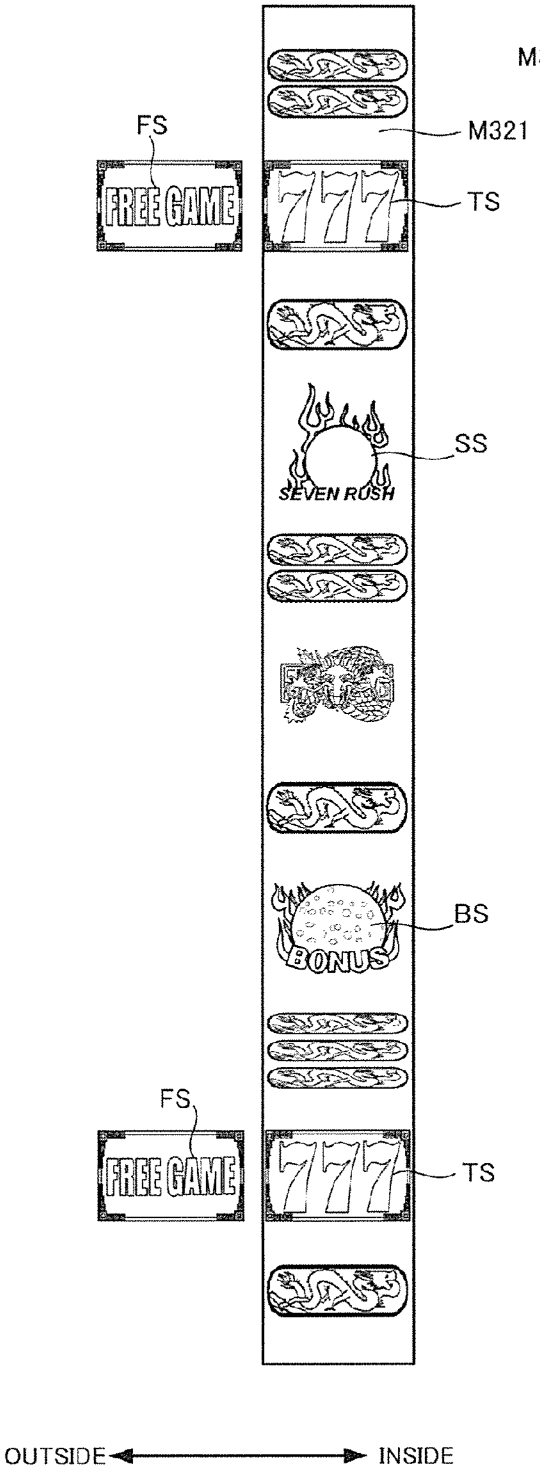
FIGS. 14A and 14B are explanatory views showing the other example in which the FREE GAME symbol and the three seven symbols are overlapped on the reel belt.
Figure 14B:
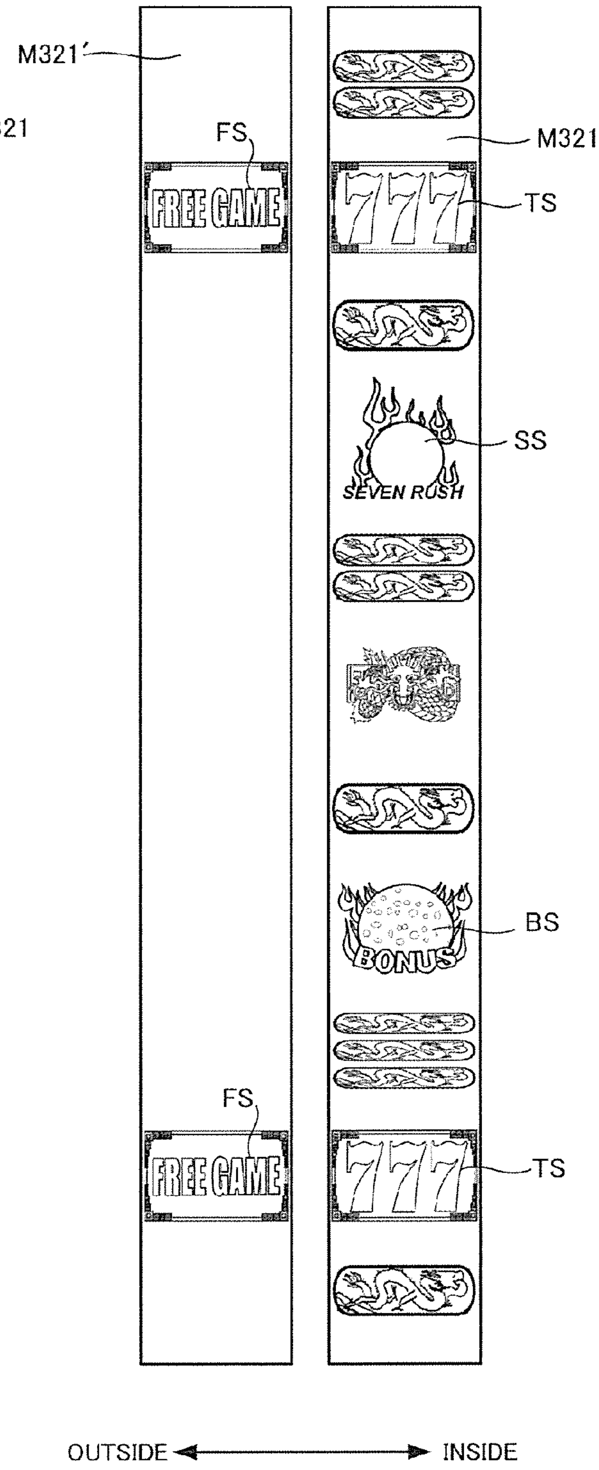

The structure in which the three seven symbol TS and the FREE GAME symbol FS are overlapped with each other in the reel belt M3 is not limited to that shown in FIGS. 9 and 10, but can be changed as shown in FIGS. 14A and 14B, for example.

In the example shown in FIG. 14A, the symbol corresponding to the plurality of symbol sheets M322 may be fabricated on the base layer M321. In this case, each of the symbols is formed by printing them on the base layer M321. Of course, a sheet of the FREE GAME symbol FS may be formed and stuck on the base layer M321 while fabricating the three seven symbol TS on the base layer M321.

In the example shown in FIG. 14B, the base layers M321 and M321' may be stuck with each other while fabricating the symbol corresponding to the plurality of symbol sheets M322 on the base layer M321 and fabricating the three seven symbol TS on the other base layer M321'.

(Reel Assembly M11: Backlight Device M7)

Figure 5:
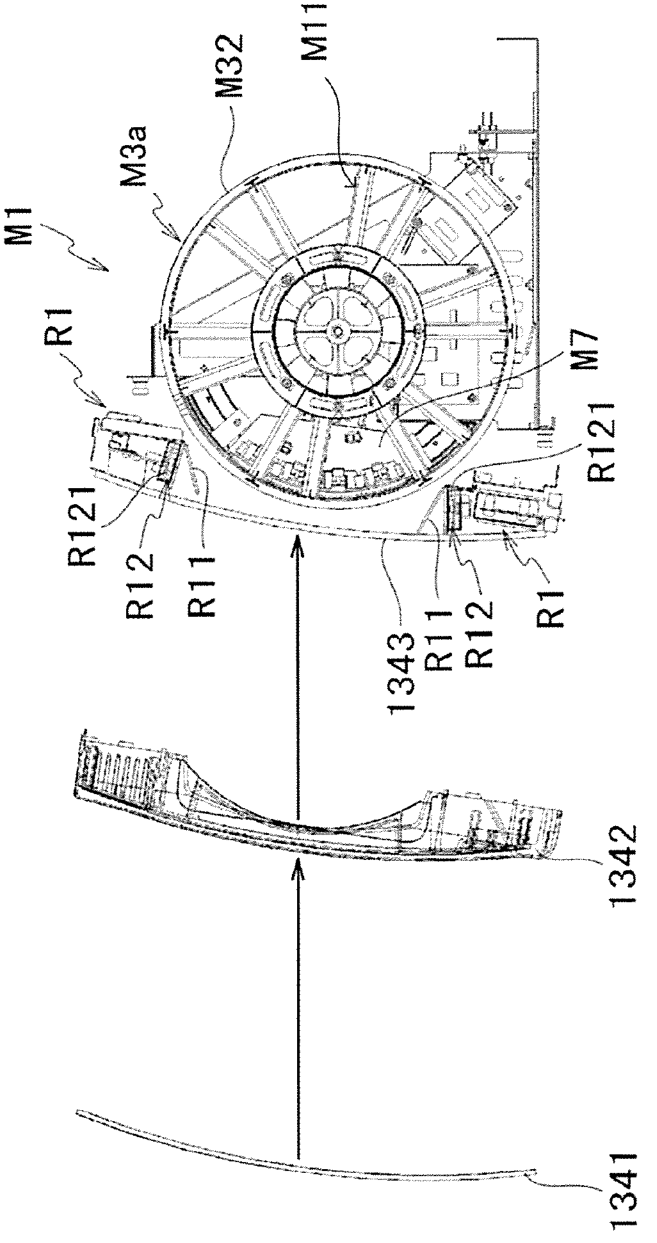
FIG. 5 is an exploded perspective view of a reel unit and a reel cover.

As shown in FIG. 5, the backlight device M7 is provided at the inner peripheral side of the reels M3*a* to M3*e* structured as described above. The backlight device M7 is provide so that illumination light is emitted from the inner peripheral side of the reels M3*a* to M3*e* in the direction of the reel belt M32, and the illumination light passed through the reel belt M32 is visible from outside of the gaming machine 10. Thus, a player recognizes the symbol 501 as being displayed on the reel belt M32.

Figure 7:
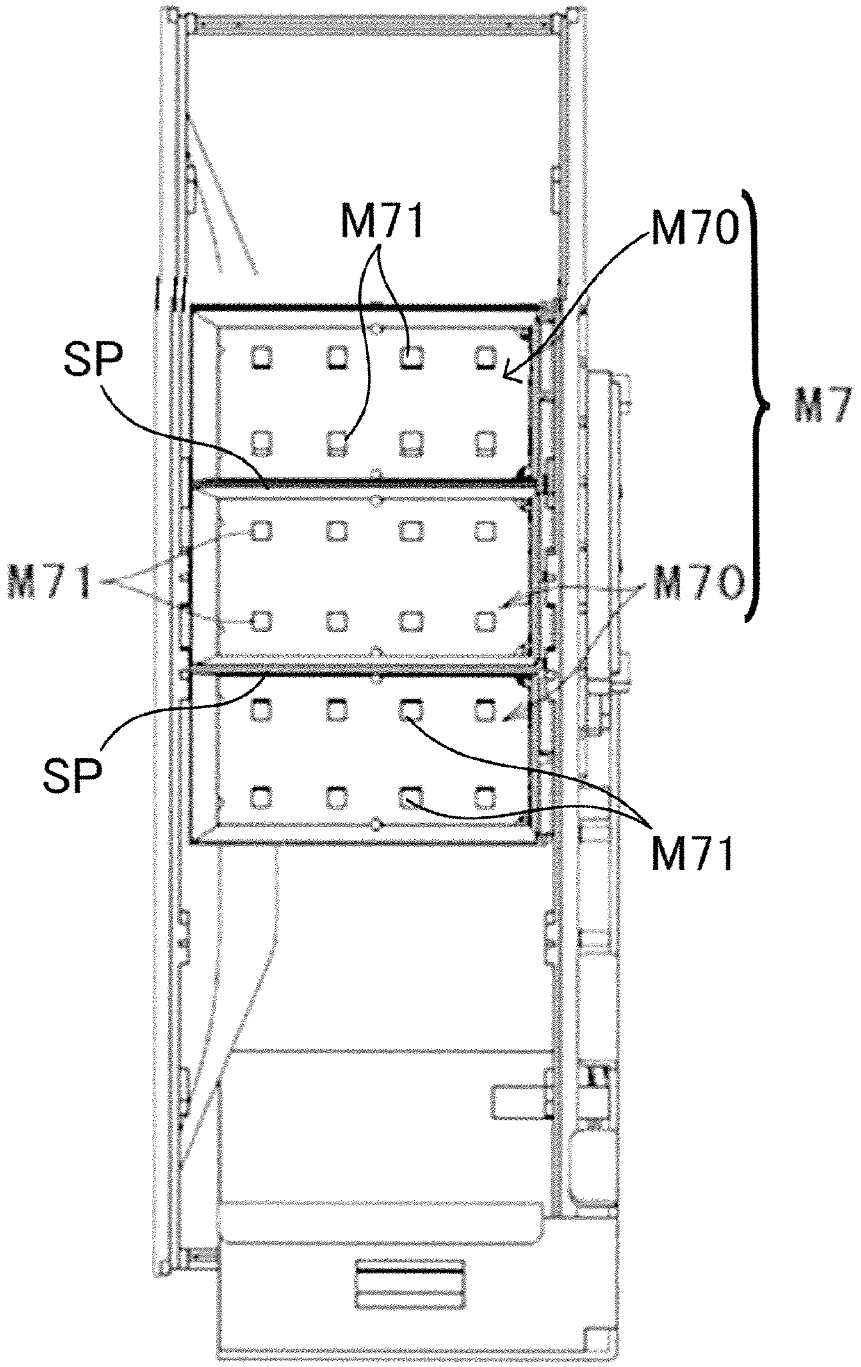
FIG. 7 is a front view showing a part of a backlight device.

The backlight device M7 is provided for corresponding to each of the reels M3*a* to M3*e*, which is not accurately shown in the figure. As shown in FIG. 7, the backlight device M7 includes a unit composed of a plurality of modules M70 (three in the present embodiment) in which a plurality of light source devices M71 is arranged in matrix. Each of the light source devices M71 is a full-color LED in which a red LED element capable of emitting red light, a blue LED element capable of emitting blue light, and a green LED element capable of emitting green light are packaged. In each of the light source devices M71, the main CPU 222 controls the lighting and extinguishing of the red LED element, the blue LED element, and the green LED element, and the individual amount of light at the time of lighting for each LED element. More specifically, the light source device M71 can form a visible light with an arbitrary color by adjusting the amount of light of each of the LED elements.

For example, the three seven symbol TS is displayed in red by receiving the irradiation with red light, and the FREE GAME symbol FS is displayed in green by receiving the irradiation with green. Therefore, each of the light source devices M71 controls the light emission status so as to light the red LED element and extinguish the other LED elements when displaying the three seven symbol TS, and so as to light the green LED element and extinguish the other LED elements when displaying the FREE GAME symbol FS.

(Irradiation Light Device R1)

As shown in FIGS. 4 to 6 and 15, the irradiation light device R1 for emitting visible information 902 toward each of the reels M3*a* to M3*e* of the reel device M1 is arranged. The irradiation light device R1 is arranged at the upper position and the lower position of the reel device M1 that is provided with the plurality of reels M3*a* to M3*e*. Thus, the irradiation light device R1 is arranged at the position out of the line of sight region in which a player can visibly recognize the reels M3*a* to M3*e* from outside of the cabinet 11 through a display window 150. The irradiation light device R1 makes it possible to carry out the effect in the display window 150 by reflected light of the visible light 901 irradiated on each of the reels M3*a* to M3*e*, as in the case of carrying out the effect in the display window 150 by means of the transparent liquid crystal panel and a half mirror arranged in front of the reels M3*a* to M3*e*. Therefore, the irradiation light device R1 makes it possible to carry out the effect in the display window 150 without saving the space for arranging the transparent liquid crystal panel and the like in front of each of the reels M3*a* to M3*e*.

In addition, the irradiation light device R1 may be arranged at least one of the upper position and the lower position of the reel device M1. More specifically, the irradiation light device R1 may be structured to be arranged in the outer side region of at least one of the upper position and the lower position relative to the display window 150, and to emit the visible light 901 that is longer than the width of all of the reels M3*a* to M3*e* supported by the reel device M1.

The irradiation light device R1 is also provided in the reel cover 134 that acts as the front wall on the side of the display window 150. The irradiation light device R1 and the reel cover 134 are combined as a single unit. Therefore, the irradiation light device R1 can be attached simultaneously with the attachment of the reel cover 134 to the cabinet 11.

In addition, the irradiation light device R1 is set to emit the visible light 901 on the surface of the reel device M1. In other words, it is set to emit the visible light 901 to the region at the side of non-effective range except for the effective range of the symbol 501.

More specifically, the irradiation light device R1 has a translucent panel R11 (a translucent member) provided at the opening 1343*a* of the panel support body 1343, and the light source device R12 that emits the visible light 901. The translucent panel R11 is tinted so as to form visible information 902 with a predetermined color by passing the visible light 901 therethrough. The translucent panel R11 has substantially same dimension as the width of the reel device M1. Furthermore, the light source device R12 is formed to emit the visible light 901 across the entire width of the translucent panel R11.

Figure 6:
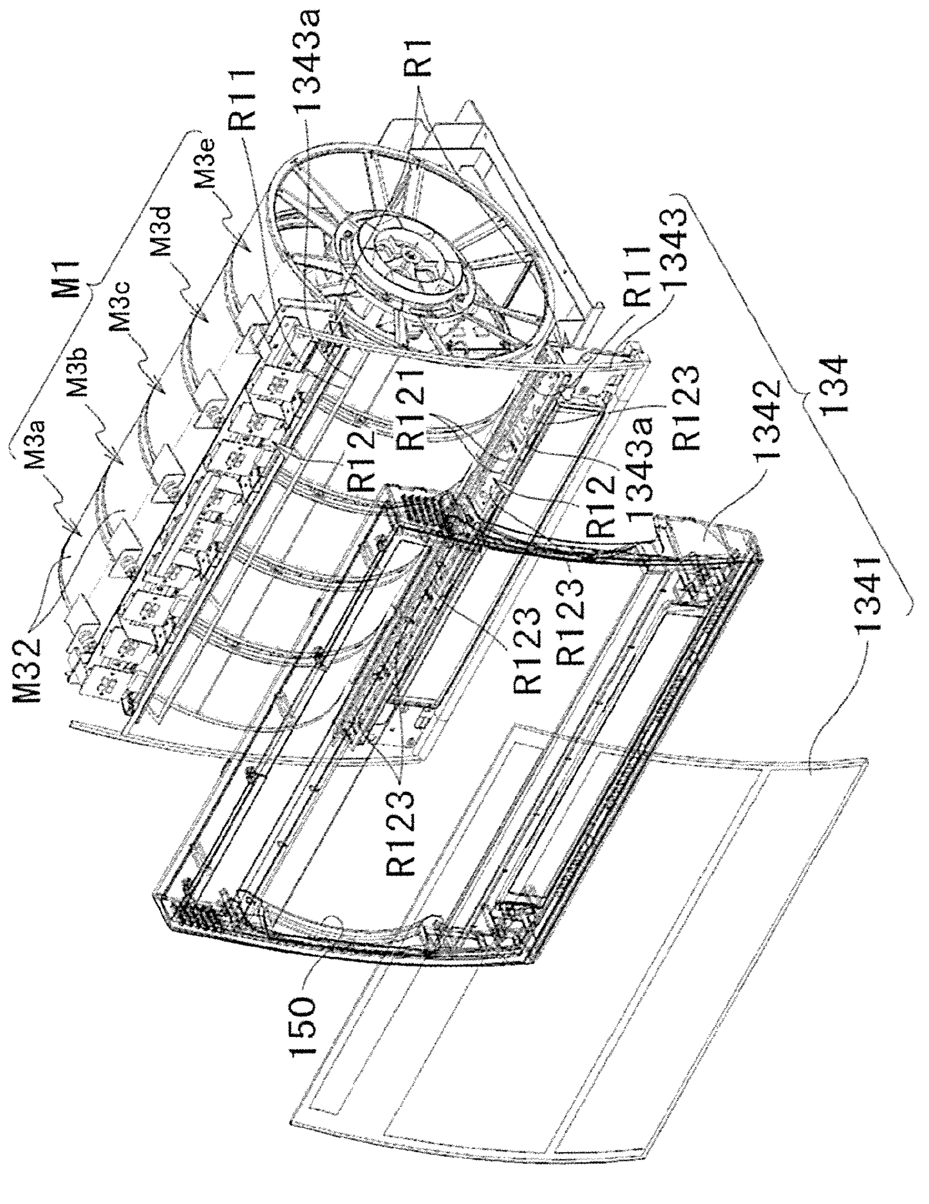
FIG. 6 is an exploded perspective view of a reel unit and a reel cover.

The light source device R12 has a plurality of full-color LEDRs 121, which is the structure similar to that of the light source device M71 of the backlight device M7. These full-color LEDRs 121 are aligned in the width and depth directions to form a matrix. More specifically, as shown in FIG. 6, the light source device R12 is structured so that an LED unit R123 is provided in which two pairs of four full-color LEDRs 121 aligned in two rows and two columns are arranged in the direction of the width of the reel belt M32, and the LED unit R123 is arranged to correspond to each of the reels M3*a* to M3*e*. Thus, the control of the position of lighting the full-color LEDs makes it possible to adjust the position of emitting light to the reel device M1.

Figure 15:
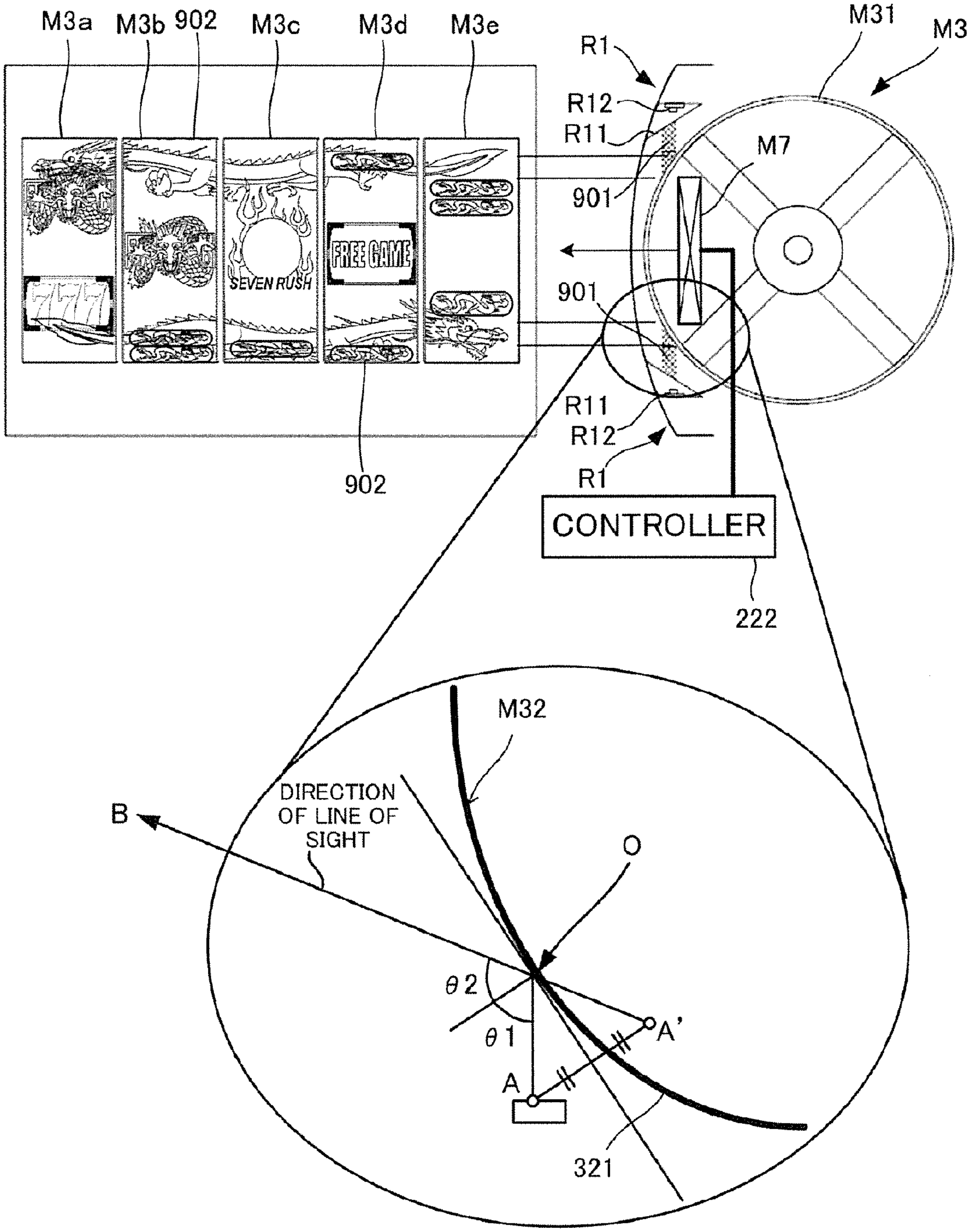
FIG. 15 is an explanatory view of the way of displaying the effect utilizing the reel.

The light source device R12 selectably emits the visible light 901 that is a complementary color to the tint of the translucent panel R11, and the visible light 901 which has a color other than that complementary color. More specifically, if the translucent panel R11 is tinted red, the visible light 901 in green that is a complementary color to red and the visible light 901 in red other than green are selectably emitted. Thus, the irradiation light device R1 switches the visible light 901 with the complementary color and the visible light 901 with the color other than the complementary color, so that it is possible to disable or enable the showing of the visible information 902 (a picture of a dragon) on the reels M3*a* to M3*e* as shown in FIG. 15.

In addition, the light source device R12 of the present embodiment makes it possible to easily form the visible light 901 with the color as being the complementary color and the visible light 901 with the color other than the complementary color by means of a single full-color LED. However, it is not limited to the full-color LED, but it can be formed by an LED with a single color for outputting the visible light 901 with the complementary color and an LED with a single color for outputting the visible light 901 with the color other than the complementary color.

(Depth Display by the Irradiation Light Device R1)

The irradiation light device R1 structured as described above is arranged at the position out of the line of sight region in which a player can visibly recognize the reels M3*a* to M3*e* from outside of the cabinet 11 through a display window 150, so that it is possible to display the depth of the visible information 902.

A detailed description will be made with regard to displaying the depth based on the FIG. 15. The term "viewing"

to a player refers to the visible light 901 that is irradiated on and reflected from an object and then enters into a player's eyes. Here, the visible light 901 has the property of traveling in a straight line if there is no obstacle. Then, if there is any obstacle, the visible light 901 is reflected by the obstacle. The reflection follows the rule of reflection in which an angle of incident θ1 and an angle of incident θ2 are same as each other.

In the present embodiment, the visible light 901 is reflected by the half mirror layer M324 of the reel belt M32. Accordingly, the symbol 501 of the reel belt M32 is viewed by means of the reflected light of the visible light 901 reflected at the reel belt M32.

On the other hand, the visible information 902 of the visible light 901 is viewed over a route described below because the half mirror layer M324 is a mirror. More specifically, a point A', which is symmetric with a point A where the visible information 902 is formed, is drawn with respect to a tangent of the reels M3*a* to M3*e* at the position where the visible light 901 is reflected. That is, the reflection of an image appears at A'. Then, the symmetric point A' is connected with a position of a player's point of view B reached by a ray of light. Then, the straight line connecting the symmetric point A' and the position of point of view B is connected with an intersection point O of the reels M3*a* to M3*e*, and thus the visible light 901 is reflected at the intersection point O to reach the position of point of view B.

At that time, since a player seeing the incoming visible light 901 does not recognize the visible light 901 as entering into his/her eyes after being reflected at the point O, and assumes that the light travels straight to his/her eyes, the visible information 902 seems to be displayed at the position of the point A' in the depth side.

Thus, in the case where the visible information 902 is displayed at the position of the symbol upon viewing the symbol 501 of the reels M3*a* to M3*e* from outside of the cabinet 11 through the window 150, since the visible information 902 is the reflection light of the visible light 901 from the irradiation light device R1 which is arranged at the position out of the direction of line of sight, the visible information is viewed to be arranged at the position in the direction of line of sight (the depth side) extending into the inner peripheral side of the reel by the distance from the position of the symbol to the position where the irradiation light device R1 is arranged.

In addition, the reel belt M32 of the reel device M1 may have a blank symbol as one of the symbols 501. In this case, the irradiation light device R1 is structured to display the visible information 902 by irradiating the visible light 901 in the region for forming the blank symbol, so that the visible information 902 can be formed on the reel belt M32 in addition to the symbol 501 of the reel belt M32. Therefore, it is possible to drastically change and increase the design of the reel belt M32 and the types of the symbol 501.

Figure 16A:
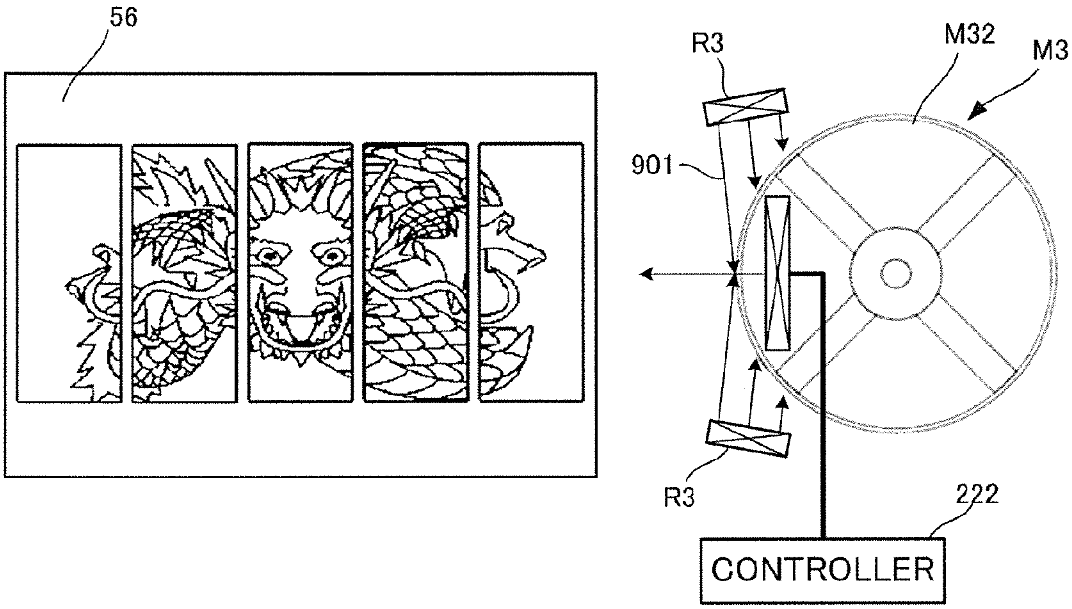
FIG. 16A is a schematic diagram for explaining the other example of the way of displaying the effect utilizing the reel.
Figure 16B:
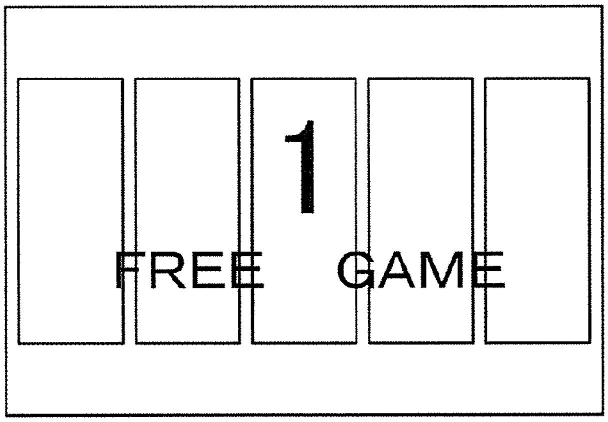
FIG. 16B is a schematic diagram for explaining the other example of the way of displaying.

Furthermore, as shown in FIG. 16A, the visible light 901 may be irradiated by the irradiation light device R3 on the region of the reel belt M32 which is visible from the display window 56 so as to display an image within the whole of the visible region. In this case, the image may be the symbol put on the reel belt M32, whereas the number of free games which is added in the free game may be displayed as shown in FIG. 16B, for example.

Figure 17A:
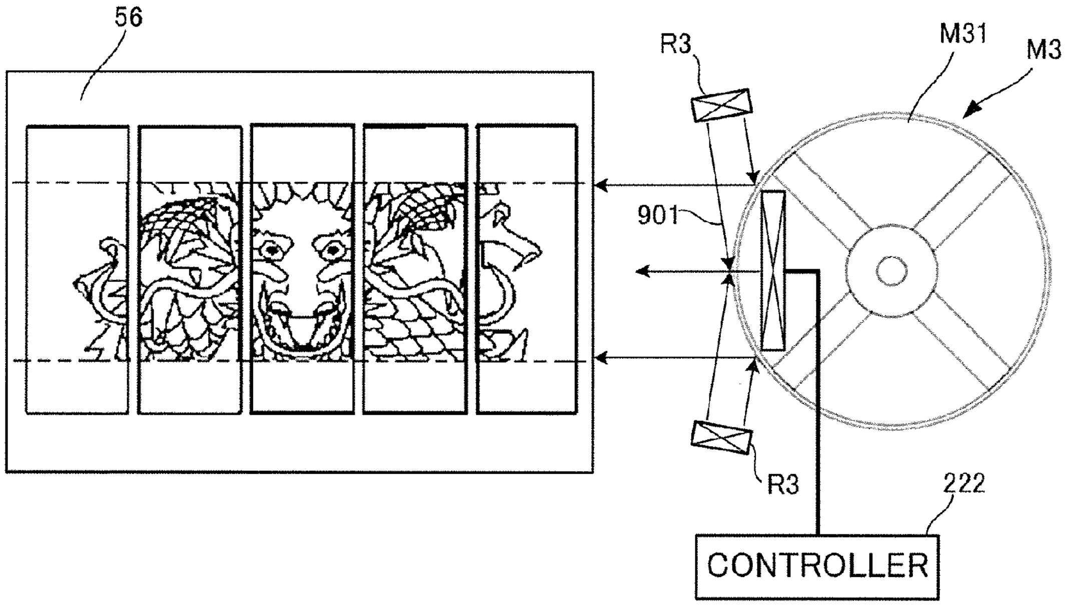
FIG. 17A is a schematic diagram showing for explaining the other example of the way of displaying the effect utilizing the reel.
Figure 17B:
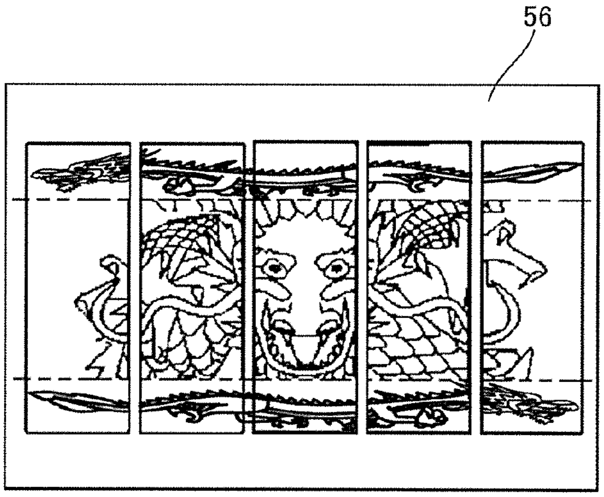
FIG. 17B is a schematic diagram for explaining the other example of the way of displaying.

As shown in FIG. 17A, the irradiation light device R3 may emit the visible light 901 to the central part of the region in the reel belt M32 that is visible from the display window 56 so as to display an image within the whole of the visible region. In this case, the image may be displayed by using the different illumination devices R1 and R3 for the central part and the vertical end part in the region that is visible from the display window 56, along with the illumination device R1 shown in FIG. 15, as shown in FIG. 17B.

[Electrical Configuration of the Slot Machine]

Figure 18:
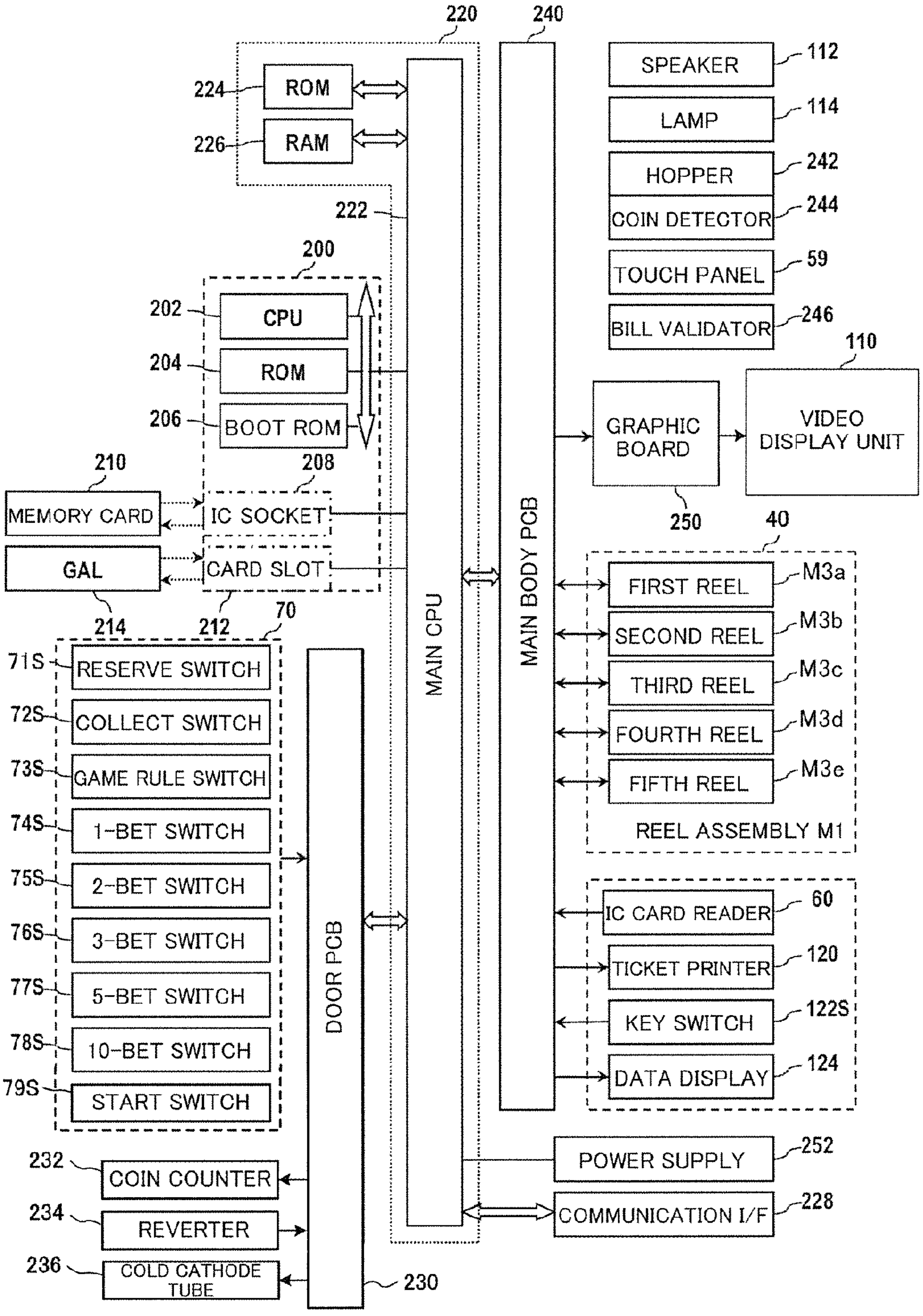
FIG. 18 is an electrical block diagram of the gaming machine shown in FIG. 2.

FIG. 18 is an electric block diagram of the gaming machine 10 shown in FIG. 2. The gaming machine 10 includes a game board 200, a motherboard 220, a door PCB 230, and a main body PCB 240.

A game board 200 includes a CPU 202, a ROM 204 accessible from the CPU 202 through an internal bus, and a boot ROM 206 accessible from the CPU 202 by an internal bus. The game board 200 includes an IC socket 208 which can accommodate a memory card 210 and communicate therewith, and a card slot 212 provided corresponding to a Generic Array Logic (GAL) 214.

The memory card 210 includes a non-volatile memory and stores a game program and a game system program.

The IC socket 208 is configured to be removably attached by the memory card 210. The IC socket 208 is connected to a motherboard 220 by an IDE bus. The game executed in the gaming machine 10 can be changed by replacing the memory card 210 with another one. The game executed in the gaming machine 10 also can be changed by withdrawing the memory card 210 from the IC socket 208, writing another program into the memory card 210, and then inserting the memory card 210 into the card slot 208 again.

The GAL 214, which is a type of a Programmable Logic Device (PLD) having a fixed OR array structure, has a plurality of input ports and output ports. Upon receiving a predetermined data through the input ports, the GAL 214 outputs data corresponding to the input data through the output ports.

The card slot 212 is configured in such a manner that the GAL 214 can be inserted into the card slot 212 or detached from the IC socket 212, and is connected to the motherboard 220 by a PCI bus.

The CPU 202, the ROM 204, and the boot ROM 206 interconnected by the internal bus are connected to the motherboard 220 by the PCI bus. The PCI bus enables signal transmission between the motherboard 220 and the game board 200, and supply of power from the motherboard 220 to the game board 200.

The ROM 204 stores a program. The boot ROM 206 stores a preliminary authentication program, a boot code to be used by the CPU 202 for activating the preliminary authentication program, and the like. The authentication program is a falsification check program for authenticating that the game program and the game system program are legitimate. The preliminary authentication program is a program for authenticating that the authentication program is legitimate. The authentication program and the preliminary authentication program are written in a process of verifying that the program of interest is not falsified.

A commonly available main board is used as the motherboard 220, and thus the motherboard 220 executes the game program and the game system program. The motherboard 220 includes a main CPU 222, a ROM 224, a RAM 226, and a communication interface 228.

The ROM 224 is a memory device for storing a program to be executed by the main CPU 222, and is maintained permanently along with the other data, like BIOS. The ROM 224 may be a flash memory. The BIOS program initializes peripheral devices when executed by the main CPU 222. Also, the BIOS program loads the game program and the game system program stored in the memory card 210 through the game board 200. The ROM 224 may be rewritable. However, write-protected one might be used as the ROM 224 as well.

The RAM 226 stores data and programs which are used while the main CPU 222 is in operation. For example, when the game program, the game system program, or the authentication program is to be loaded, the RAM 224 can store such programs. Also, the RAM 226 is provided with working space for the execution of the programs. For example, the space stores the number of bets, the payout amount, the credit amount, etc., which are maintained during the execution of the game. Also, a plurality of tables for defining symbols, symbol codes, winning combinations, and their probabilities is maintained during the execution of the game. Further, the RAM 226 stores a symbol code determination table. The symbol code determination table stores mapping information between symbol codes and random number which are used for determining symbols based on random numbers. In particular, the RAM 226 maintains a mode flag along with a game counter. The mode flag is the flag indicating the game mode. The game counter is the count value indicating the number of unit games which has already been executed in the chance mode or the number of remaining unit games in the chance mode.

Also, the RAM 226 stores count values of a plurality of counters. The plurality of counters include a bet counter, a payout amount counter, a credit amount counter, and a chance mode game counter which counts the number of unit games in the chance mode. In addition, some of the count values may be maintained in an internal register of the main CPU 222.

The main CPU 222 communicates with an external controller through a communication interface 228. The external controller includes, for example, a server connected through a communication channel (not shown).

The motherboard 220 is connected to the door PCB 230 and the main body PCB 240. The motherboard 220 can communicate by means of USB with the door PCB 230 and the main body PCB 240. The motherboard 220 is connected to a power supply 252. The main CPU 222 of the motherboard 220 boots up and operates using the power supplied from the power supply 252. The motherboard 220 passes a part of power to the game board 200 through the PCI bus so as to boot up the CPU 202. The door PCB 230 and the main body PCB 240 are connected to an input device. The input device includes a switch, a sensor, and peripheral devices of which operation are controlled by the main CPU 222. The door PCB 230 is connected with a control panel 70, a coin counter 232, a reverter 234, and a cold cathode tube 236.

The control panel 70 has a reserve switch 71S, a collect switch 72S, a game rule switch 73S, a 1-BET switch 74S, a 2-BET switch 75S, a 3-BET switch 76S, a 5-BET switch 77S, a 10-BET switch 78S, and a start switch 79S, each of which is provided corresponding to various buttons 71-79. Upon detecting the fact that the various buttons 71 to 79 are pressed, each of the switches 71S to 79S outputs a signal to the main CPU 222.

The coin counter 232 and the reverter 234 are provided in the coin insertion unit 80. The coin counter 232 determines whether or not the coin inserted into coin insertion unit 80 is legitimate in terms of material, shape, or the like. The coin counter 232 outputs a signal to the main CPU 222 if detecting a legitimate coin. The coins which are determined as being illegitimate are discharged to the coin tray 92. The reverter 234 operates based upon a control signal from the main CPU 222. The reverter 234 distributes the coins that are determined by the coin counter 232 as being legitimate into either a hopper 242 or a cash box (not shown). The coins are guided into the hopper 242 when the hopper 242 is not filled with coins. Contrarily, the coins are guided into the cash box when the hopper 242 is filled with coins.

The cold cathode tube 236 is provided on the rear surface of the video display unit 110. The cold cathode tube 236 functions as a backlight as well as lights based on a control signal from the main CPU 222.

The main body PCB 240 is connected to the speaker 112, the lamp 114, the hopper 242, a coin detector 244, the touch panel 59, a bill validator 246, the reel assembly M1, the IC card reader 60, a graphic board 250, the ticket printer 120, a key switch 122S, and the data display 124.

The lamp 114 is turned on/off based upon a control signal from the main CPU 222. The speaker 112 outputs a sound such as BGM based upon the control signal from the main CPU 222.

The hopper 242, which operates based upon a control signal from the main CPU 222, pays out the designated payout amount of coins to the coin tray 92 through a coin payout outlet (not shown) formed between the lower glass part 90 and the coin tray 92. The coin detector 244 detects coins paid out from the hopper 242 to output a detection signal to the main CPU 222.

The touch panel 59 detects a position touched by the player, and then provides the main CPU 222 with a position detection signal corresponding to the detected position. Upon detection of a legitimate bill, the bill validator 246 provided in the bill insertion unit 82 provides the main CPU 222 with a bill detection signal corresponding to the bill amount.

The graphic board 250 controls both the video display unit 110 and the display panel 58 of the symbol display unit 40 corresponding to a control signal from the main CPU 222. The graphic board 250 includes a Video Display Processor (VDP) for generating video data, and a video RAM for temporarily storing the video data. The video data may be generated from the game program stored in the RAM 224.

The IC card reader 60 reads out data stored in the IC card inserted into the IC card socket 208 to provide the read-out data to the main CPU 222. The IC card reader 60 writes the data supplied to the main CPU 222 into the ID card.

The ticket printer 120 prints on a ticket the barcode containing information of the credit amount stored in the RAM 226, date and time, the identification number of the gaming machine 10, and the like, corresponding to the control signal from the main CPU 222 in order to output the barcoded ticket.

The key switch 122S, which is provided behind the keypad 122, outputs a key detection signal to the main CPU 222 when the keypad 122 is pressed by the player.

The data display 124 displays information on the information that is input through the keypad 122 corresponding to a control signal from the main CPU 222.

The main body PCB 240 is electrically connected to the reel assembly M1. The reel assembly M1 includes the first to fifth reels M3*a* to M3*e* as mentioned above.

Figure 19:
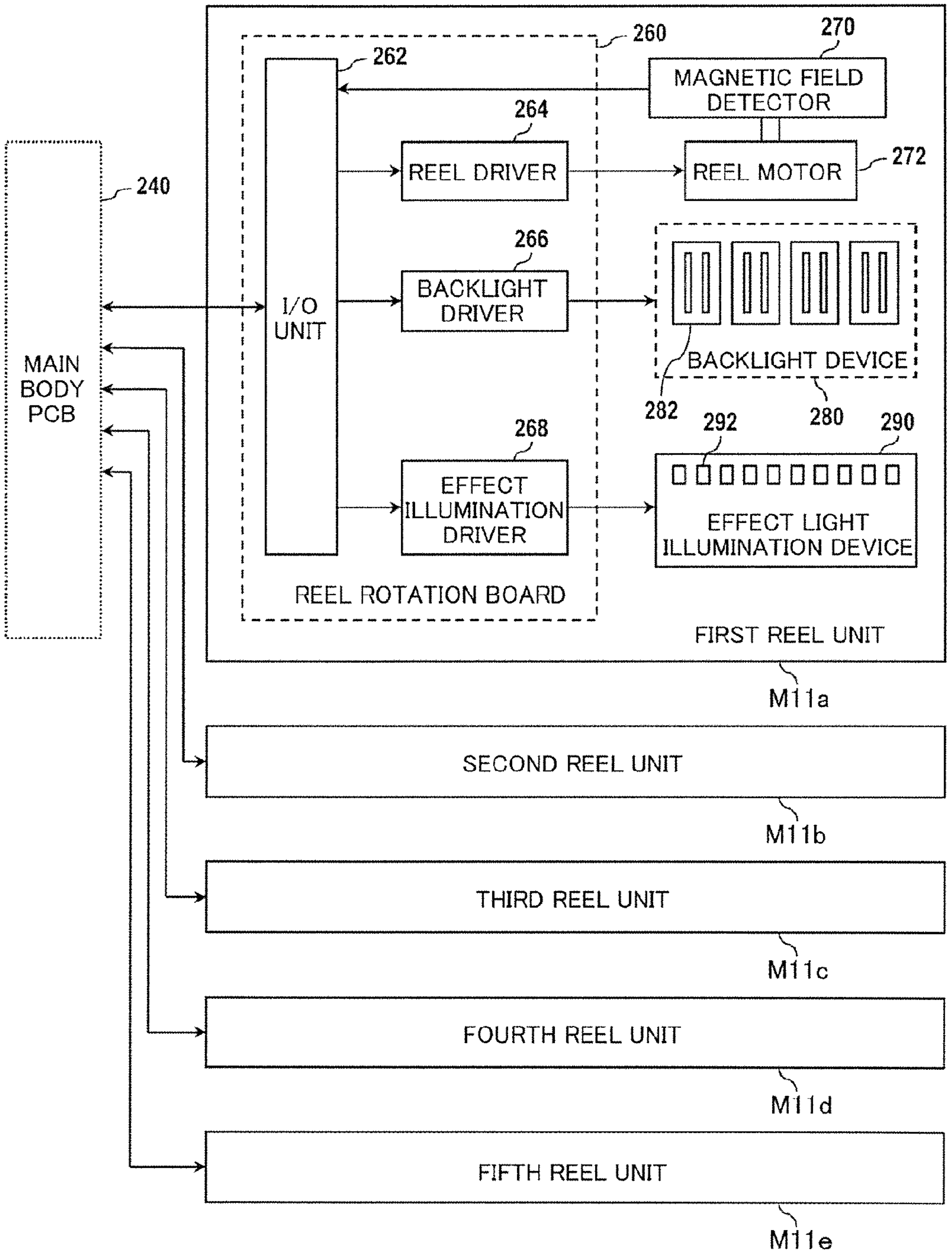
FIG. 19 is a block diagram of an electric circuit in the reel assembly.

FIG. 19 is a block diagram of an electric circuit in the reel assembly M1. Each of the reels M3*a* to M3*e* is provided on a reel rotation board base plate 260. The reel rotation board 260 includes a 20 input/output (I/O) unit 262 capable of communicating with the main body PCB 240, a reel driver 264 connected to the I/O unit 262, a backlight driver 266, and an effect illumination driver 268.

The I/O unit 262 is connected to a magnetic field detector 270. The magnetic field detector 270 includes a magnetic sensor for sensing magnetic field intensity to output a magnetic detection signal proportional to the magnetic field intensity, and a sensor fixation part for fixing the magnetic sensor to a predetermined position. The magnetic sensor detects the intensity of the magnetic field generated by a magnet. The magnet is provided at a rotating axis of a reel motor 272 to rotate with the reel 52A.

The reel driver 264 supplies electric power to the reel motor 272. The backlight driver 266 supplies electric power individually to each light source 282 in a backlight device M7. The effect light illumination driver 268 supplies electric power individually to each light source 292 of an effect light illumination device 290.

Since the second to fifth reels M3*b* to M3*e* have the same configuration as the first reel M3*a*, detailed description thereof will be omitted.

[Function of the Game Program]

Figure 20:
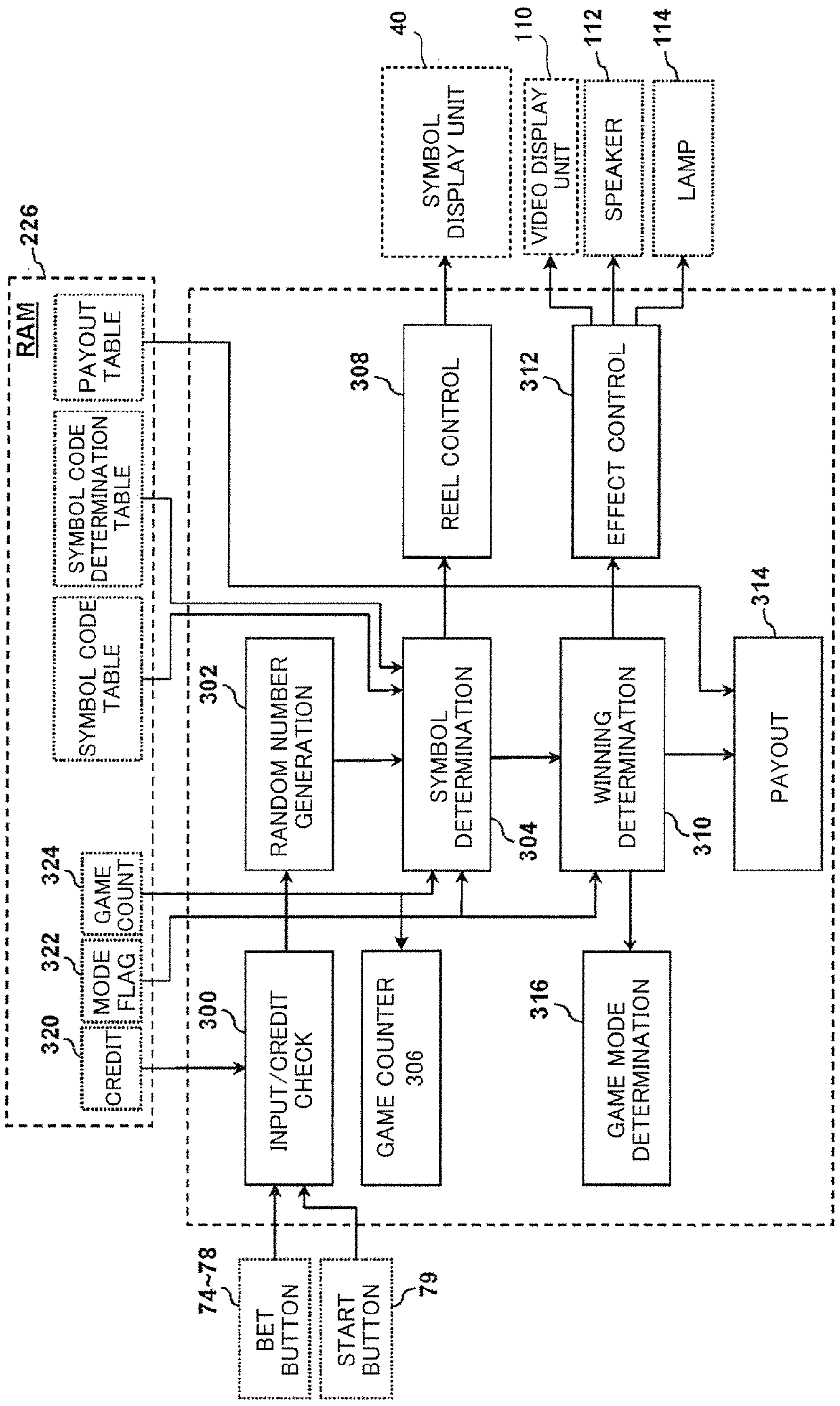
FIG. 20 is a block diagram showing the process of a game program executed by a main CPU 222 on the mother board 220.
Figure 21:
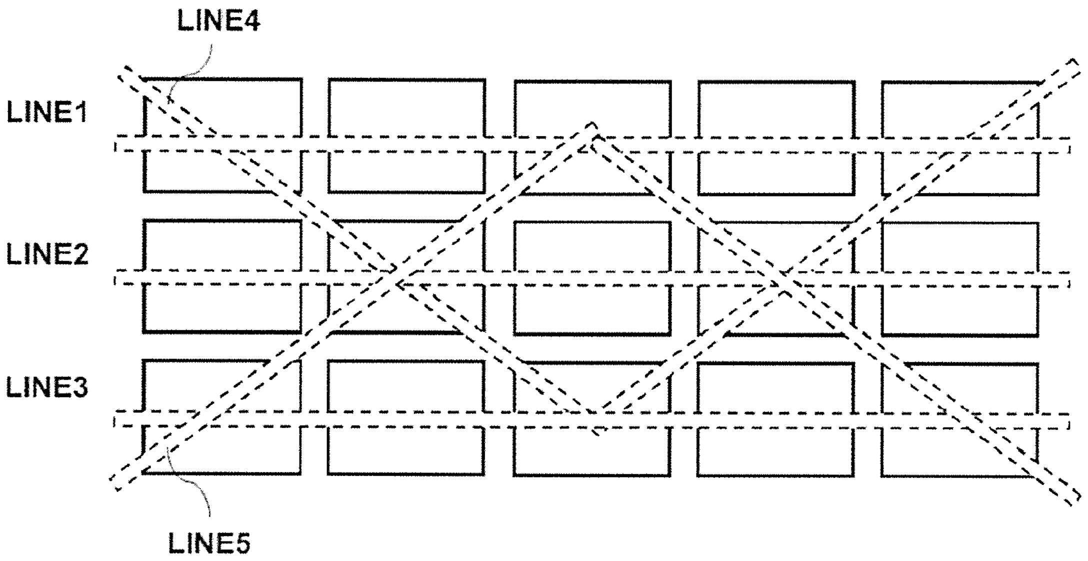
FIG. 21 is a diagram showing pay lines of the gaming machine according to the present embodiment.

FIG. 20 is a functional block diagram of the game program executed in the main CPU 222 of the motherboard 220. When the power is supplied to the gaming machine 10, the main CPU 222 reads the authenticated game program and game system program from the memory card 210 through the game board 200, and writes the programs into the RAM 226. The game program is executed in a state being loaded into the RAM 226 in such a manner.

According to the preferred embodiment, the game program includes a input/credit check process part 300, a random number generating process part 302, a symbol determination process part 304, a game counter process part 306, a reel control process part 308, a winning determination process part 310, an effect control process part 312, a payout process part 314, and a game mode determination process part 316.

(Input/Credit Check Process Part 300)

The input/credit check process part 300, in an idle state where the reels M3*a* to M3*e* are stopped, continuously checks whether or not any of the "BET" buttons 74 to 78 or the "START" button 20 79 is pressed. If the "BET" buttons 74 to 78 or the "START" button 79 is pressed, the input/credit check process part 300 checks whether or not there remains any credit for the player on the basis of the credit data 320 stored in the RAM 226. If at least one credit for the player remains, the input/credit check process part 300 call the random number generating process part 302.

Subsequently, the random number generating process part 302 generates random numbers which are used in the symbol determination process part 304. In the present embodiment, the random number generating process part 302 generates five random numbers. Each of the five random numbers is used in the first to fifth reels M3*a* to M3*e*, respectively.

After five random numbers are completely extracted, the symbol determination process part 304 determines a to-be-stopped symbol for each of the reels M3*a* to M3*e* with reference to the symbol code determination table stored in the RAM 226. The symbol determination process part 304 uses five random numbers to determine five to-be-stopped symbols for the reels M3*a* to M3*e* to be appeared in the display window 56 of the symbol display unit 40 for each of the reels M3*a* to M3*e*.

In particular, the symbol determination process part 304 checks the current gaming mode with reference to the mode flag 322 stored in the RAM 226. The process of determining symbols in the normal mode is different from the process of determining symbols in the chance mode. In the normal mode, the symbol determination process part 304 uses a predetermined symbol code determination table to determine the symbol using the random number in accordance with a predetermined process. Contrarily, in the chance mode, the symbol determination process part 304 continuously changes the symbol code determination table for each unit game to vary the symbol determination process. The continuous varying of the symbol code determination table can increase winning combinations including at least one specific symbol as the chance mode game continues. The number of chance mode games executable within a single session is limited to a predetermined number of times, e.g., seven times. In order to limit the number of times of chance mode games, the game counter process part 306 counts the number of times of chance mode games which have already been executed and the number of times of chance mode games which remain in that session. The value of the game count 324 is stored in the RAM 226. The game counter process part 306 may reside in the symbol determination process part 304.

The reel control process part 308 controls the reel assembly M11 by providing stop position information corresponding to the determined symbols. In this way, the reels M3*a* to M3*e* spins, followed by stopping at the position designated by the stop position information. More specifically, the symbols scroll along with the spinning of the reels M3*a* to M3*e*. Then, the reels M3*a* to M3*e* are stopped in such a manner that the determined symbols are rearranged in the central position vertically in the window 56 of the symbol display unit 40.

The winning determination process part 310 determines whether or not a predetermined winning combination is achieved by the rearranged symbols. In case that a winning combination is achieved by the rearranged symbols, the effect control process part 312 controls the symbol display unit 40 and the other devices. The other devices include the speaker 112, the lamp 114, the video display unit 110, etc. The effect includes video and audio effect, backlight change, and lighting effect. Also, the payout process part 314 determines payout amount corresponding to the achieved winning combination to give the player that payout amount.

Furthermore, each time the unit game is completed, the game mode determination process part 316 determines the game mode of the next unit game. The game mode determination process part 316 changes the mode from the normal mode into the chance mode when a trigger event occurs in the rearranged symbols. On the other hands, the game mode determination process part 316 changes the mode from the chance mode into the normal mode when an end condition is satisfied. In the other cases, the game mode determination process part 316 maintains the previous game mode. The game mode determination process part 316 may be run in the winning determination process part 310.

(Pay Line)

FIG. 9 shows pay lines employed in the gaming machine 10. In the gaming machine 10, five pay lines are set for the symbol matrix. First to third pay lines extend horizontally across the symbol stop positions in the first to third rows, respectively, in the symbol matrix. A fourth pay line extends in a "V"-shaped line joining the symbol stop position in the first row and the first column, the symbol stop position in the second row and the second column, the symbol stop position in the third row and the third column, the symbol stop position in the second row and the fourth column, and the symbol stop position in the first row and the fifth column A fifth pay line extends in a "reversed V"-shaped path joining the symbol stop position in the third row and the first column, the symbol stop position in the second row and the second column, the symbol stop position in the first row and the third column, the symbol stop position in the second row and the fourth column, and the symbol stop position in the third row and the fifth column.

Each of the pay lines can be activated depending on the player's choice. However, all the five pay lines can be activated irrespective of the betting amount or the player's choice. The total number of pay lines can vary depending on the size of the symbol matrix, and the other pay lines can be set appropriately.

(Symbol Appearance Probability Table)

FIG. 22 shows an example of a symbol appearance probability table.

The symbol appearance probability table is the table that determines the probability of appearance of the symbols. The symbol appearance probability table specifies the probabilities that each symbol appears in the pay lines. The symbol determination table defines the appearance probability for each of the normal game and the free game.

In the symbol appearance probability table, the probabilities of the three seven symbol TS and the SEVEN RUSH symbol SS in the normal game is set to be "0", while only the three seven symbol TS and the SEVEN RUSH symbol SS can win a prize as the winning hand in the free game and the probability for the other symbols is set to be "0". More specifically, the winning combination relating to the three seven symbol TS and the SEVEN RUSH symbol SS is not established in the normal game, while only the winning combination relating to the three seven symbol TS and the SEVEN RUSH symbol SS is established in the free game.

In addition, the probabilities of the winning hand and losing of the game may be appropriately set in response to the contents of the game.

(Payout Table)

FIG. 23 shows an example of a payout table.

The payout table is the table in which the relationships between the winning combinations and respective payouts and probabilities are summarized. In this payout table, the payout of the three seven symbol TS which is the important winning combination in the free game is defined to be "20" credits, and a single SEVEN RUSH is defined to induce no pay out. The payout may be appropriately set with regard to the other winning combinations, and the winning combinations also may be appropriately set.

In the gaming machine 10, the winning determination process part 310 refers to the payout table to determine whether or not any winning combination is achieved in the pay lines each time the unit game is executed. If the winning combination defined in the payout tables is included in one of the pay lines, the winning determination process part 310 detects the winning combination and checks the payout amount with reference to the payout tables. The payout process part 314 pays out the determined amount. On the other hand, the winning determination process part 310 determines that the game is so-called losing when determining that no winning combination is achieved by the symbols appeared on the pay line. The benefit of payout can be provided for the player by discharging coins to the coin tray 92, or adding the credits by the amount equivalent to the payout.

In addition, although FIG. 23 shows only one payout table, the payout tables may be provided separately for the normal game and the free game.

(Game State Transition)

Figure 24:
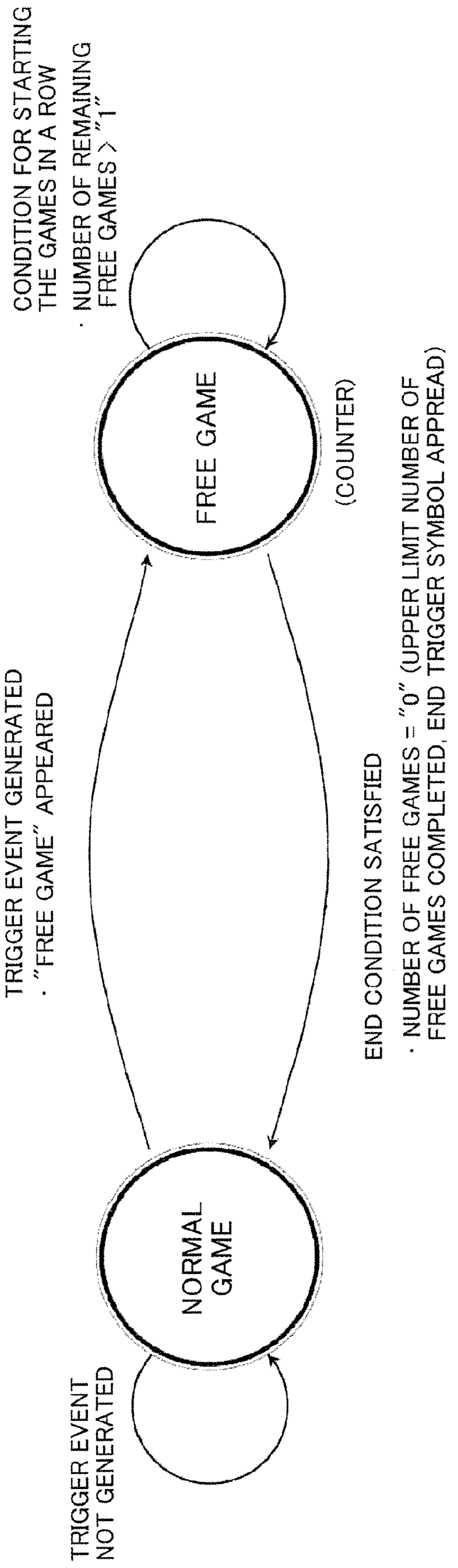
FIG. 24 is a state transition view in the gaming machine according to the present embodiment.

FIG. 24 is a state transition view in the gaming machine 10.

The gaming machine 10 executes at least two types of games including the normal game and the free game. The gaming machine 10 also executes a bonus game actually although it is not shown in FIG. 24. A variety of known bonus games can be employed as the bonus game.

The gaming machine 10 executes the normal game as being a main game, and shifts to the free game when a trigger event occurs in the normal game.

In the present embodiment, the trigger event is set to meet the condition in which more than the predetermined number of (such more than one or more than three) free game symbols FS are rearranged in the symbol display unit 40.

Of course, the trigger event may be set to meet the other condition. The trigger event can be set under the condition in which, for example, more than the predetermined number of specific symbols other than the FREE GAME symbol FS are rearranged, or a specific symbol, such as the SEVEN RUSH symbol SS, the FREE GAME symbol FS, or the three seven symbol TS, stops at the third reel M3*c*.

As can be seen in FIG. 24, the normal game is the game that is repeated until the FREE GAME symbol FS (or a bonus symbol BS) appears. In the normal game, the game result is displayed by rearranging the FREE GAME symbol FS, the BONUS symbol BS, a big dragon symbol BDS, a triple dragon symbol TDS, a double dragon symbol DDS, and a single dragon symbol SDS. Then, if the combination of the symbols rearranged in the pay line corresponds to the winning combination indicated in the payout table, the dividend in accordance with the combination is paid out.

The present embodiment shows the FREE GAME symbol FS and the three seven symbol TS arranged to be overlapped with each other, and the backlight device M7 is controlled so that the FREE GAME symbol FS which is a trigger to the free game is selectively displayed in the normal game (in this case, the light emission is controlled to be green).

On the other hand, the free game is the game that is executed without consuming the gaming media such as a medal. The displaying of a specific symbol induces the addition of some games, and the free game continues until the remaining free game is "0".

As described above, the game shifts to the free game when the FREE GAME symbol appears in the normal game, and a predetermined number of free games is acquired at that time. 10 free games can be acquired in the present embodiment. Therefore, when the normal game shifts to the free game upon appearing the FREE GAME symbol FS in the normal game, at least 10 free games can be carried out.

In the free game, the three seven symbol TS and the SEVEN RUSH symbol SS basically appear, and the other symbols does not appear or at least are not rearranged in the payout line as the winning combination. Although the present embodiment describes as if there are only two types of winning combinations, the present invention is not limited to this, but more than two winning patterns may be used.

In the reel belt M32, the FREE GAME symbol FS and the three seven symbol TS are arranged to be overlapped with each other, and the smoke layer M325 is formed in the part except for the three seven symbol TS (the FREE GAME symbol FS) and the SEVEN RUSH symbol SS (refer to FIGS. 9 and 10). Thus, in the free game, the backlight device M7 is controlled so that the three seven symbol SS indicating that there is a payout is selectively displayed in addition to the adding of the number of free games (the light emission is controlled to be red in this case). Furthermore, the smoke layer M325 makes the three seven symbol TS and the SEVEN RUSH symbol SS noticeable while making the other symbol unnoticeable, so that the game element is achieved in which only the three seven symbol TS and the SEVEN RUSH symbol SS appear or the winning combination is not displayed (or difficult to be viewed) in the pay line.

When the three seven symbol TS appears in the free game, a predetermined number of free games are added to the remaining free games. In the present embodiment, one free game is added upon the three seven symbol TS being appeared. Furthermore, the appearance of the three seven symbol TS involves a predetermined payout, as shown in FIG. 23. In the present embodiment, the payout of the three seven symbol TS is set to be 20 credit per one bet. Furthermore, when a plurality of three seven symbols TS appears, the amount of credit obtained by multiplying the credit for one bet by the number of the three seven symbols may be paid out. For example, when three seven symbols TS appear, the amount of credit is derived by 20 credits for one bet×3=60 credits. Of course, the combination of the plurality of three seven symbols TS may be defined as the winning combination to determine the payout in response to the winning combination. Furthermore, the number of adding free game when a plurality of three seven symbols TS appears may be set to be "1" irrespective of the number of appeared symbols, or may be set the number obtained by multiplying the number of games by the number of appearance to be the adding number.

When the SEVEN RUSH symbol SS appears in the free game, the number of games determined by lottery is added to the remaining free games. As shown in FIG. 23. However, the appearance of the SEVEN RUSH symbol SS generates no pay out. Of course, the appearance of the SEVEN RUSH symbol SS may induce the payout. In this case, the payout at the time a plurality of SEVEN RUSH symbols SS appears can be set variously in the similar way to the case of the three seven symbols TS.

Adding of the free game is carried out in the free game, so that a feeling of expectation to the continuation of the free game can be given to a player. Furthermore, since the pattern of adding the free games at the time the three seven symbol TS appears is different from that at the time the SEVEN RUSH symbol appears, the different expectations can be provided with regard to each of the rearrangements of the symbols. An enhanced game element thus can be provided for the free game.

Here, in the present embodiment, the appurtenance of the three seven symbol TS determines the number of adding free games using the table shown in FIG. 25.

The table shown in FIG. 25 includes an adding table, a small time game number lottery table and a big time game number lottery table.

The adding table is for determining which of the small time game number lottery table and a big time game number lottery table is used to determine the number of adding free games. More specifically, when the SEVEN RUSH symbol SS appears in the free game, the adding table is firstly used to determine the lottery table for use in the determination of the number of adding games. In the present embodiment, the adding table includes the probability of determining the small time game number lottery table that is set to be 95%, and the probability of determining the big time game number lottery table that is set to be 5%.

The small time game number lottery table is used when the number of adding free games is determined upon winning the small in the adding table, which is the lottery table including relatively small number of adding free games. As seen from the adding table, the number of adding games is determined in the free game basically using the small time game number lottery table. The small time game number lottery table includes the numbers of adding games obtained thereby, i.e., five games, seven games and 10 games. The probabilities of obtaining the adding games for each number of games are 50.0% (1/2.0), 30.0% (1/3.3), and 20.0% (1/5.0), and the expectation value of the number of adding games is 5.6 games.

The big time game number lottery table is used when the number of adding free games is determined upon winning the big in the adding table, which is the lottery table including relatively large number of adding free games. As seen from the adding table, it is significantly difficult to win the big time game number lottery table in the free game compared to the small time game number lottery table, while the larger number of adding games is determined thereby. The big time game number lottery table includes the numbers of adding games obtained thereby, i.e., 15 games, 20 games and 30 games. More specifically, the minimum value of the number of adding games in the big time game number lottery table is 15 games, which is set to be higher than the maximum value of the number of adding games in the small time game number lottery table, i.e., 10 games. The probabilities of obtaining the adding games for each number of games are 50.0% (1/2.0), 20.0% (1/5.0), 20.0% (1/5.0), and 10.0% (1/10.0). The expectation value of the number of adding games is thus 19.5 games in the big time game number lottery table, which is significantly higher than the expectation value in the small time game number lottery table.

As described above, when the SEVEN RUSH symbol SS appears in the free game, the number of adding games is determined using two lottery tables having the expectation values of the number of adding games and the selection probabilities different from each other. In addition thereto, the appearance of the three seven symbol TS in the free game induces the addition of the predetermined number of free games (one game in the present embodiment). Therefore, it is possible to create a variation in adding (continuing) the free games in the progress of the free game. As a result, a player can be provided with an increasing feeling of expectation with regard to the continuation of the free game when entering into the free game. Furthermore, since at least the appearance of the three seven symbol TS can provide a player with a benefit of a payout, the continuation of the free game leads to the amount of the payout. Therefore, the expectation for the large amount of the payout based on the continuation of the free game can provide a player with an enhanced feeling of excitement.

In this way, since the lottery based on the first lottery table certainly provides the larger number of adding free games than that provided based on the second lottery table, the expectation is raised with regard to the adding of the free game by the lottery based on the first lottery table. The game element is thus enhanced in the progress of the free game.

In the free game described above, at least more than one remaining free game is required for continuing the free game. The game forcedly shifts to the normal game when the end condition is satisfied.

The end condition is, for example, the case where the remaining free game is "0". When such an end condition is set, the game in which the three seven symbol TS and the SEVEN RUSH SS do not appear is regarded as a losing game in the free game, and the remaining number of free games is subtracted due to the losing game.

The end condition may be the one which forcedly terminates the game even if more than one free game remains. The end condition as described above includes, for example, (1) completing the defined number of games, (2) appearance of an end trigger, or (3) termination utilizing the adding lottery at the time the SEVEN RUSH symbol appears, etc.

The end condition (1) limits the number of continuation of the free game. In this case, the maximum number of continuing free games may be a preset constant value, or may be determined by lottery at the time of entering into the free game (at the time the FREE GAME symbol FS appears).

The end condition (2) carries out the free game ending lottery in the free game to terminate the free game when winning the end lottery. The end lottery may be carried out for each game, or for each predetermined number of game. Furthermore, a two-step lottery may be employed in which the lottery is carried out regarding whether the end lottery should be carried out, and then the end lottery is carried out when winning the former lottery.

The end condition (3) carries out the end lotteries of the free games simultaneously in the determination of the number of games using the lottery table shown in FIG. 25. More specifically, the assignment of the number of adding game of the free game as well as the assignment of the termination of the free game are added to one of or both the small time game number lottery table and the big time game number lottery table.

[Operation of Slot Machine]

The operation of the gaming machine 10 will be described with reference to FIGS. 26 to 31.

Figure 26:
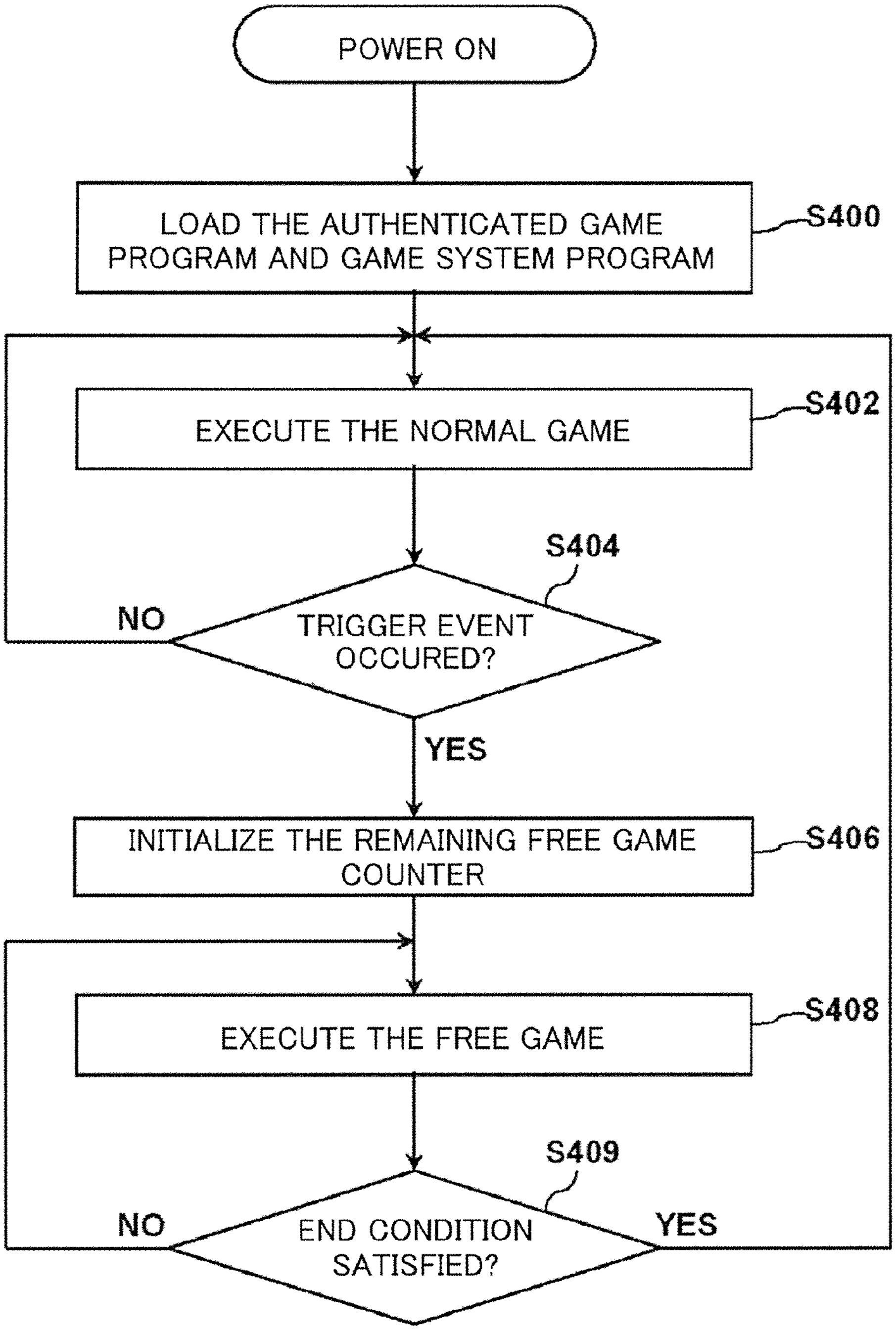
FIG. 26 is a flowchart showing a general process executed in the gaming machine according to the present embodiment.

FIG. 26 shows the process executed in the gaming machine 10.

When the power is supplied to the gaming machine 10, the main CPU loads the authenticated game program and game system program by reading the programs from the memory card 210 through the game board 200 and writing them into the RAM 226 (step S400). Subsequently, the main CPU 222 executes the game program and the game system program.

When the unit game is started by inserting the IC card into the IC card reader 60 or inserting coins into the coin insertion unit 80, the player can execute a new game based on the inserted coins or the stored bets. When the unit game is initially played after starting up the gaming machine 10, the game goes into the normal game. Thus, the main CPU 222 executes the normal game process for the initial unit game (step S402).

Whenever the normal game is completed, the game mode determination process part 316 executed by the main CPU 222 determines whether or not the trigger event occurs (step S404). Unless the trigger event occurs, the subsequent unit game is executed as the normal game. Thus, the main CPU 222 returns the process to step S402 to execute the subsequent unit game as the normal game.

If, however, determining in the determination process at step S404 that trigger event has occurred, the main CPU 222 executes the subsequent unit game as the free game (step S408).

The free game is executed by the appearance of the FREE GAME symbol FS, and the number of remaining free games is initially set to be 10. The main CPU 222 thus initializes a free game remaining number counter to be 10 when executing the first free game (step S406). The free game remaining number counter decrements each time the unit game is executed.

Each time the unit game in the chance mode is completed, the game mode determination process part 316 determines whether or not the end condition is satisfied (step S409). Unless the end condition is satisfied, the subsequent unit game is executed as the free game (step S409).

If determining in the determination process at step S409 that the end condition is satisfied, the main CPU 222 executes the subsequent unit game as the normal game (step S402).

(Normal Game Execution Process)

Figure 27:
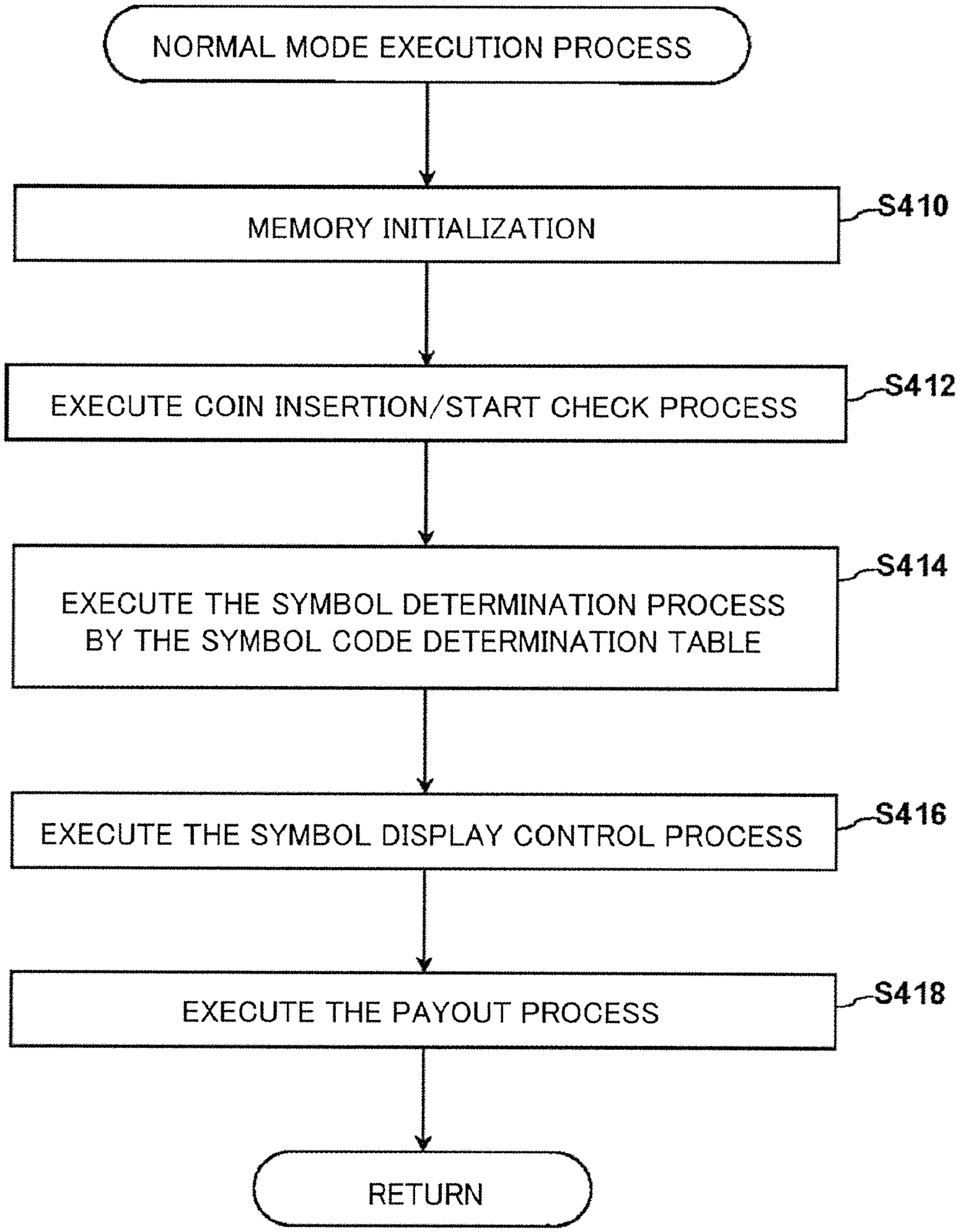
FIG. 27 is a flowchart showing the normal game execution process shown in FIG. 26.

FIG. 27 shows the execution process of the normal game at step S402 shown in FIG. 26 in detail.

Each time a unit game is completed, the main CPU 222 executes memory initialization process (step S410). In this initialization process, the main CPU 222 clears unnecessary data and information from the temporary working area in the RAM 226. The unnecessary data and information includes the payout data, awarding or failure information, and the to-be-stopped symbol information determined in the previous unit game.

Subsequently, the main CPU 222 executes coin-insertion/start-check process (step S412). In this process, the main CPU 222 checks the entry of coins or bills, and scans inputs from the BET buttons 74 to 78 and the START button 79.

After the START button 79 is pressed by the player, the main CPU 222 executes symbol determination process (step S414). In this process, the main CPU 222 generates five random numbers and determines five symbol codes of five to-be-stopped symbols corresponding to the random numbers with reference to the symbol code determination table 340. The main CPU 222 determines whether or not any winning combination is achieved by the rearranged symbol matrix that is formed of the rearranged symbols.

At step S416, the main CPU 222 executes symbol display control process. In this process, the main CPU 222 controls the reel assembly M1 to rotate the reels M3*a* to M3*e*, and then to stop rotating the reels M3*a* to M3*e* in order to rearrange the symbols in accordance with the symbol determination result to form the symbol matrix in the display window 56.

Then, at step S418, the main CPU 222 determines the payout amount, and executes the payout process to provide the player with the determined payout amount.

(Coin-Insertion/Start-Check Process)

Figure 28:
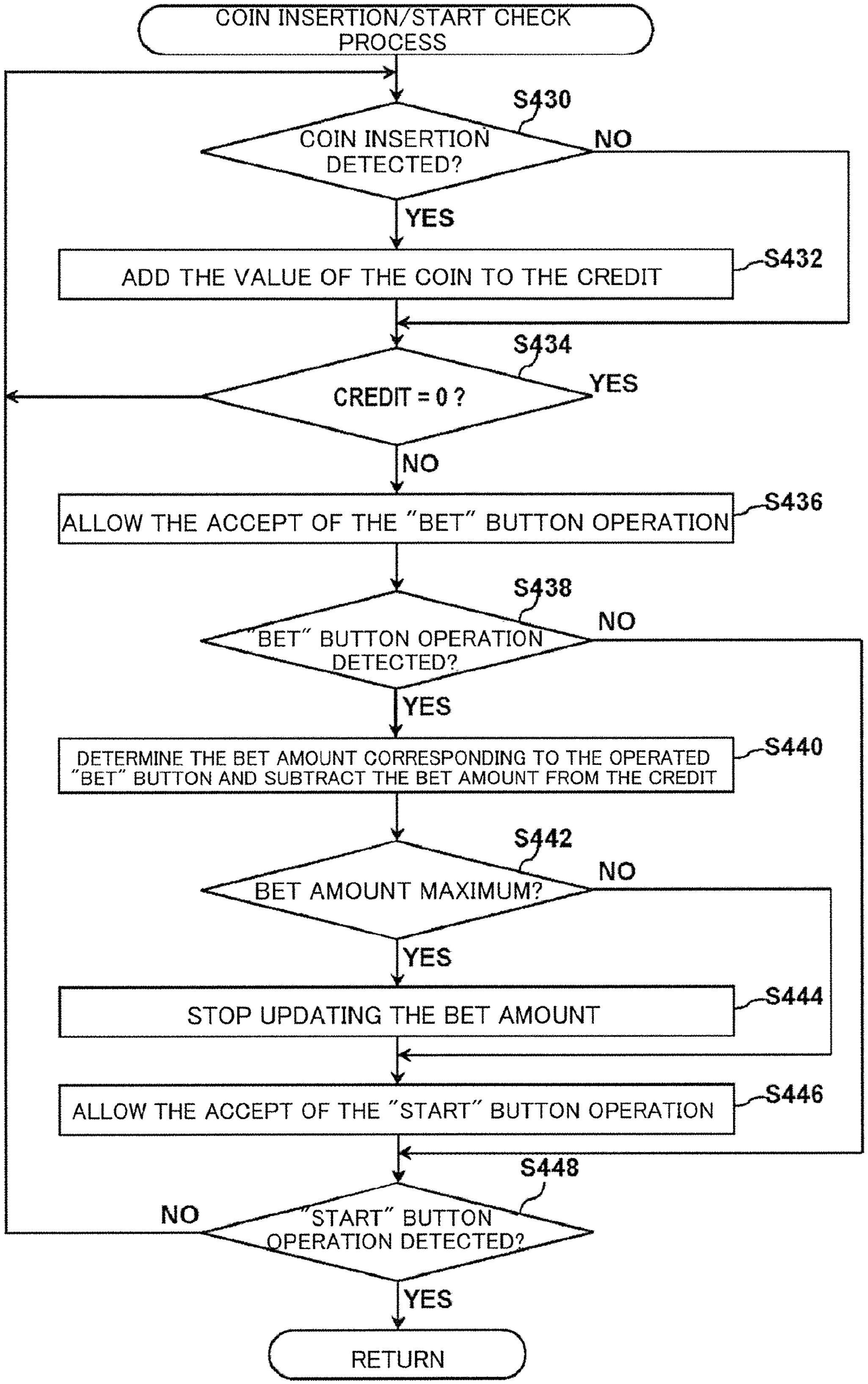
FIG. 28 is a flowchart showing the coin insertion/start check process shown in FIG. 27 in detail.

FIG. 28 shows the coin-insertion/start-check process at step S412 shown in FIG. 27 in detail.

First, the main CPU 222 determines, by means of the input/credit checking process part 300 executed in the main CPU 222, whether or not the coin counter 232 detects insertion of a coin (step S430). When determining at step S430 that a coin has been inserted, the main CPU 222 adds the value of the inserted coin to the credits stored in the RAM 226 (step S432). At this stage, the main CPU 222 may further determine whether or not the bill validator 246 detects insertion of a bill. When determining that a bill has been inserted, the main CPU 222 adds the value of the inserted bill to the credits.

When the process at step S432 has been completed or when it is determined at step S430 that no coin has been inserted, the main CPU 222 determines whether or not the credit amount is zero (step S434). If determining in the determination process at step S434 that there remains some credits, the main CPU 222 allows the bet setting inputs through the BET buttons 74 to 78 up to the remaining credits (step S436). If determining in the determination process at step S434 that there remains no credit, the main CPU 222 returns the process to step S430.

Afterwards, main CPU 222 monitors the bet setting input through the BET buttons 74 to 78 based on bet setting input signals output from the bet switches 74S to 78S (step S438). If the main CPU 222 determines that any of the BET buttons 74 to 78 has been pressed by the user, the main CPU 222 adjusts the betting amount value stored in the RAM 226 according to the pressed BET button, and subtracts the betting amount from the credit value stored in the RAM 226 (step S440). If determining in the determination process at step S434 that there is no BET button input for a predetermined time, the main CPU 222 proceeds the process to step S448.

During the increase of the betting amount, the main CPU 222 determines whether or not the betting amount reaches a predetermined maximum value (step S442). When the betting amount has reached the predetermined maximum value, the main CPU 222 prohibits any further increase of the betting amount (step S444).

Upon completing the process at step S444 or determining that betting amount has not reached the maximum value in the process at step S442 and the betting amount is adjusted, the main CPU 222 allows the operation input through the START button 79 (step S446). At this stage, the main CPU 222 can display the set pay lines the symbol display unit.

In the process at step S448, the main CPU 222 determines whether or not the input through the START button 79 is detected (step S448). When the input from the START button 79 has not been detected for a predetermined standby time, the main CPU 222 returns the process to step S430. If determining in the process at step S448 that the input from the START button 79 has been detected, the main CPU 222 terminates the coin-insertion/start-check process.

(Symbol Determination Process)

Figure 29:
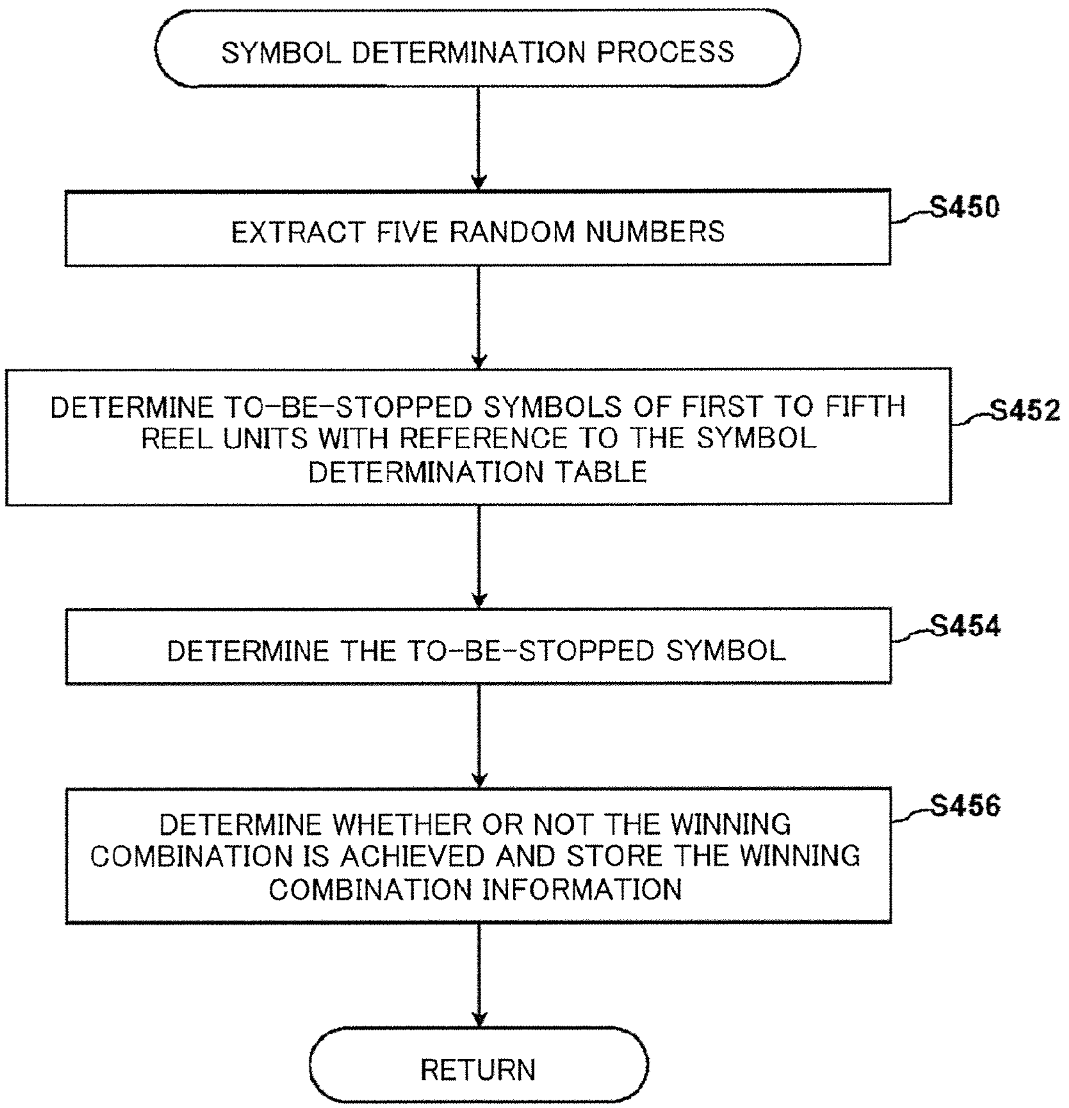
FIG. 29 is a flowchart showing the symbol determination process shown in FIG. 27 in detail.

FIG. 29 shows the symbol determination process at step S414 shown in FIG. 27 in detail.

First, the random number generation process part 302 executed by the main CPU 222 extracts five random numbers (step S450).

Subsequently, the symbol determination process part 304 executed by the main CPU 222 determines first to fifth symbol codes using the first to fifth random numbers, respectively, with reference to the symbol code determination table (step S452). Then, the main CPU 222 determines first to fifth to-be-stopped symbols corresponding to the first to the fifth symbol codes, respectively, with reference to the symbol code table (step S454). As a result, the five to-be-stopped symbols are determined by use of the five random numbers. Upon determination of the first to fifth to-be-stopped symbols, the main CPU 222 stores the symbols or symbol codes in the RAM 226.

The five to-be-stopped symbols are symbols to be stopped at the second row of each column of the symbol matrix shown in FIG. 9. Since the symbol alignments constituting the first to fifth symbol columns are fixed corresponding to each of the reels M3*a* to M3*e*, determining the to-be-stopped symbols determines all the symbols constituting the symbol matrix. The main CPU 222 determines all the symbols constituting the symbol matrix based on the to-be-stopped symbols with reference to the symbol code table of FIG. 7.

Afterwards, the winning determination process part 310 executed by the main CPU 222 determines whether or not any winning combination is achieved by the symbols constituting the symbol matrix determined in the process at step S456 (step S456). In case that a winning combination is achieved by the symbols constituting the symbol matrix, the winning determination process part 310 stores the winning combination in the RAM 226 (step S456). In addition, the main CPU 222 may determine whether or not the winning combination is achieved from the symbol codes of to-be-stopped symbols without determining whether or not the winning combination is achieved using the symbol matrix.

Finally, the symbol determination process terminates and the execution flow returns to the main process (not shown).

(Symbol Display Control Process)

Figure 30:
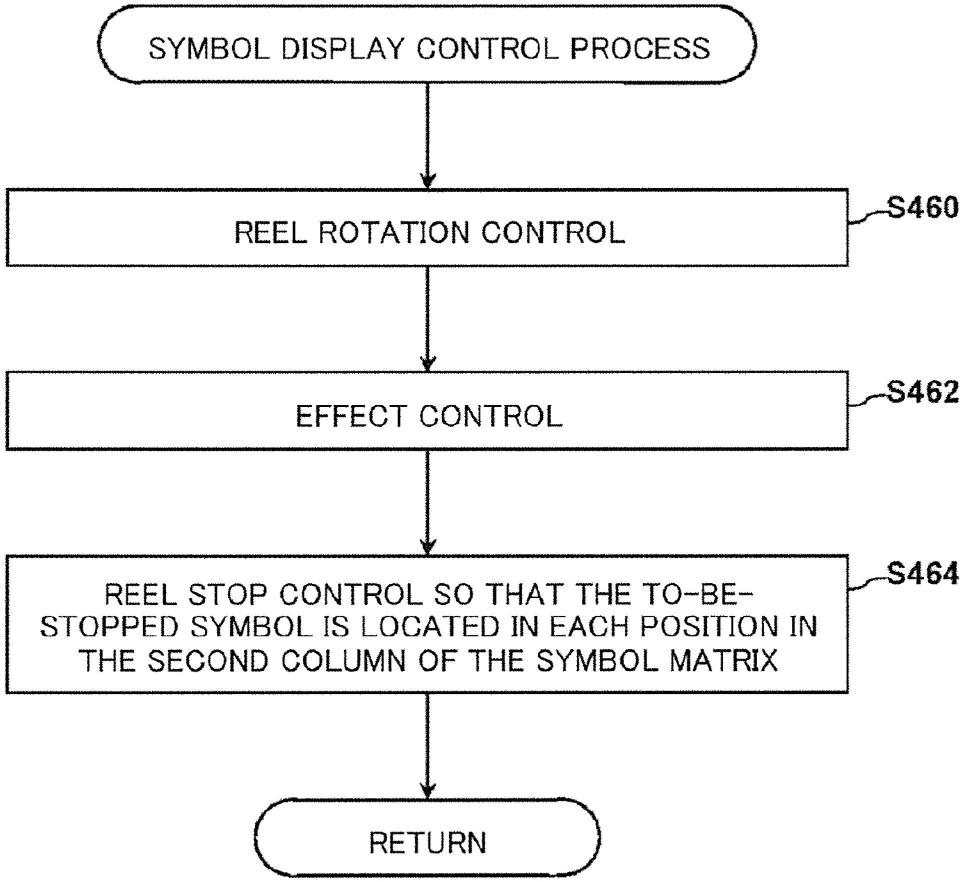
FIG. 30 is a flowchart showing the symbol display control shown in FIG. 27 in detail.

FIG. 30 shows the symbol display control process at step S416 shown in FIG. 27 in detail.

First, the reel control process part 308 executed by the main CPU 222 transmits a spin control signal to the reel assembly M1 so that the reel driver 264 of the first to fifth reels M3*a* to M3*e* supplies power to the reel motor 272 to spin the reels. Each of the first to fifth reels M3*a* to M3*e* rotates at the speed different from one another, and the symbol alignment provided on the reels M3*a* to M3*e* scrolls in the display window 56 of the symbol display unit 40 (step S460).

While the first to fifth reels M3*a* to M3*e* rotates, the backlight driver 266 supplies power to the light sources M71 of the backlight device M7 and the effect illumination driver 268 supplies power to the light source 292 of the effect light illumination device 290 to execute the effect from behind the reel surfaces.

The spin control signal contains information of stop positions of the first to fifth reels M3*a* to M3*e*. The reel driver 264 of the first to fifth reels M3*a* to M3*e* controls the reel motors 272 to stop the first to fifth reels M3*a* to M3*e* at the position indicated by the spin control signal. Thus, the reel motors 272 composed of stepping motors is stopped at desired positions, and the scroll of the symbol columns is stopped so that the to-be-stopped symbols are arranged in the second row of the symbol matrix formed in the display window 56 (step S464).

Finally, the symbol display control process terminates and the execution flow returns to the main function.

(Irradiation Control Routine)

Figure 31:
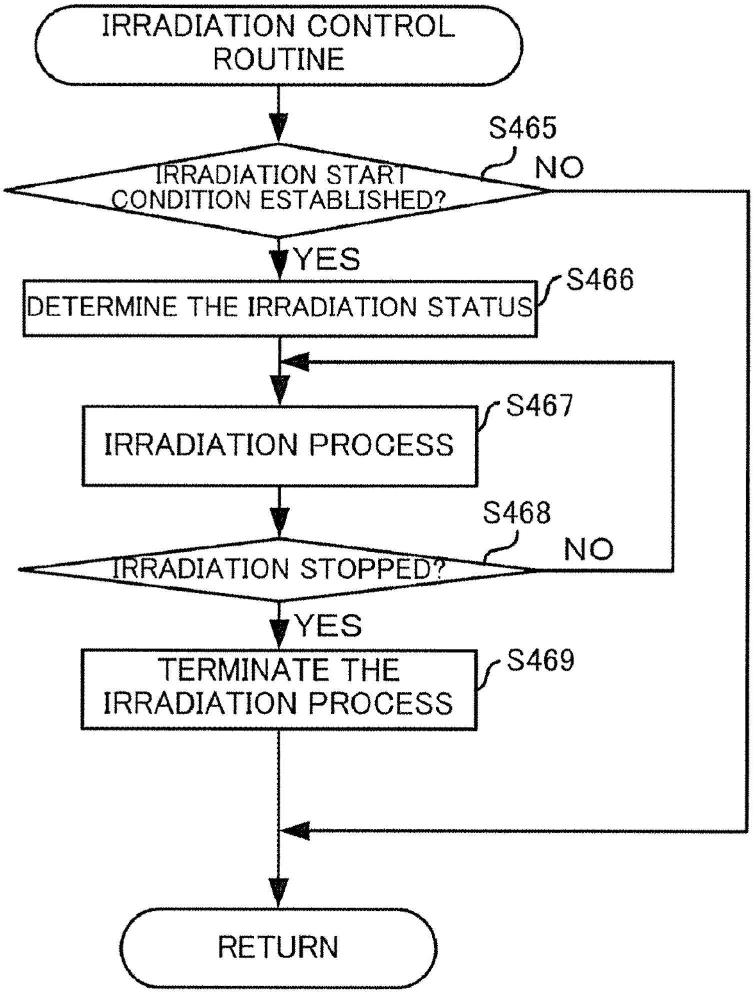
FIG. 31 is a flowchart showing an irradiation control routine as a symbol display control in FIG. 30.

FIG. 31 shows an example of the control of the backlight device M7 at step S460 in FIG. 30.

The main CPU 222 determines whether the irradiation start condition is established (step S465), and determines the irradiation pattern if the condition is established (step S466). In this process, the determination is made before the reels M3*a* to M3*e* start rotating, during the rotation of the reels M3*a* to M3*e*, and after the reels M3*a* to M3*e* stop rotating, respectively.

Here, the determination process of the irradiation pattern after the reels M3*a* to M3*e* stop rotating is executed as follows with regard to a specific.

In the case where the unit game to be executed is the normal game, when the FREE GAME symbol FS is rearranged to appear in the display window 56, it is determined that green light is irradiated by the light source device M71 corresponding to the FREE GAME symbol FS. On the other hand, in the case where the unit game to be executed is the free game, when the three seven symbol TS is rearranged to appear in the display window 56, it is determined that red light is irradiated by the light source device M71 corresponding to the three seven symbol TS.

Then, the main CPU 222 executes the irradiation process in accordance with the determined irradiation pattern (step S467). For example, when it is determined that green light is irradiated from the light source M71 corresponding to the FREE GAME symbol FS after the reels M3*a* to M3*e* stop rotating, the process is executed in which green light is irradiated from the light source M71 to the FREE GAME symbol FS. Thus, the letter symbols "FREE GAME" (the FREE GAME symbol FG) are displayed in green. On the other hand, when it is determined that red light is irradiated from the light source M71 corresponding to the three seven symbol TS after the reels M3*a* to M3*e* stop rotating, the process is executed in which red light is irradiated from the light source M71 to the three seven symbol TS. Thus, the number symbols "777" (the three seven symbol TS) are displayed in red.

The irradiation process continues until the main CPU 222 determines the termination of the irradiation (step S468).

(Payout Process)

Figure 32:
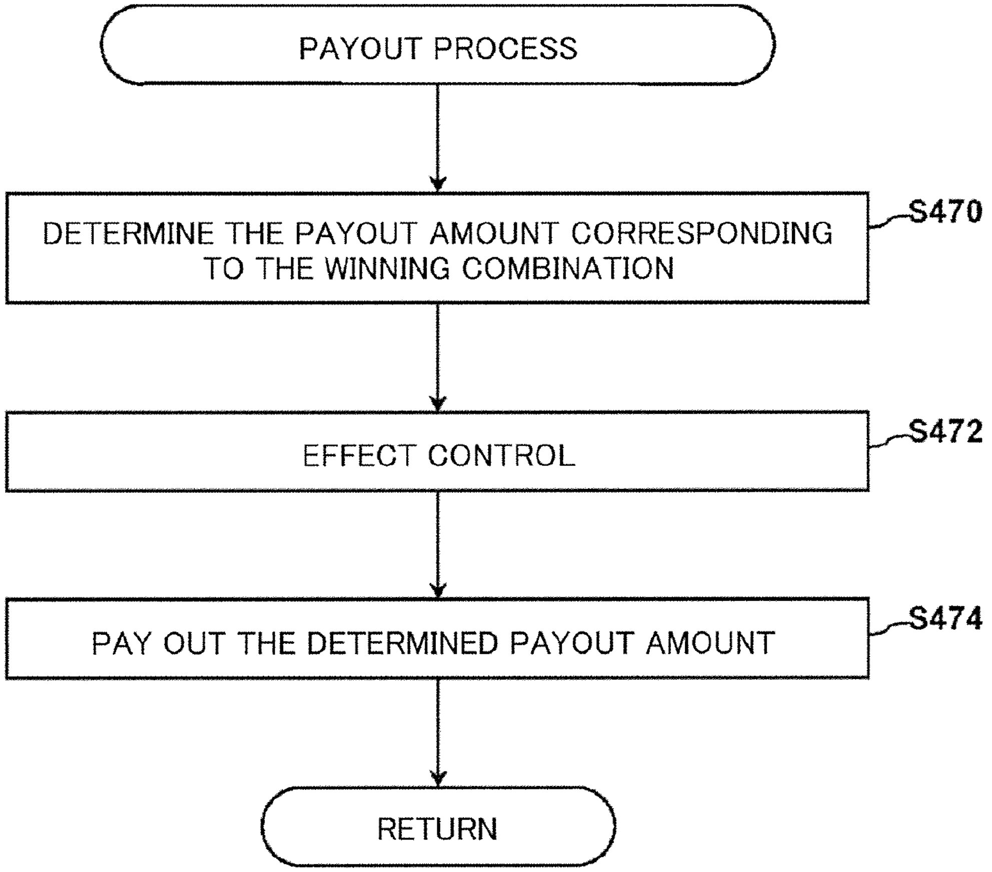
FIG. 32 is a flowchart showing the payout process shown in FIG. 27 in detail.

FIG. 32 illustrates the payout process at step S418 shown in FIG. 27 in detail.

When a winning combination is achieved, the winning determination process part 310 or the payout process part 314 executed by the main CPU 222 determines the payout amount corresponding to the winning combination and stores the amount in the RAM 226 (step S470).

As soon as the first to fifth reels M3*a* to M3*e* stop, the effect control process part 312 executed by the main CPU 222 controls the symbol display unit 40 and the other devices, such as the speaker 112, the lamp 114 and the video display unit 110, to execute the effects (step S472). The production effect includes video, audio effect, backlight change, and illumination effect.

Afterwards, the payout process part 314 pays out the determined amount by increasing the credits or discharging coins to the coin tray 92 (step S474).

(Free Game Execution Process)

Figure 33:
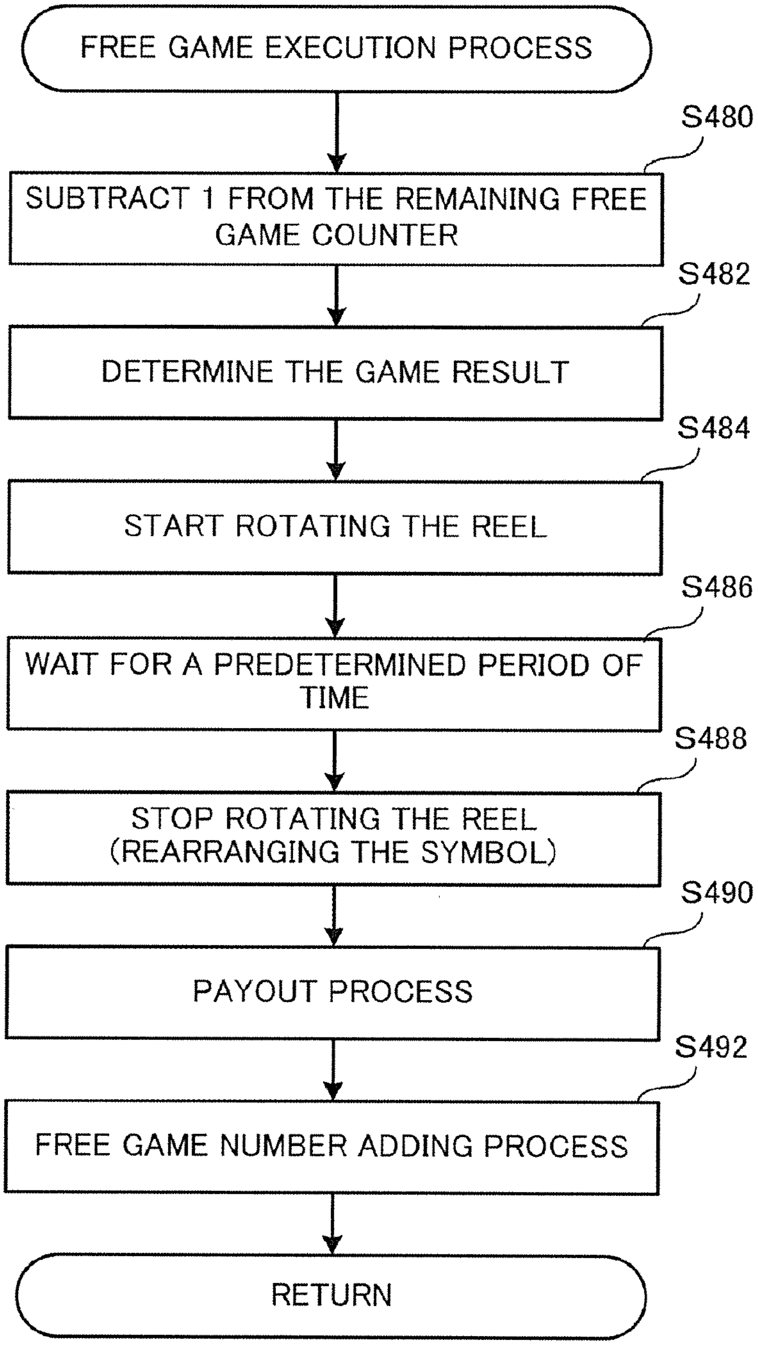
FIG. 33 is a flowchart showing the free game execution process shown in FIG. 26.

FIG. 33 illustrates the payout process at step S408 shown in FIG. 26 in detail.

The term "free game" herein refers to the game in which a player can have a chance to acquire the game value without paying or consuming the game value such as a medal. For example, that is the game in which the unit game can be executed without inserting a coin or a credit into the gaming machine 10, so that the coin and the credit cannot be consumed even if the game resultingly ends in failure. In this manner, the game in the chance mode being as the free game enables the player to get a chance to acquire the game values without consuming the game values such as coins and credits.

In the free game process, the main CPU 222 decrements the remaining free game counter by one (step S480).

Then, the main CPU 222 executes the process for determining the game result (step S482). In this process, the main CPU 222 first generates five, namely first to fifth, random numbers. Then, the main CPU 222 determines first to fifth symbol codes using the first to fifth random numbers with reference to the selected symbol code determination tables 341 to 348, respectively.

The first random number is the random number for determining a symbol code of a to-be-stopped symbol in the first symbol column. The second random number is the random number for determining a symbol code of a to-be-stopped symbol in the second symbol column. The third random number is the random number for determining a symbol code of a to-be-stopped symbol in the third symbol column. The fourth random number is the random number for determining a symbol code of a to-be-stopped symbol in the fourth symbol column. The fifth random number is the random number for determining a symbol code of a to-be-stopped symbol in the fifth symbol column.

The main CPU 222 starts rotating the reels M3*a* to M3*e* (step S484), and stops rotating the reels after a predetermined period of time has elapsed (step S486). More specifically, the main CPU 222 executes the process to rearrange the symbols. The process of rearranging the symbols causes the scroll of the first to fifth symbol columns to be started, and then stops the scroll of the first to fifth symbol columns after a predetermined period of time has elapsed. At that time, the symbol matrix of three rows and five columns is rearranged in the display window 56 so that the symbols of five symbol codes (to-be-stopped symbols) determined in the process at step S482 appear in the second column in the display window 56 (the second column in the symbol matrix formed in the display window 56).

Then, the main CPU 222 executes the payout process (step S490). This process is executed in the same manner as the payout process in the normal game executed at step S418 in FIG. 27. More specifically, at step S490, the payout process shown in FIG. 32 is executed in which it is determined whether or not a predetermined winning combination is achieved by the rearranged symbol matrix, and pays out the payout amount corresponding to the achieved winning combination when the predetermined winning combination is achieved.

Then, the main CPU 222 executes the free game adding process, which will be described below with reference to FIG. 34, to terminate the subroutine.

(Free Game Number Adding Process)

Figure 34:
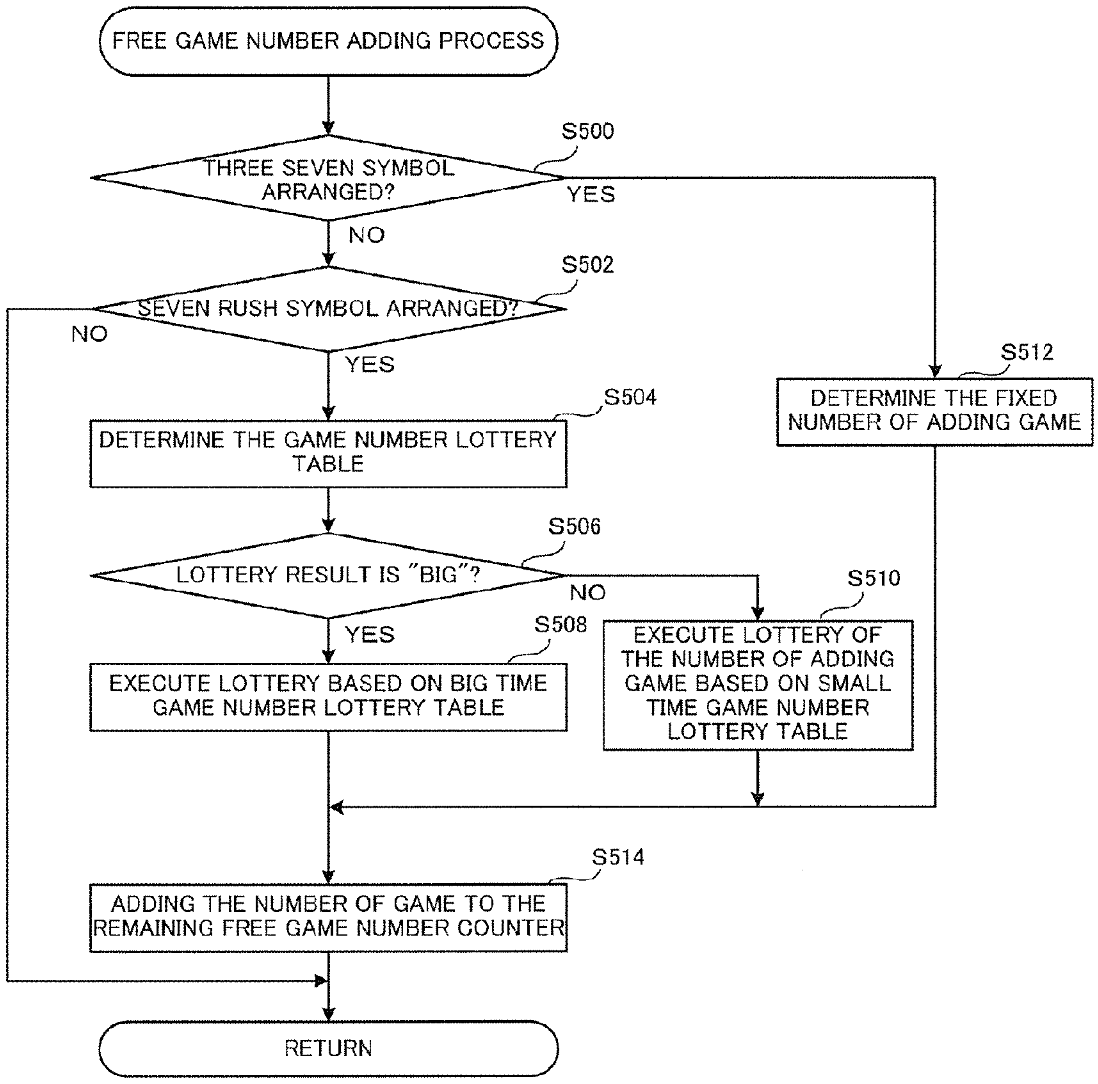
FIG. 34 is a flowchart showing the free game number adding process shown in FIG. 33.

FIG. 34 shows the free game number adding process executed at step S492 in FIG. 33 in detail.

The main CPU 222 determines whether the three seven symbol TS is arranged (step S500), and moves the process to step S504 upon determining that the three seven symbol TS is arranged.

On the other hand, upon determining that the three seven symbol TS is not arranged, the main CPU 222 determines whether the SEVEN RUSH symbol SS is arranged (step S502). Upon determining that the SEVEN RUSH symbol SS is arranged, the main CPU 222 decides the preset fixed number of adding game (such as one) (step S512), and adds the fixed number of adding game to the remaining free game counter to terminate the subroutine (step S514).

Upon determining that the SEVEN RUSH symbol SS is not arranged, which can be determine that none of the three seven symbol TS and the SEVEN RUSH symbol SS is arranged, the main CPU 222 terminates the subroutine without adding the number of free game.

At step S504, the main CPU 222 determines the game number lottery table for use in the lottery of the number of adding free games using the game number lottery table. This process is executed by deciding which of the small time game number lottery table and the big time game number lottery table is used using the adding table shown in FIG. 25.

Upon deciding the adding table, the main CPU 222 determines whether the adding table to be used is the big time game number lottery table (step S506), and then carries out the lottery of the number of adding game using the big time game number lottery table upon determining that the table to be used is the big time game number lottery table (step S508).

Upon determining that the table to be used is not the big time game number lottery table, the main CPU 222 uses the small time game number lottery table to carry out the lottery of the number of adding game (step S510).

When the number of adding game of the free game is decided by lottery at step S508 or step S510, the determined number of adding game is added to the remaining free game number counter and then the subroutine is terminated (step S514).

(Modification)

FIG. 35A, FIG. 35B, FIG. 36A, FIG. 36B, FIG. 36C, FIG. 36D, FIG. 36E, FIG. 36F, FIG. 36G, and FIG. 36H show schematic diagrams for explaining the control of the lighting of the light source device R12 which operates in synchronization with the rotary of a specific symbol.

Figure 35A:
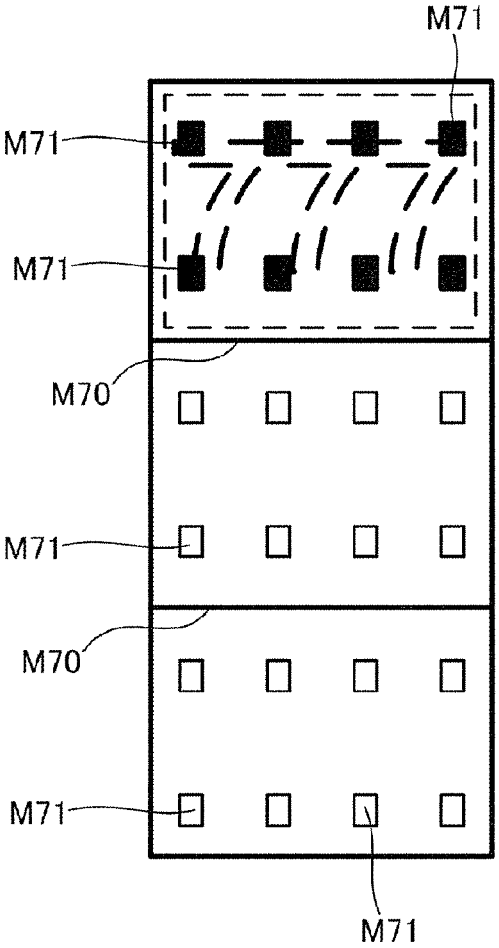
FIG. 35A and FIG. 35B are schematic diagrams for explaining the control of a light source device in a modification.
Figure 35B:
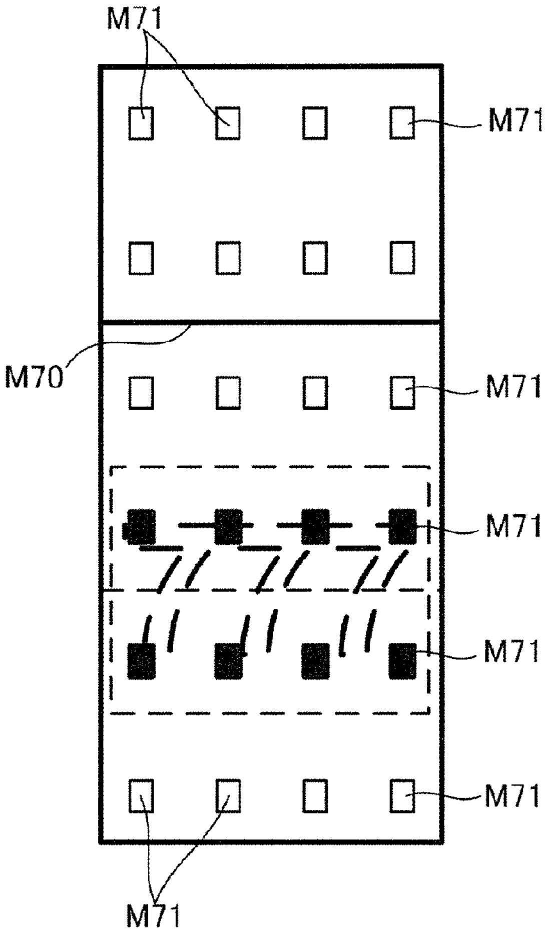
Figure 36A:
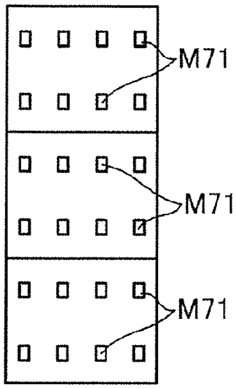
FIG. 36A, FIG. 36B, FIG. 36C, FIG. 36D, FIG. 36E, FIG. 36F, FIG. 36G, and FIG. 36H are schematic diagrams for explaining the control of the light source device in a modification.
Figure 36B:
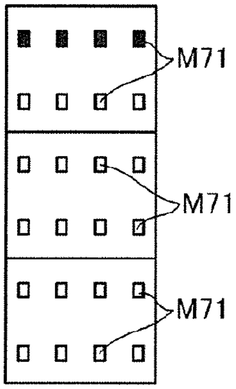
Figure 36C:
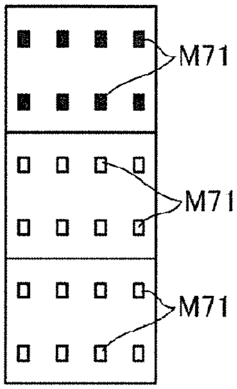
Figure 36D:
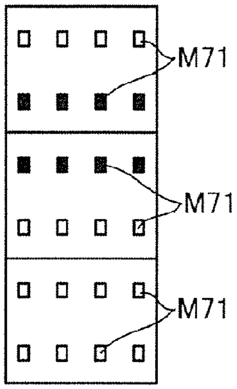
Figure 36E:
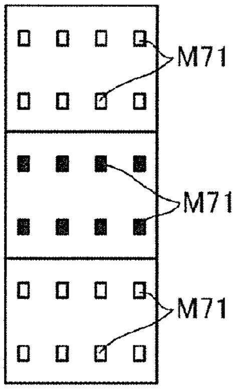
Figure 36F:
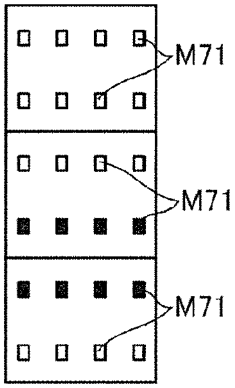
Figure 36G:
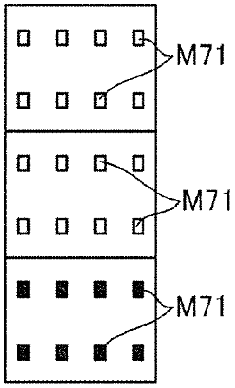
Figure 36H:
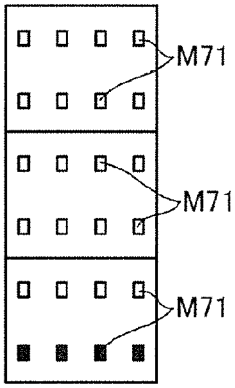

As shown in FIGS. 35A and 35B, in the modification, when a specific symbol passes in front of the backlight device M7, the light source device M71 arranged behind the specific symbol is lighted and the other light source M71 is extinguished. As shown in FIG. 36A, FIG. 36B, FIG. 36C, FIG. 36D, FIG. 36E, FIG. 36F, FIG. 36G, and FIG. 36H, the light source device M71 to be lighted can be changed with the rotational movement of the specific symbol.

In this way, the light source device M71 is controlled in synchronization with the rotational movement of the specific symbol, so that only the specific symbol is illuminated by the backlight device M7 and the specific symbol is made more noticeable than the other symbols.

Although the specific symbol is the three seven symbol TS in the illustrated example, the specific symbol may be the other symbol, such as the FREE GAME symbol FS, the SEVEN RUSH symbol SS, or the BONUS symbol BS.

Figure 37:
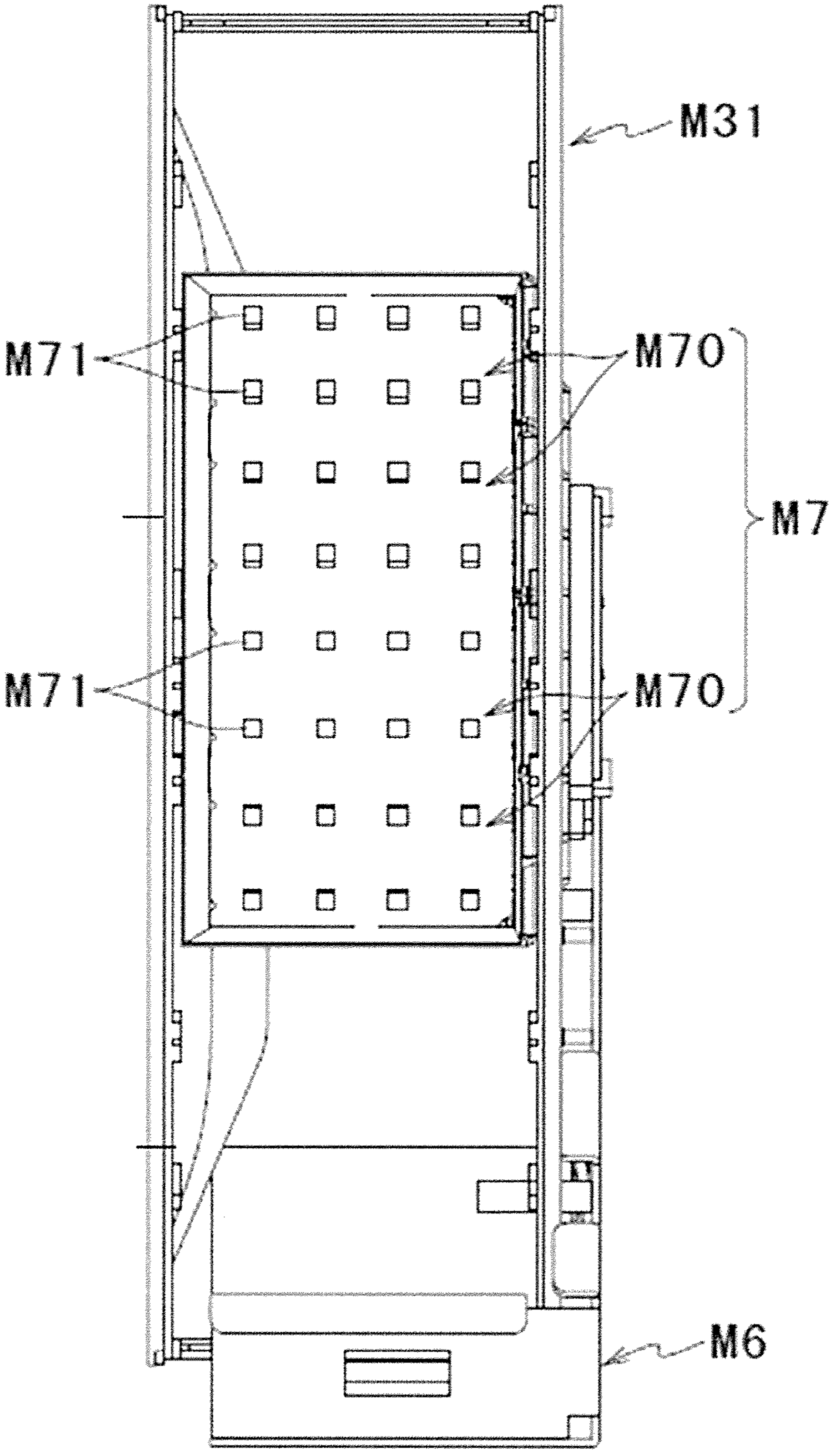
FIG. 37 is a front view of the light source device in the other modification.
Figure 38A:
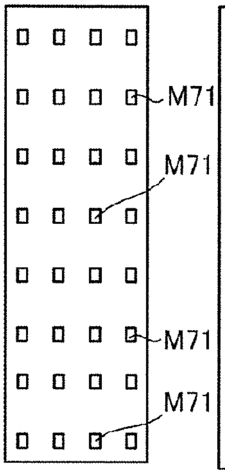
FIG. 38A, FIG. 38B, FIG. 38C, FIG. 38D, FIG. 38E, FIG. 38F, FIG. 38G, FIG. 38H, FIG. 38I, and FIG. 38J are schematic diagrams for explaining the control of a light source device in the other modification.
Figure 38B:
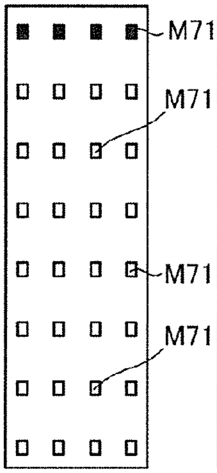
Figure 38C:
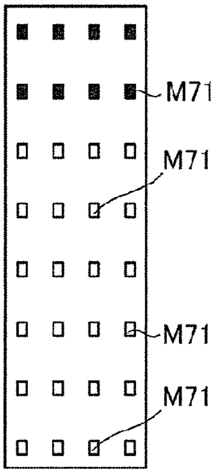
Figure 38D:
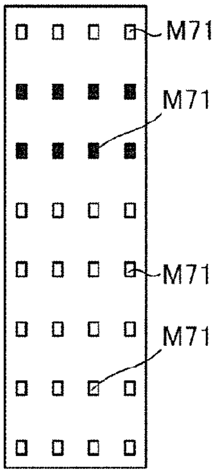
Figure 38E:
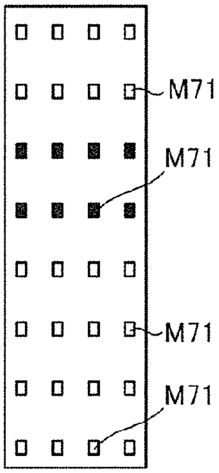
Figure 38F:
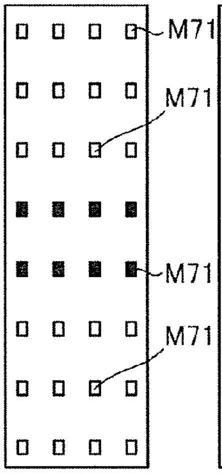
Figure 38G:
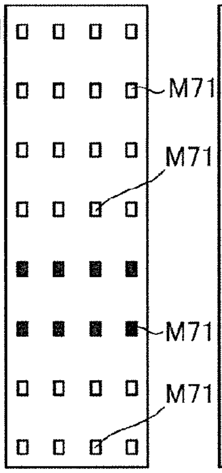
Figure 38H:
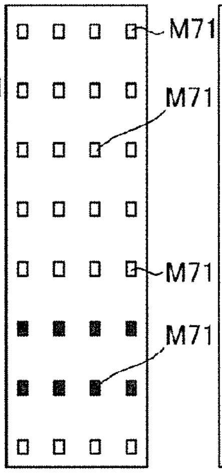
Figure 38I:
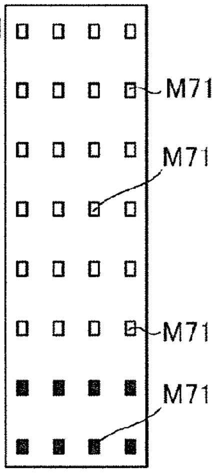
Figure 38J:
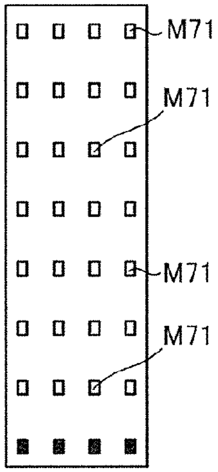

As shown in FIG. 37, the backlight device M7 without a partition plate M70 may be used. Also in this case, as shown in FIG. 38A, FIG. 38B, FIG. 38C, FIG. 38D, FIG. 38E, FIG. 38F, FIG. 38G, FIG. 38H, FIG. 38I, and FIG. 38J, only the light source device M71 located behind the specific symbol is successively lighted in synchronization with the rotational movement of the specific symbol, so that the specific symbol can be made noticeable. When the backlight device M7 without a partition plate M70 is used, the light emitted from the light source device M71 is not blocked by the partition plate. The specific symbol thus can be made noticeable more appropriately.

What is claimed is:

1. A gaming machine comprising:

a symbol display unit configured to rearrange a plurality of symbols;

a memory configured to store a plurality of game number lottery tables having different expectation values for determining a number of adding games of a free game and a table lottery table for selecting a game number lottery table among from the plurality of game number lottery tables; and a controller configured to (1) execute a normal game, (2) trigger a free game to be executed a predetermined number of times when a triggering event of the free game occurs in the normal game, (3) determining any one game number lottery table from the plurality of game number lottery tables based on the table lottery table under a condition that a symbol for triggering a lottery for a number of adding games is rearranged in the symbol display unit in the free game; and (4) determining the number of adding games of the free game based the game number lottery table determined in (3).

2. The gaming machine of claim 1, wherein the plurality of symbols include the symbol for triggering the lottery for the number of adding games and a symbol for triggering an operation for adding a predetermined number of adding games without a lottery, and the controller determines the number of adding games as the predetermined number under a condition that the symbol for triggering the operation for adding the predetermined number of adding games without the lottery is rearranged in the symbol display unit in the free game.

3. The gaming machine of claim 1, wherein the plurality of game number lottery tables include a first game number lottery table having a first expectation value and a second lottery table having a second expectation value smaller than the first expectation value, and wherein a probability of winning the first game number lottery table is set lower than a probability of winning the second game number lottery table in the table lottery table.

* * * * *